United States Patent
Tuxen

(10) Patent No.: US 12,036,465 B2
(45) Date of Patent: Jul. 16, 2024

(54) SYSTEM AND METHOD FOR PLAYER'S IDENTIFICATION

(71) Applicant: TRACKMAN A/S, Vedbaek (DK)

(72) Inventor: Fredrik Tuxen, Rungsted Kyst (DK)

(73) Assignee: TRACKMAN A/S, Vedbaek (DK)

( * ) Notice: Subject to any disclaimer, the term of this patent is extended or adjusted under 35 U.S.C. 154(b) by 12 days.

(21) Appl. No.: 17/653,478

(22) Filed: Mar. 4, 2022

(65) Prior Publication Data
US 2022/0288481 A1  Sep. 15, 2022

Related U.S. Application Data

(60) Provisional application No. 63/202,850, filed on Jun. 27, 2021, provisional application No. 63/200,425, filed on Mar. 5, 2021.

(51) Int. Cl.
*A63B 71/06* (2006.01)
*A63B 24/00* (2006.01)
(Continued)

(52) U.S. Cl.
CPC ...... *A63B 71/0616* (2013.01); *A63B 24/0006* (2013.01); *A63B 69/3691* (2013.01);
(Continued)

(58) Field of Classification Search
CPC ............ A63B 71/0616; A63B 24/0006; A63B 69/3691; G06T 7/80; G06T 7/246;
(Continued)

(56) References Cited

U.S. PATENT DOCUMENTS 7,854,669 B2 * 12/2010 Marty ................ A63B 24/0021
  473/448
9,805,546 B2 * 10/2017 Glasson .................. G07F 17/38
(Continued)

FOREIGN PATENT DOCUMENTS

JP      2022025578 A     2/2022

OTHER PUBLICATIONS

Michele et al., "Automatic Curation of Sports Highlights using Multimodal Excitement Features", IEEE Transactions on Multimedia, vol. 21, No. 5, May 1, 2019, pp. 1147-1160.

*Primary Examiner* — Malina D. Blaise
(74) *Attorney, Agent, or Firm* — Fay Kaplun & Marcin, LLP

(57) ABSTRACT

A system includes a database, a tracking arrangement, a motion sensor device and a processing arrangement. The database stores profiles for each sports player, each profile comprising identifying information for the player and a playerID. The tracking arrangement captures shot data corresponding to trajectories of sports balls launched by the players. The motion sensor device captures motion data corresponding to a swinging motion of a player or ball striking implement. The tracking arrangement and the motion sensor device: detect a first swing of a first player from the motion data captured by the motion sensor device, the first player being associated with a first playerID; associate the first swing of the first player with a timestamp and a location; and associate a first trajectory of a sports ball from the shot data captured by the tracking arrangement to the first swing based on the timestamp and the location.

20 Claims, 22 Drawing Sheets

(51) Int. Cl.
*A63B 69/36* (2006.01)
*B25J 9/16* (2006.01)
*B25J 19/02* (2006.01)
*G01S 13/90* (2006.01)
*G06T 7/246* (2017.01)
*G06T 7/73* (2017.01)
*G06T 7/80* (2017.01)
*G06V 10/74* (2022.01)
*G06V 10/82* (2022.01)
*G06V 20/40* (2022.01)
*G06V 40/16* (2022.01)
*G06V 40/20* (2022.01)
*G06V 40/50* (2022.01)
*H04N 23/69* (2023.01)
*H04N 23/695* (2023.01)

(52) U.S. Cl.
CPC ........... *B25J 9/1692* (2013.01); *B25J 9/1697* (2013.01); *B25J 19/023* (2013.01); *G01S 13/9029* (2013.01); *G06T 7/246* (2017.01); *G06T 7/73* (2017.01); *G06T 7/75* (2017.01); *G06T 7/80* (2017.01); *G06V 10/74* (2022.01); *G06V 10/82* (2022.01); *G06V 20/42* (2022.01); *G06V 40/168* (2022.01); *G06V 40/23* (2022.01); *G06V 40/50* (2022.01); *H04N 23/69* (2023.01); *H04N 23/695* (2023.01); *A63B 2071/0691* (2013.01); *A63B 2220/05* (2013.01); *A63B 2220/12* (2013.01); *A63B 2220/62* (2013.01); *A63B 2220/803* (2013.01); *A63B 2220/806* (2013.01); *A63B 2220/89* (2013.01); *A63B 2225/54* (2013.01); *G06T 2207/20084* (2013.01); *G06T 2207/20132* (2013.01); *G06T 2207/30224* (2013.01); *G06T 2207/30244* (2013.01)

(58) Field of Classification Search
CPC .. G06T 7/73; G06T 7/75; G06V 10/74; G06V 40/168; G06V 10/82; G06V 20/42; G06V 40/23; G06V 40/50; H04N 23/69; H04N 23/695; B25J 9/1692; B25J 9/1697; B25J 19/023; G01S 13/9029
See application file for complete search history.

(56) References Cited

U.S. PATENT DOCUMENTS

| | | | |
|---|---|---|---|
| 10,086,252 B2 | 10/2018 | Curchod | |
| 10,360,685 B2 | 7/2019 | Marty et al. | |
| 11,086,008 B2 | 8/2021 | Du Toit et al. | |
| 11,159,854 B2* | 10/2021 | Davies | H04N 21/8146 |
| 11,606,617 B2* | 3/2023 | Armstrong | H04N 21/47217 |
| 11,697,046 B2* | 7/2023 | Forsgren | A63B 24/0021 |
| | | | 473/199 |
| 11,729,490 B2* | 8/2023 | Imes | H04N 23/60 |
| | | | 348/157 |
| 11,741,714 B2* | 8/2023 | Imes | H04N 23/64 |
| | | | 473/409 |
| 11,763,563 B2 | 9/2023 | Imes | |
| 2005/0250590 A1 | 11/2005 | Doaga et al. | |
| 2008/0312010 A1* | 12/2008 | Marty | G06T 7/70 |
| | | | 73/865.4 |
| 2018/0200576 A1* | 7/2018 | Marris | A63B 71/06 |
| 2018/0369638 A1* | 12/2018 | Guerci | A63B 69/3694 |
| 2019/0344138 A1 | 11/2019 | Amarant et al. | |
| 2020/0155899 A1* | 5/2020 | Hixenbaugh | A63B 24/0021 |
| 2022/0400202 A1* | 12/2022 | Imes | H04N 5/77 |

* cited by examiner

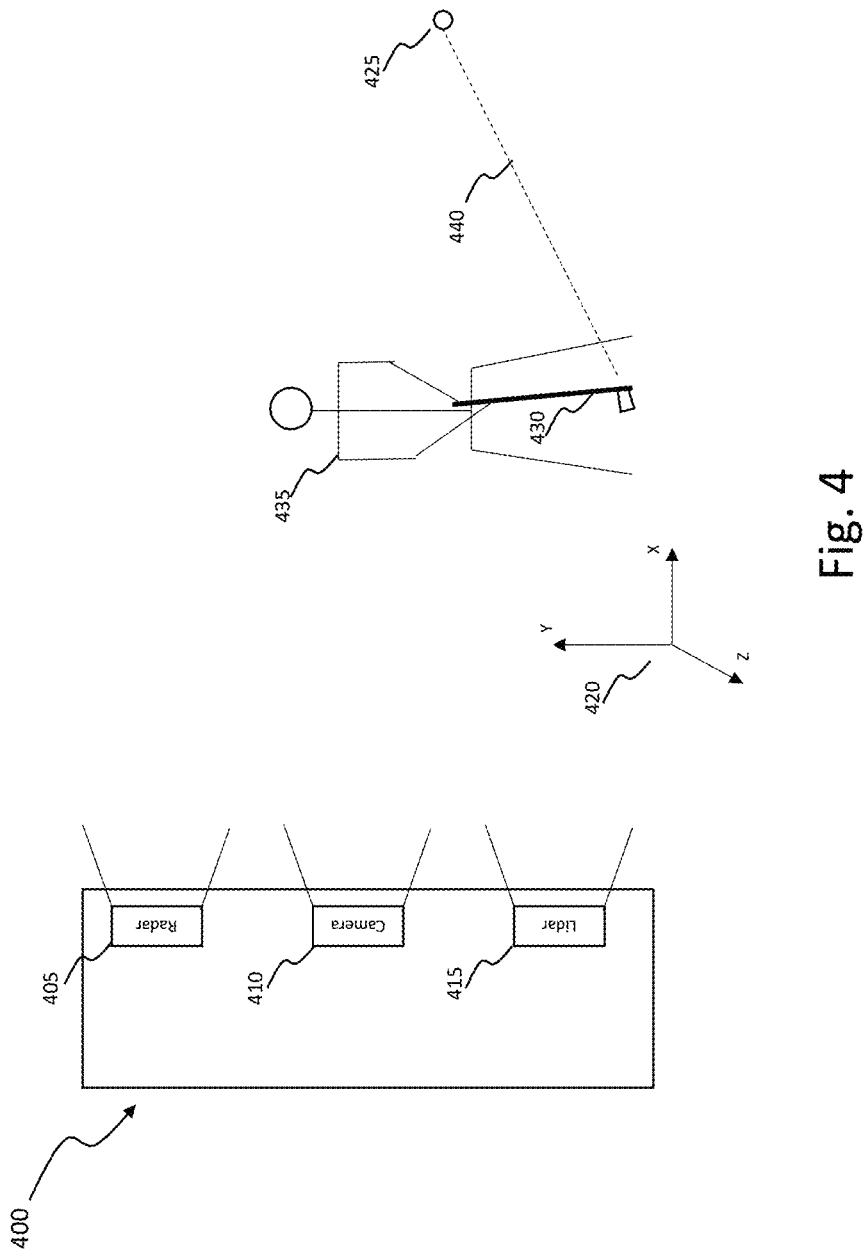

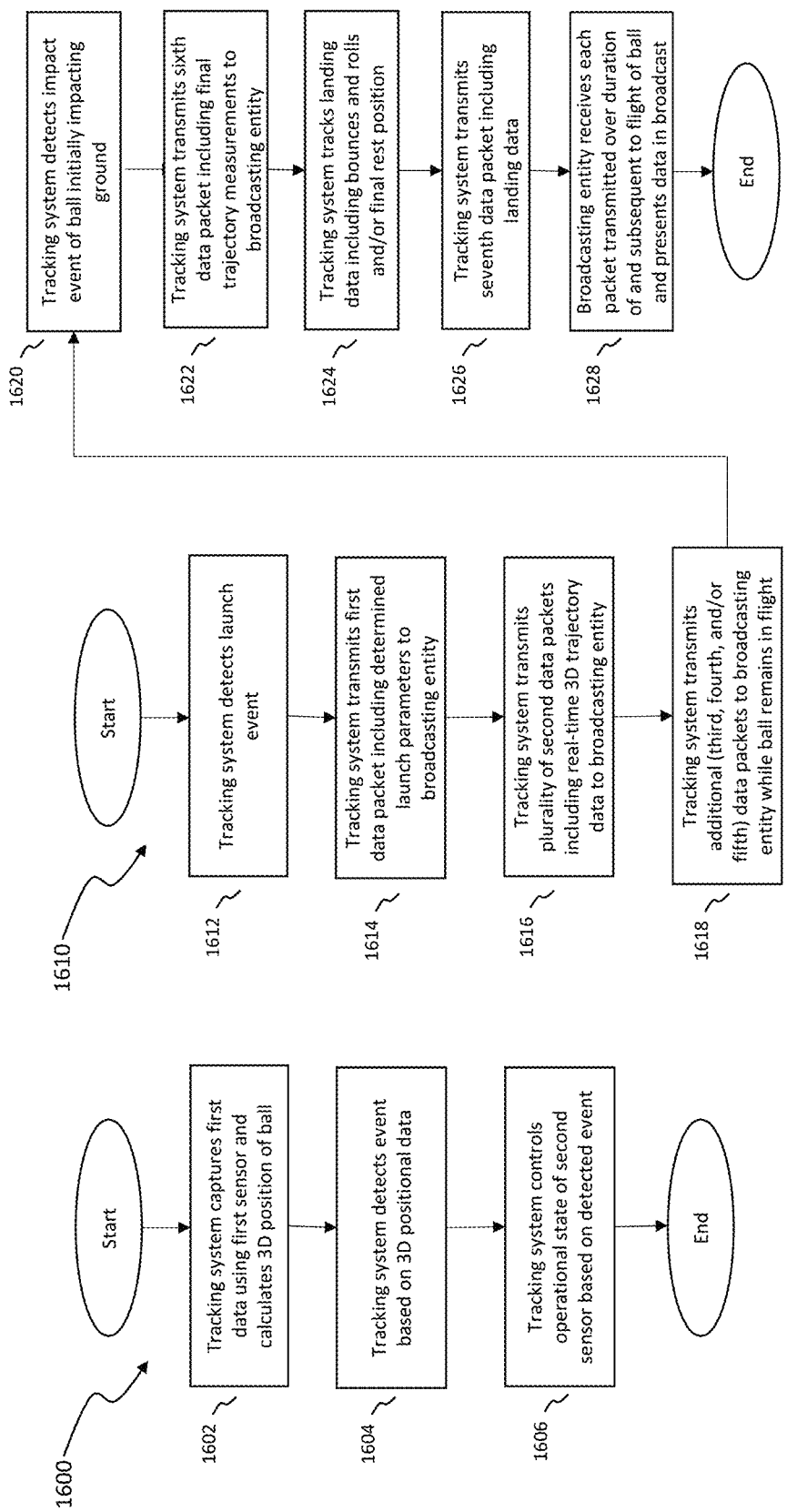

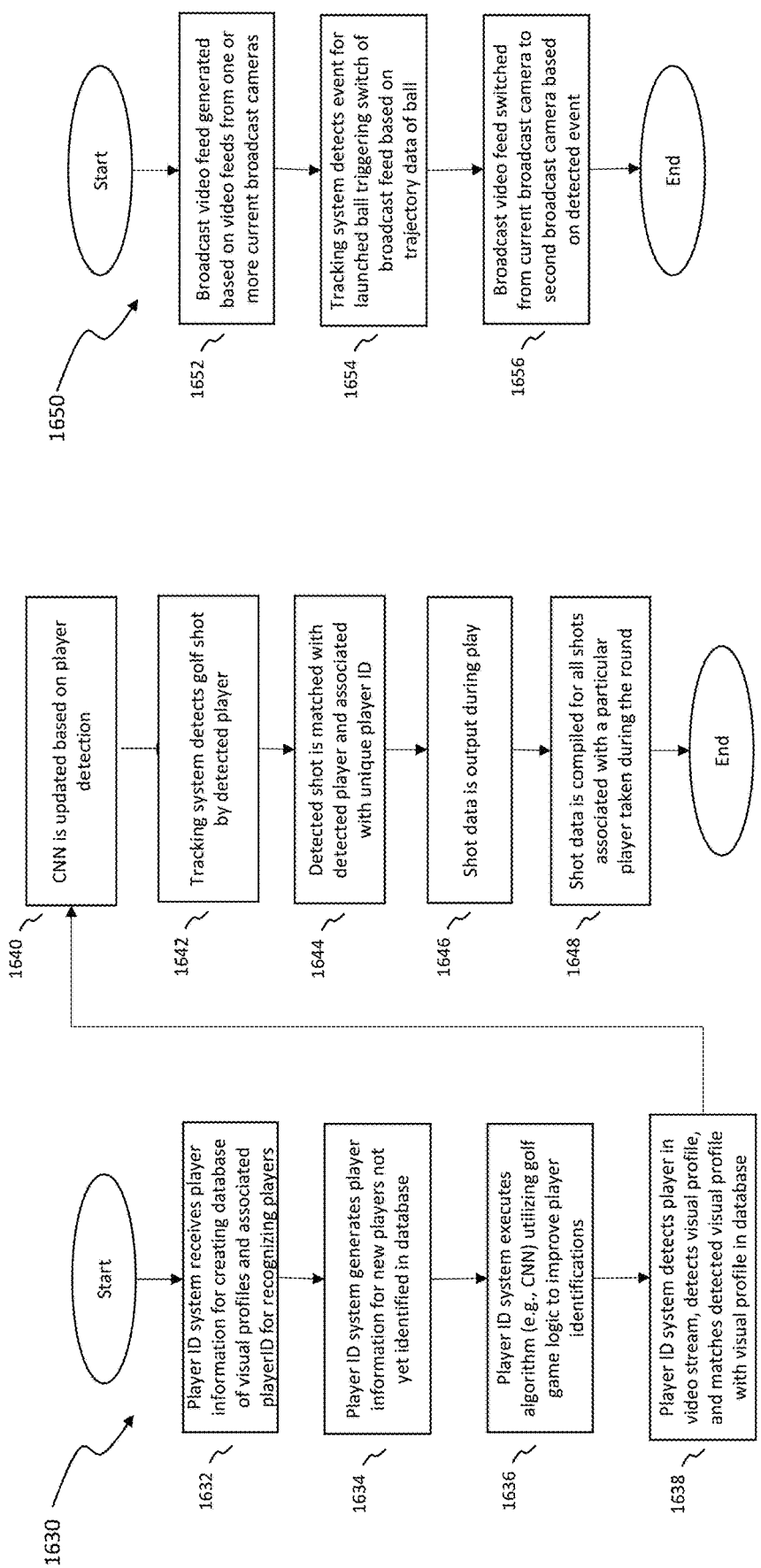

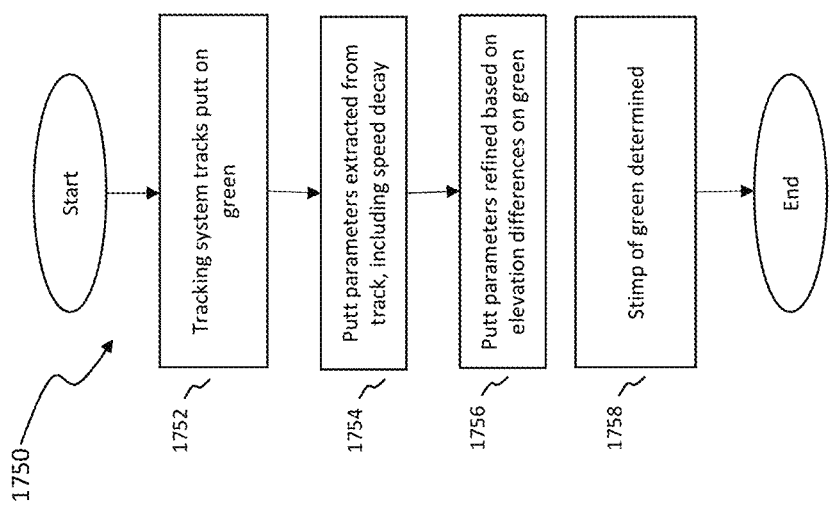

SYSTEM AND METHOD FOR PLAYER'S IDENTIFICATION

PRIORITY CLAIM

The present application claims priority to U.S. Provisional Patent Application Ser. No. 63/200,425 filed Mar. 5, 2021 and U.S. Provisional Patent Application Ser. No. 63/202,850 filed Jun. 27, 2021. The specifications of the above-identified applications are incorporated herewith by reference.

FIELD

The present disclosure relates to systems and methods for tracking objects including golf balls and golf players during a golf event and determining statistics for use in a broadcast of the golf event.

BACKGROUND

Detailed statistics for golf shots can be captured during amateur play or during professional tournaments, such as PGA TOUR events. For example, radar-based tracking systems can be used to capture shot data for tee shots while the ball is in flight. However, many systems currently in use are incapable of determining more advanced shot metrics, including, e.g., a final rest position for the ball after bounces and rolls. For professional tournaments, these determinations are currently performed manually by human operators using, e.g., laser range finders. This is a very labor-intensive tasks that typically requires several hundred operators. In addition to the generation of certain shot data, many operations performed during a successful and visually pleasing broadcast of a golf event require extensive manual input from human operators.

SUMMARY

The present disclosure relates to a system, method and a processing arrangement for player's identification. The system includes a database configured to store profiles for each of a plurality of sports players, each profile comprising identifying information for one of the players and a playerID associated with the one of the sports players; a tracking arrangement configured to capture shot data corresponding to trajectories of sports balls launched by the sports players; a motion sensor device configured to capture motion data corresponding to a swinging motion of a player or ball striking implement; and a processing arrangement coupled to the database, the tracking arrangement and the motion sensor device configured to: detect a first swing of a first sports player from the motion data captured by the motion sensor device, the first sports player being associated with a first playerID; associate the first swing of the first sports player with a first timestamp and a first location detected for the first swing; and associate a first trajectory of a sports ball from the shot data captured by the tracking arrangement corresponding to a first shot corresponding to the first swing based on the first timestamp and the first location.

BRIEF DESCRIPTION

FIG. 4 shows an exemplary tracking unit 400 containing a radar system 405 and/or a camera system 410 and/or a lidar system 415 according to various exemplary embodiments.

Figure 5C:
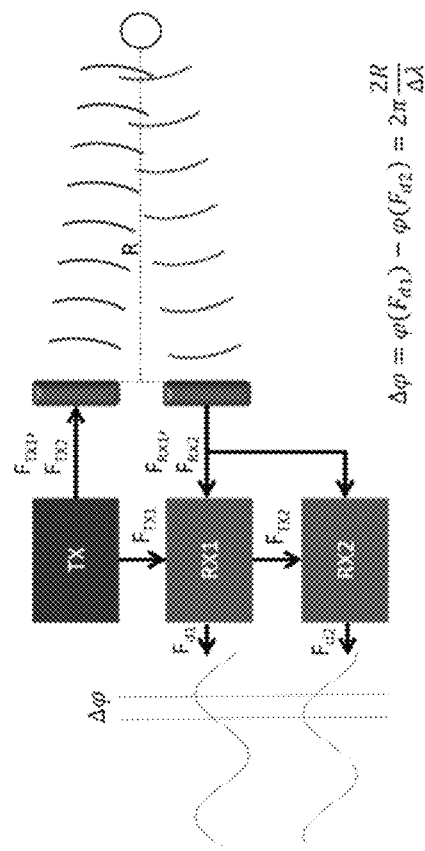
Figure 5A:
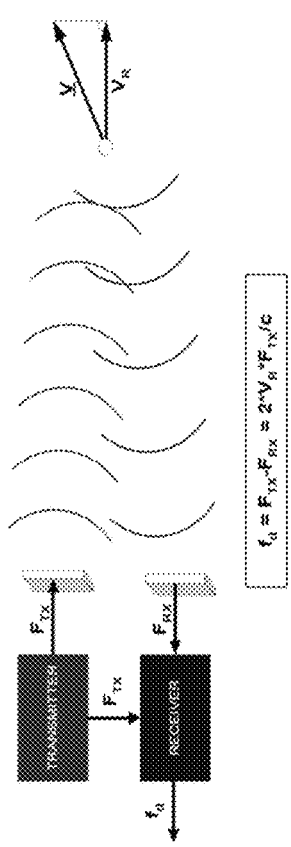

FIG. 5a shows an example of a first principle of MFCW Doppler radar tracking.

Figure 5B:
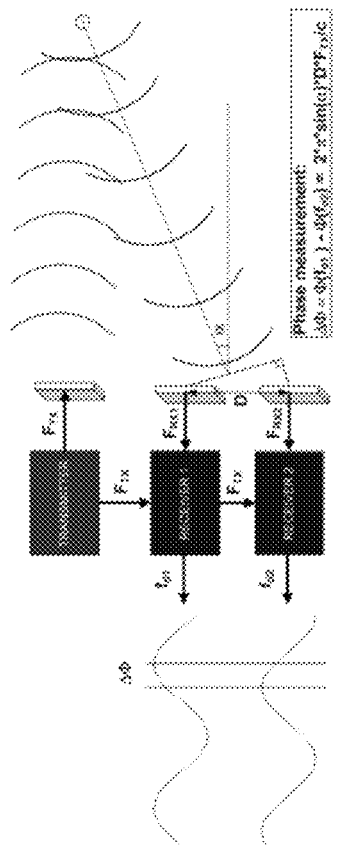

FIG. 5b shows an example of a second principle of MFCW Doppler radar tracking.

FIG. 5c shows an example of a third principle of MFCW Doppler radar tracking.

Figure 6:
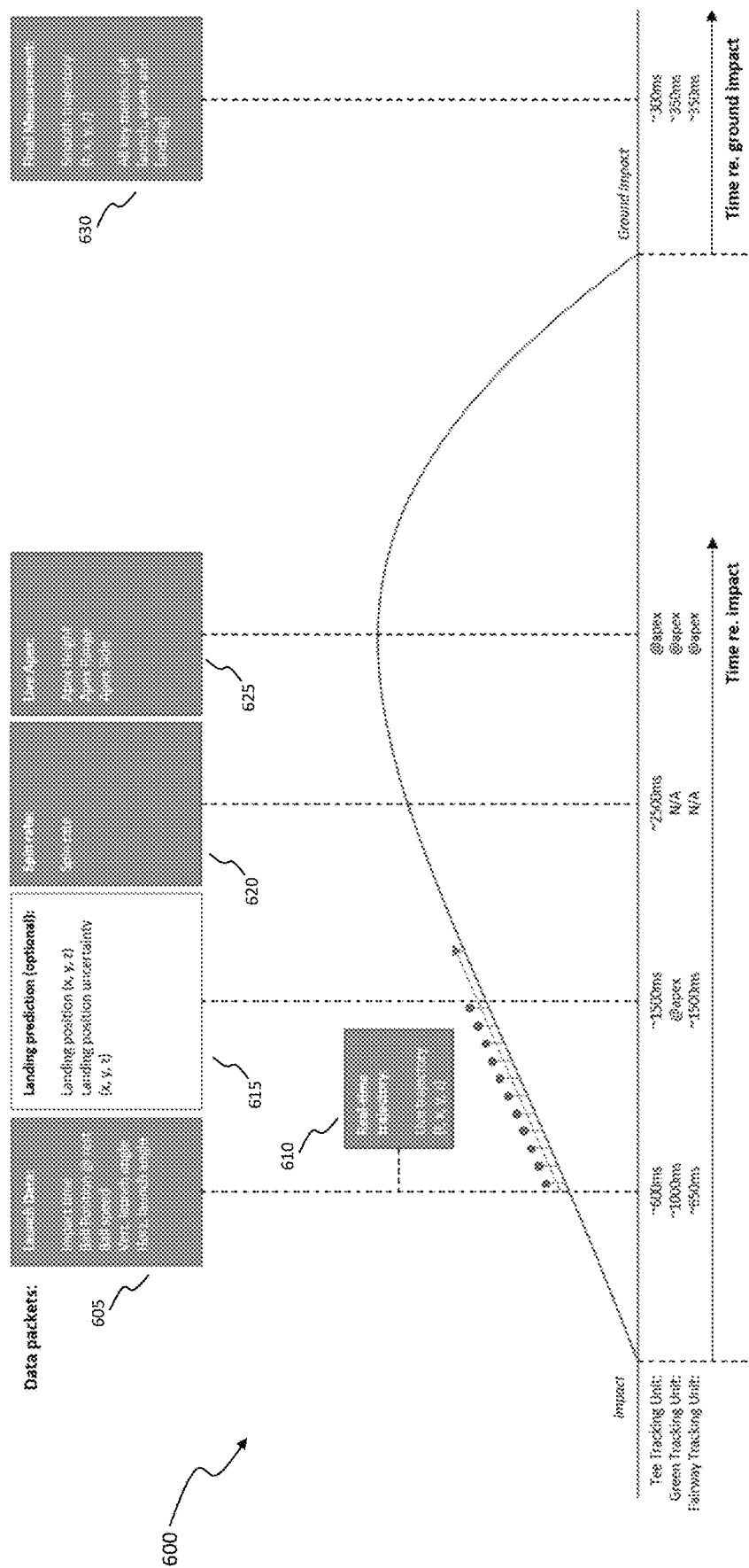

FIG. 6 shows a diagram 600 of exemplary data packets 605-630 including certain data for a golf shot transmitted to a broadcast entity and/or other applications during real-time data acquisition for the golf shot according to various exemplary embodiments.

Figure 7:
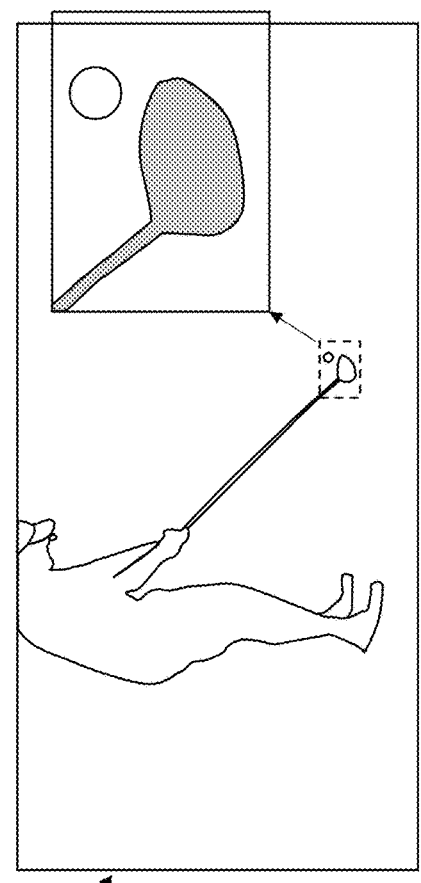

FIG. 7 shows exemplary images 700 of a club head from a position behind the player.

Figure 8B:
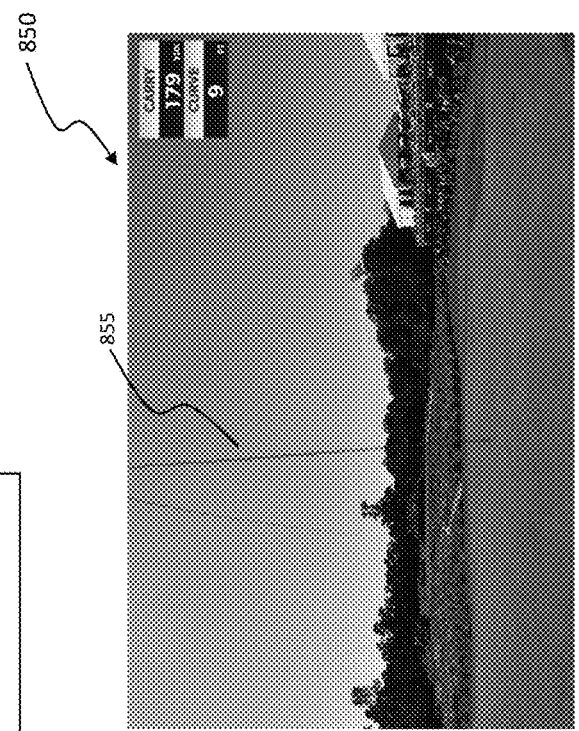
Figure 8A:
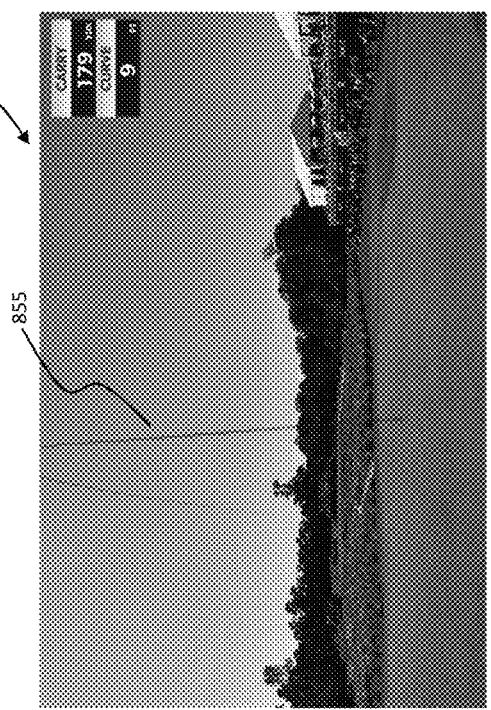

FIG. 8a shows a first image 800 from a video feed depicting a shot including an overlay of the shot trajectory, i.e., a first tracer 805 for the shot, and some associated trajectory data.

FIG. 8b shows a second image 850 from a video feed depicting a shot including an overlay of the shot trajectory, i.e., a second tracer 855 for the shot, and some associated trajectory data.

Figure 9:
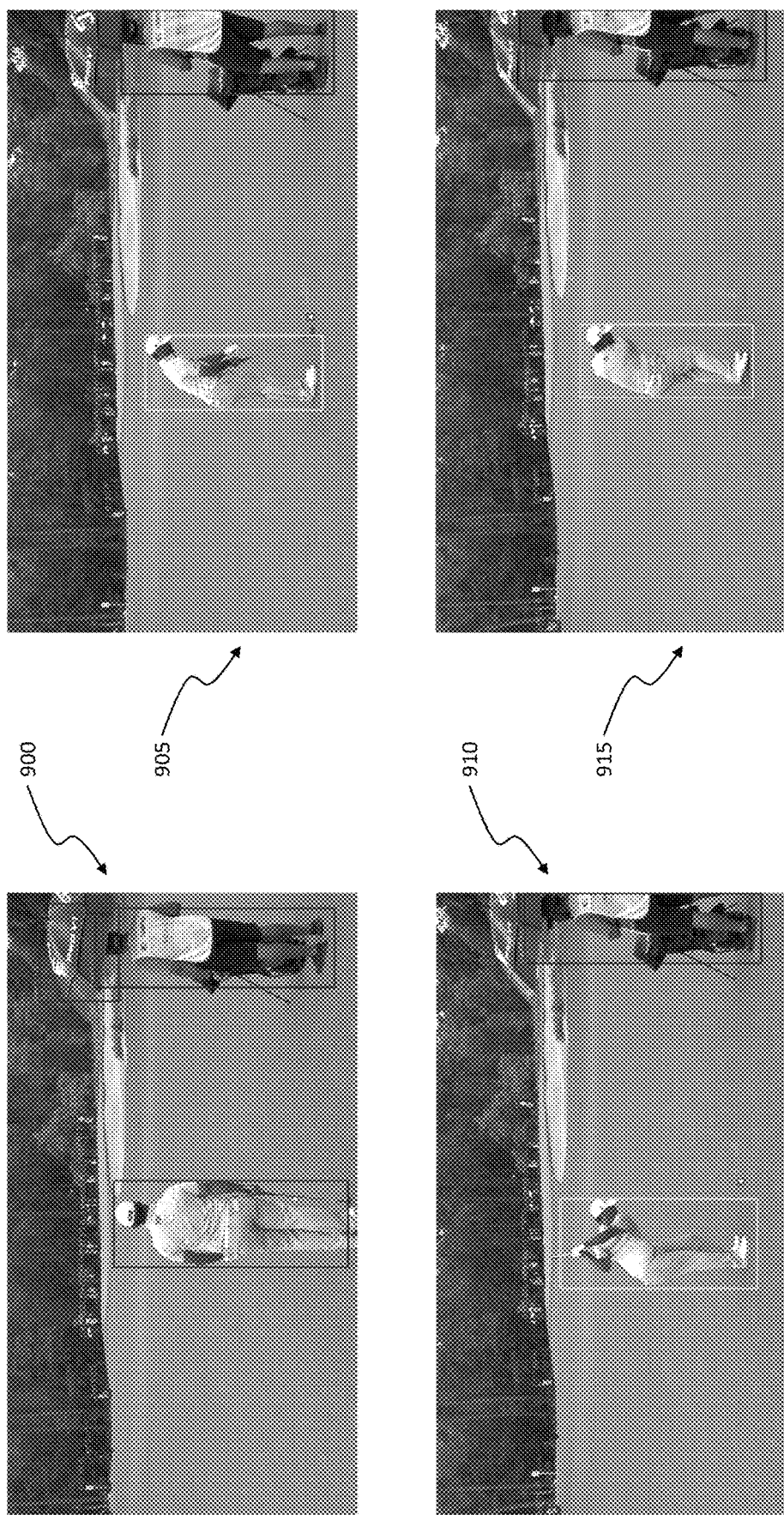

FIG. 9 shows exemplary images 900-915 that can be analyzed by a neural network to detect events related to a player swing.

Figure 10B:
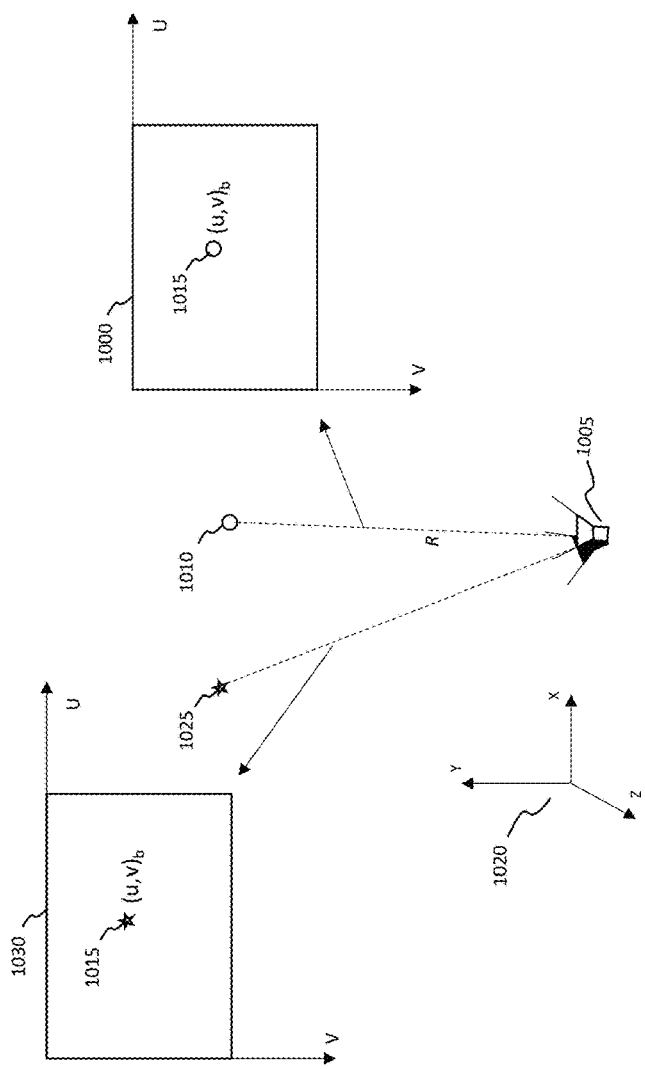
Figure 10A:
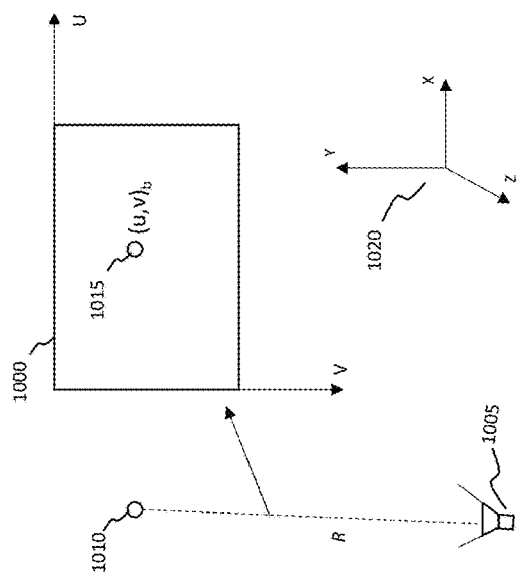

FIG. 10a shows an exemplary image 1000 captured by a robotic camera 1005 for determining an orientation of the robotic camera 1005 in world coordinates 1020.

FIG. 10b shows a process for determining an orientation of the robotic camera 1005 based on the first image 1000 of FIG. 10a and a second image 1030 captured by the robotic camera 1005 using a different orientation.

Figure 10C:
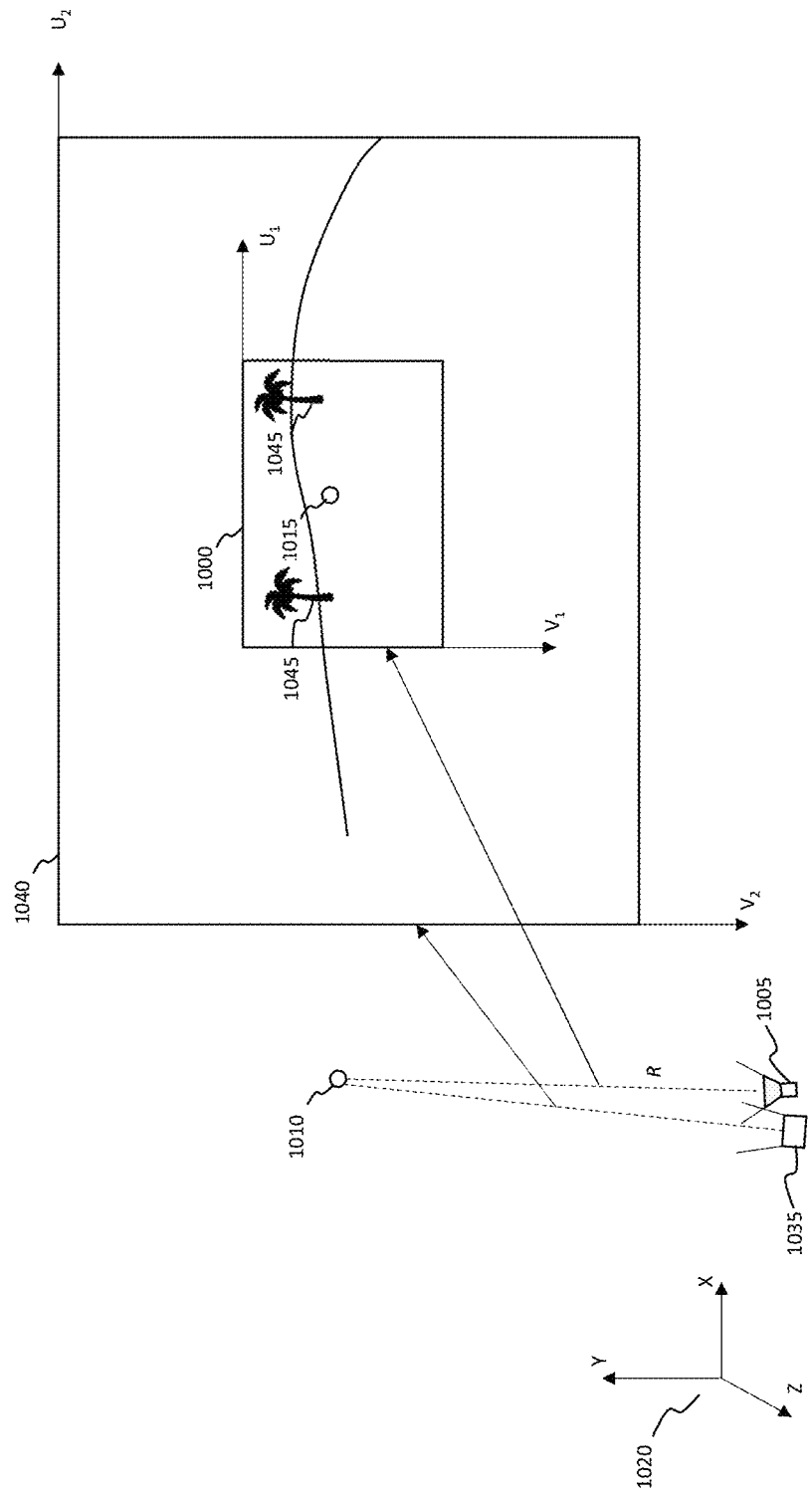

FIG. 10c shows a process for determining an orientation of the robotic camera 1005 based on the first image 1000 of FIG. 10a and a second image 1040 captured by a second camera 1035.

Figure 10D:
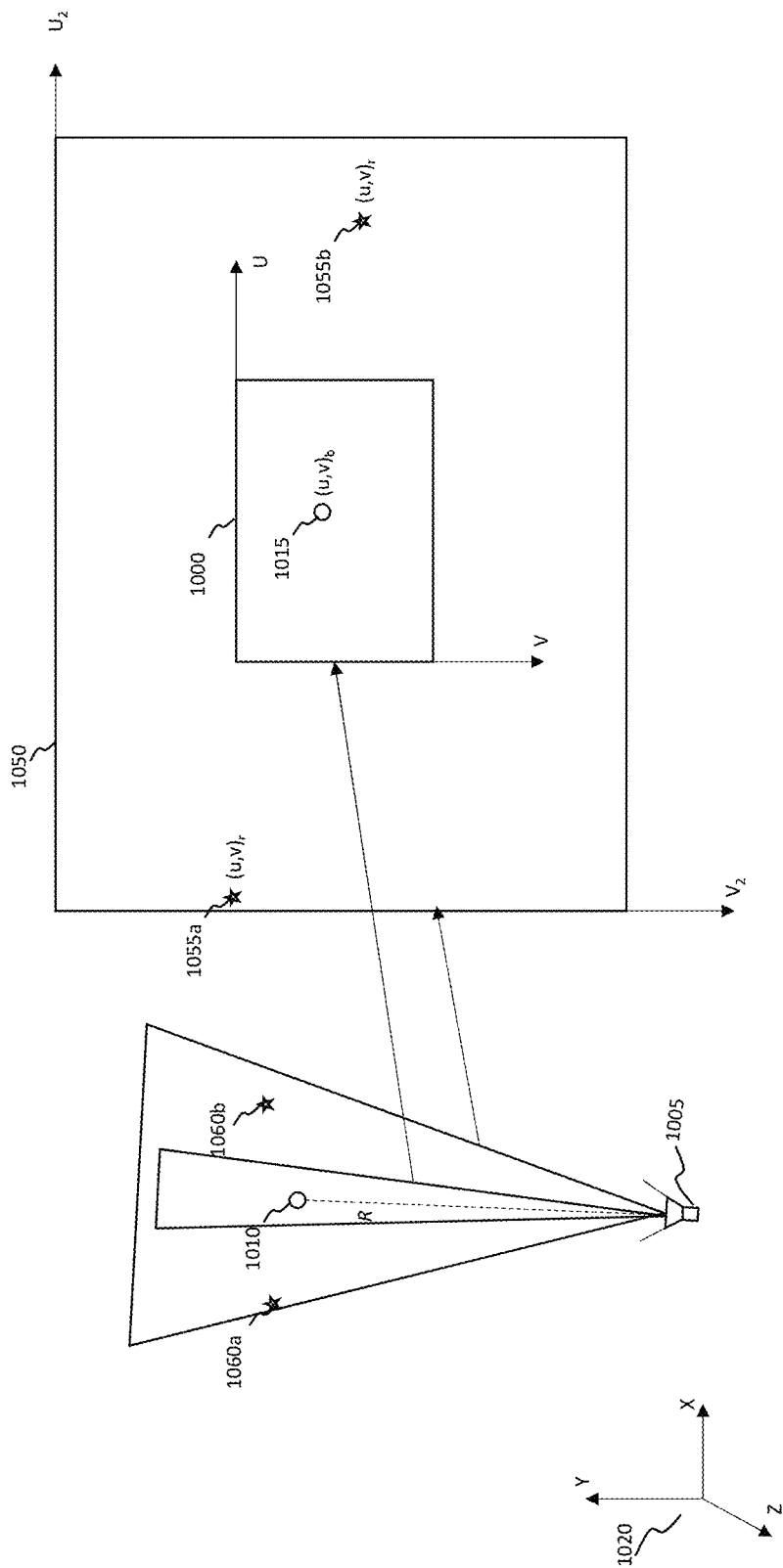

FIG. 10d shows a process for determining an orientation of the robotic camera 1005 based on the first image 1000 of FIG. 10a and a second image 1030 comprising a zoomed out version of the first image 1000.

Figure 11:
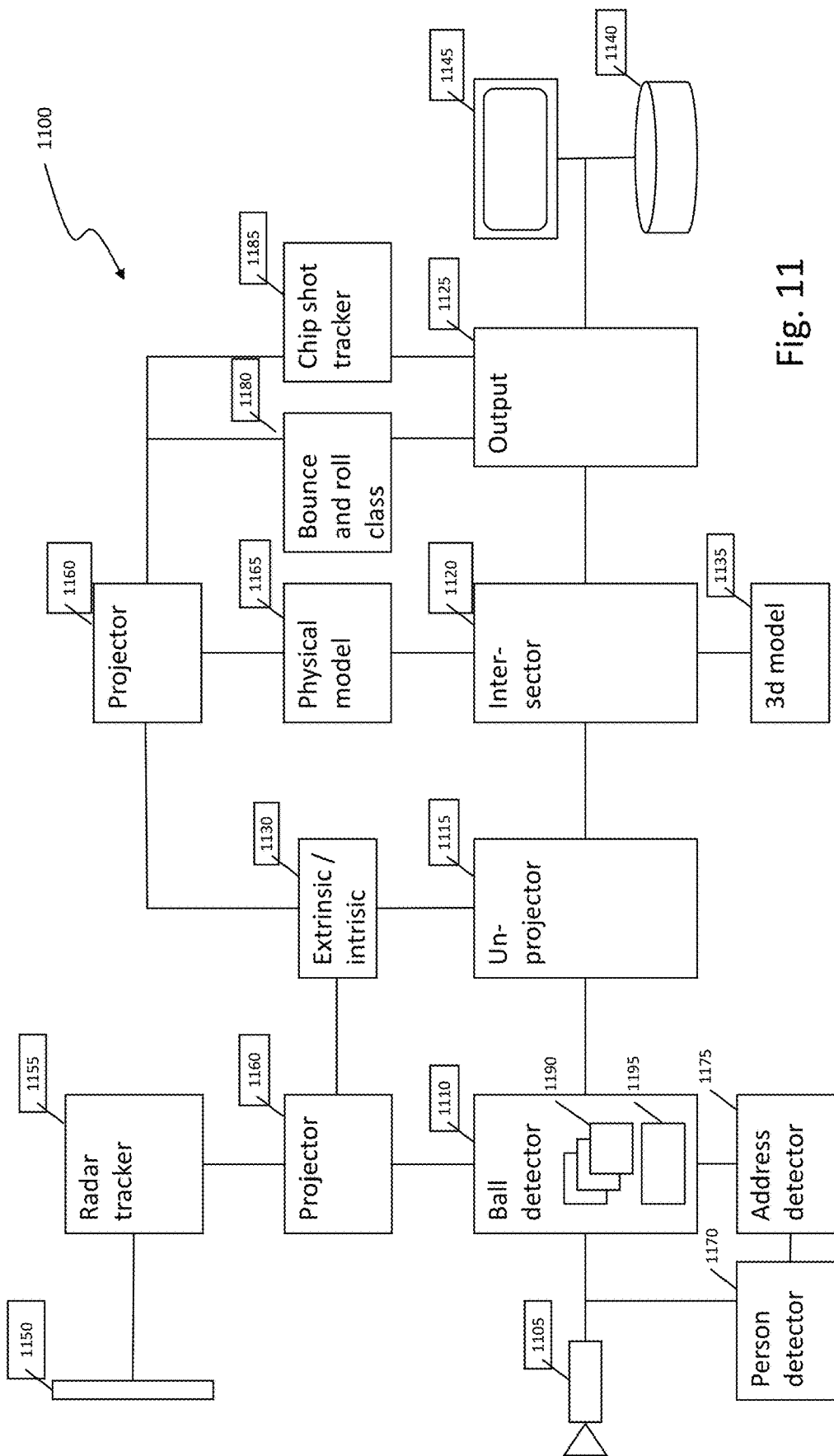

FIG. 11 shows an exemplary tracking system 1100 including at least one camera 1105 capturing a sequence of images of a ball including the ball at rest and a processing arrangement for tracking the ball and/or determining a position of the ball at rest according to various exemplary embodiments.

Figure 12:
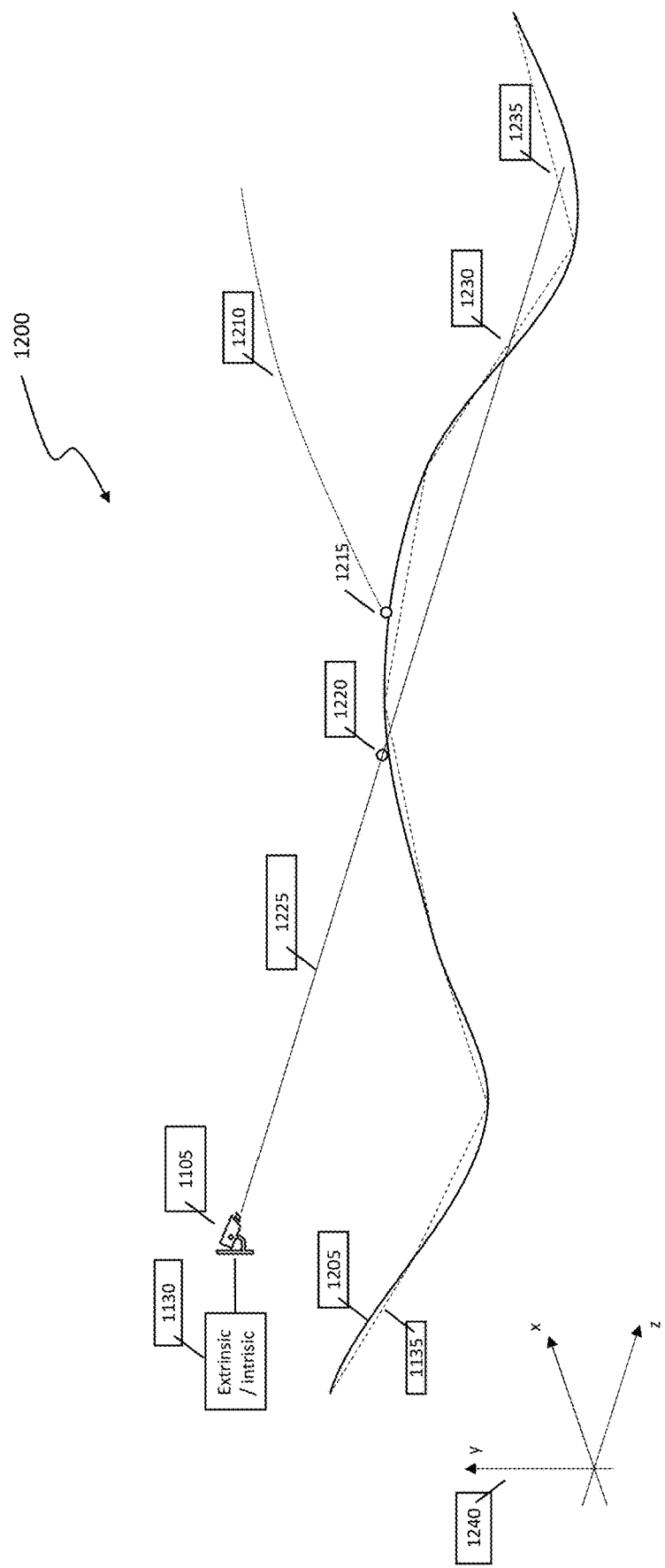

FIG. 12 shows an exemplary diagram 1200 including the camera 1105, the terrain 1205 of the golf course and the corresponding 3D model 1135 overlaid on the golf course terrain 1205 according to various exemplary embodiments.

Figure 13:
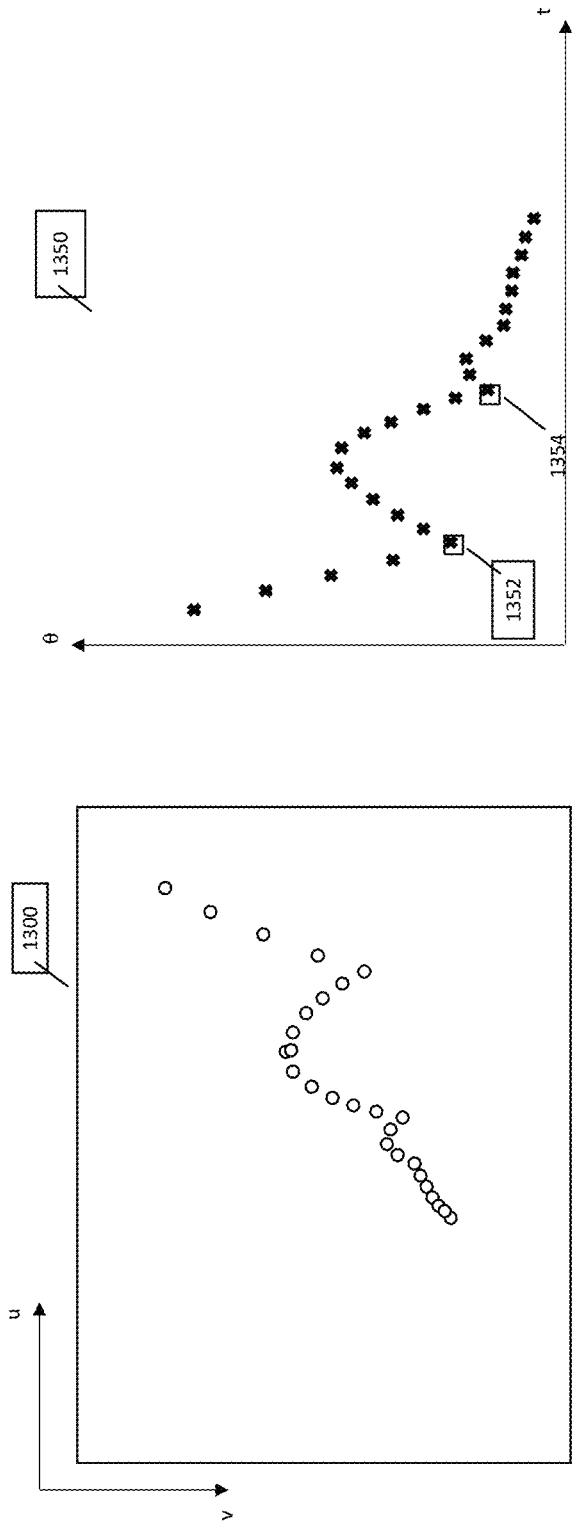

FIG. 13 shows a time-series 1300 of ball detections in the (u,v) image plane from a sequence of images and a corresponding time-series 1350 of elevation angles for the camera-ball lines determined by the un-projector 1115 described in FIG. 11.

Figure 14:
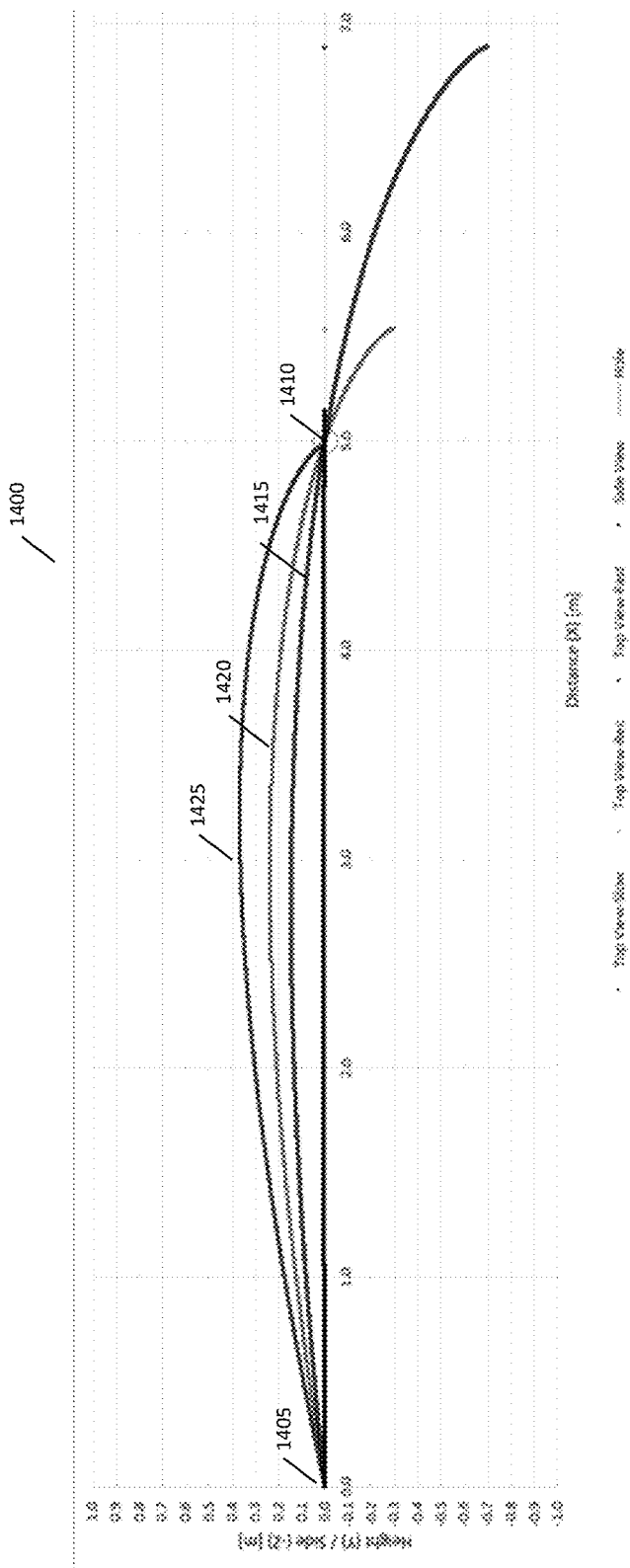

FIG. 14 shows a plot 1400 including a starting position 1405, a hole position 1410, and lines 1415-1425 representing possible putt trajectories that result in a successful putt.

Figure 15:
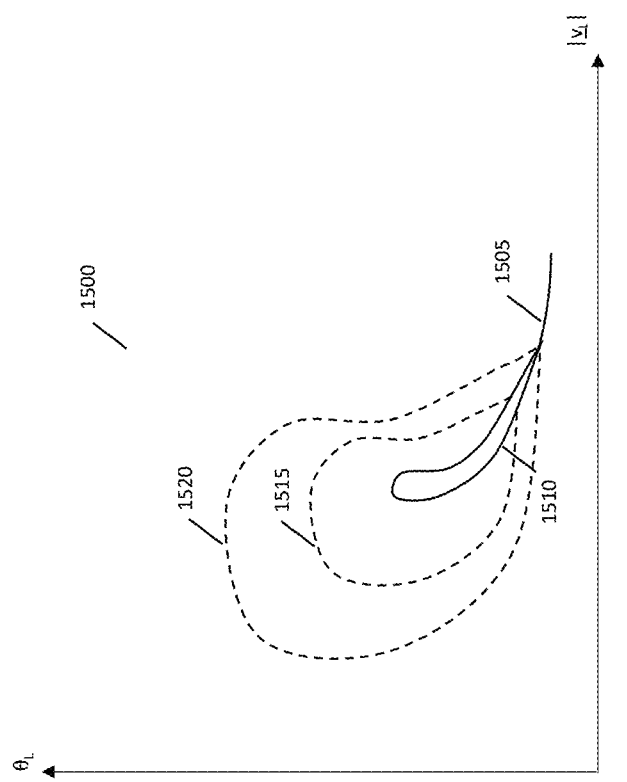

FIG. 15 shows the putt break fan 1500 as a diagram of launch direction and launch speed combinations for a putt resulting in a successful putt 1510, and contour lines 1515,

1520, showing launch direction and launch speed combinations resulting in ball locations with equal distance to the pin for a second putt.

FIG. 16a shows an exemplary method 1600 for tracking a three-dimensional position of a ball launched during play on a hole of a golf course, the tracking being performed using data from both a first sensor and a second sensor, wherein the operation of the second sensor is controlled based on 3D positional tracking information determined from data captured by the first sensor.

FIG. 16b shows a method 1610 for transmitting tracking data for inclusion in a broadcast according to various exemplary embodiments.

FIG. 16c shows a method 1630 for player identification and associating shot data with a particular player profile associated with a unique playerID according to various exemplary embodiments.

FIG. 16d shows a method 1650 for automatic broadcast feed switching according to various exemplary embodiments.

Figure 16G:
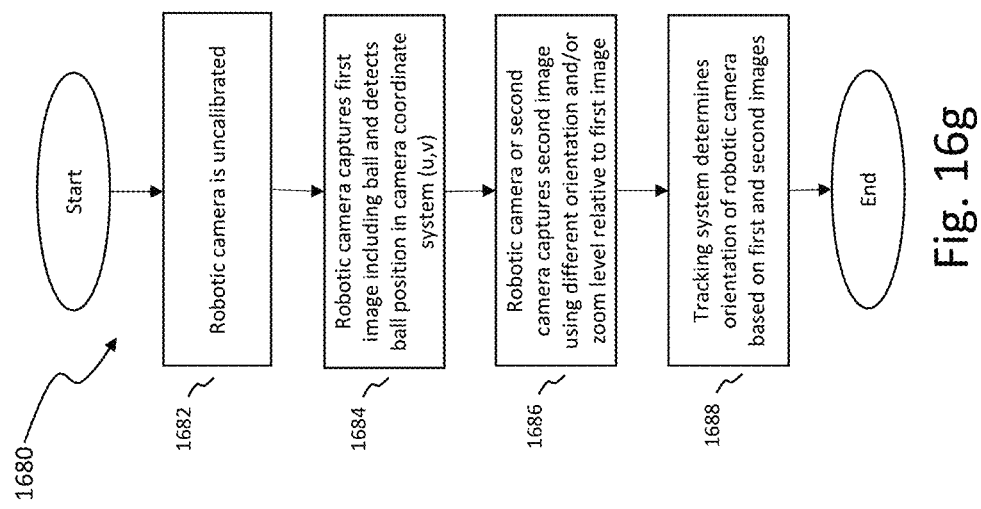
Figure 16F:
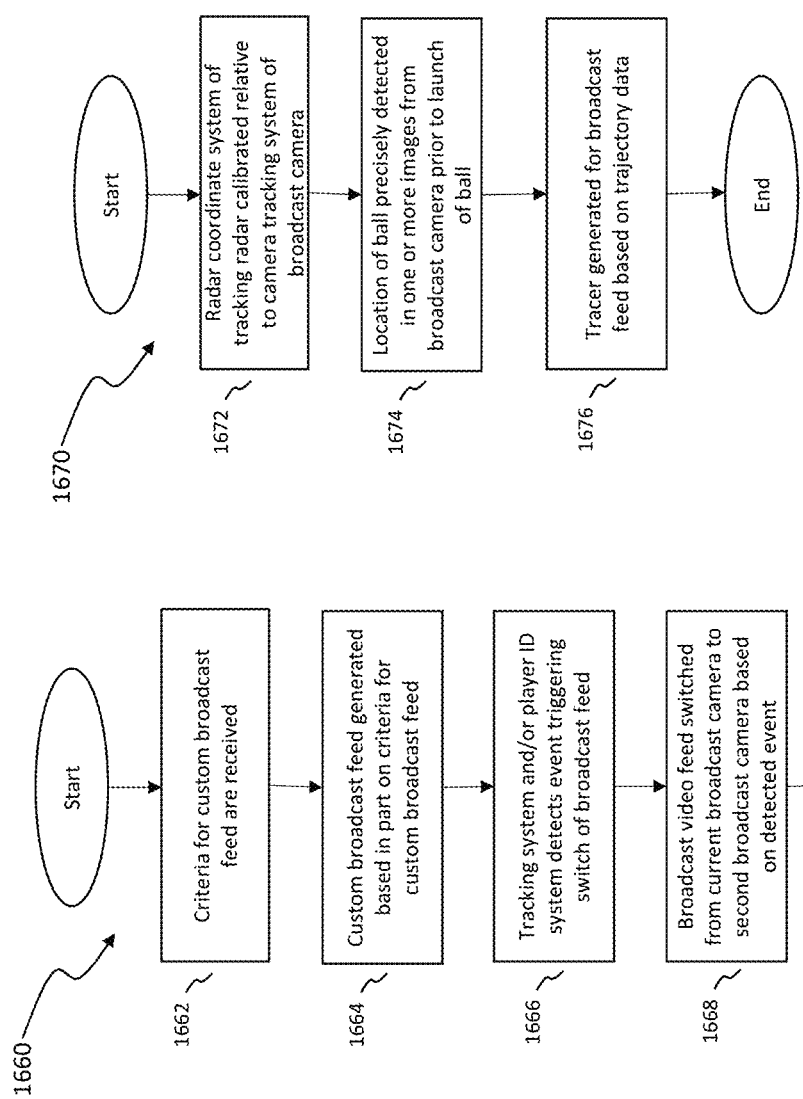
Figure 16E:
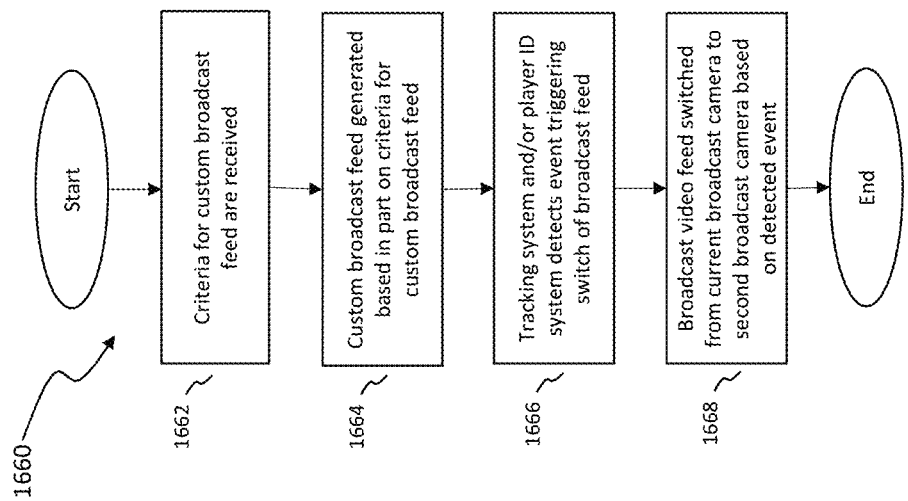

FIG. 16e shows a method 1660 for automatic production of custom (e.g., individualized) broadcast feeds according to various exemplary embodiments.

FIG. 16f shows a method 1670 for automatically inserting tracers into a broadcast feed according to various exemplary embodiments.

FIG. 16g shows a method 1680 for calibrating a robotic camera to a world coordinate system according to various exemplary embodiments.

Figures 16H, 17A:
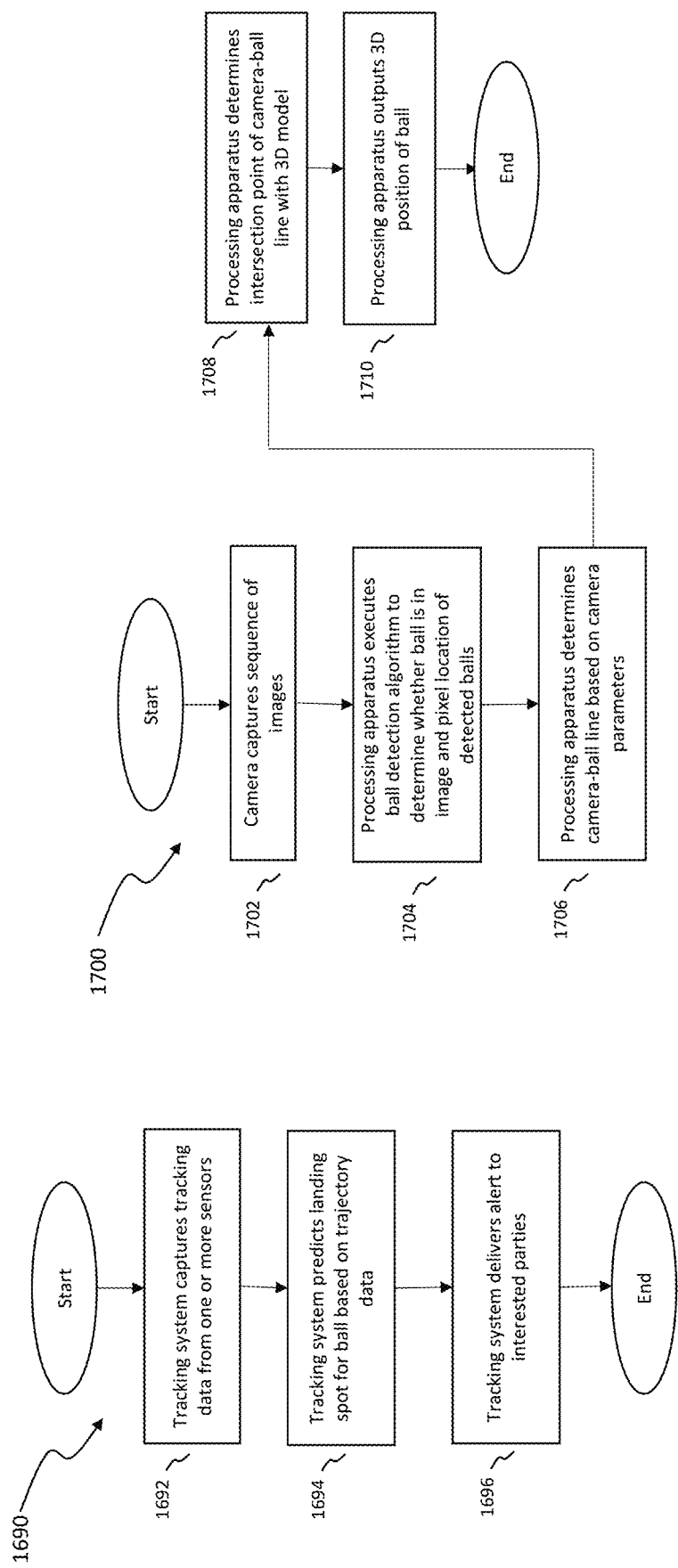

FIG. 16h shows a method 1690 for a warning system for on-site spectators according to various exemplary embodiments.

FIG. 17a shows a method 1700 for determining 3D positional coordinates of a ball according to various exemplary embodiments.

Figure 17C:
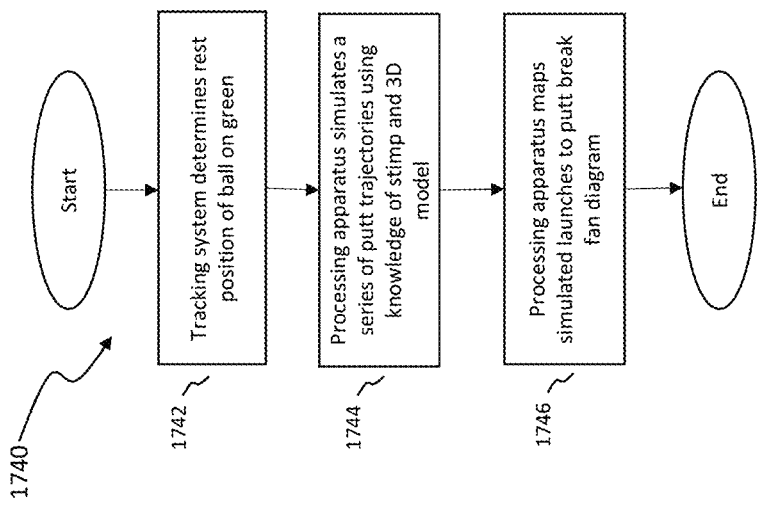
Figure 17B:
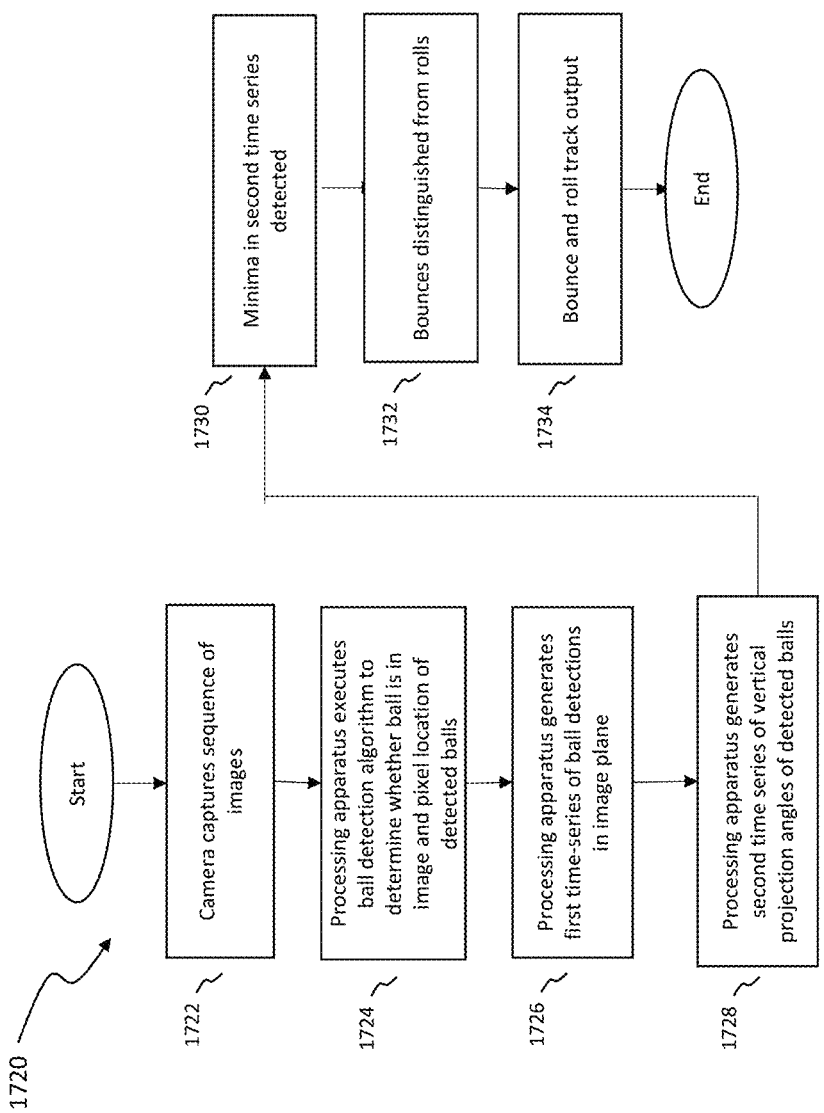

FIG. 17b shows a method 1720 for determining bounces and rolls of a moving ball based on image data according to various exemplary embodiments.

FIG. 17c shows a method 1740 for determining information for an upcoming putt according to various exemplary embodiments.

FIG. 17d shows a method 1750 for determining terrain parameters for a putting green based on a tracked putt according to various exemplary embodiments.

DETAILED DESCRIPTION

The exemplary embodiments describe may be further understood with reference to the following description and the related appended drawings, wherein like elements are provided with the same reference numerals. The exemplary embodiments relate to systems and methods for identifying and tracking objects on a golf course, including golf shots, golf clubs and golf players. Multiple techniques are described, relating to different aspects of object tracking, that can, when used in combination, provide full coverage of relevant moving objects on a golf course. According to some aspects, the data generated according to the described techniques can be used to enrich and enhance the live broadcast coverage of a golf event, for example, a PGA TOUR event. Notably, almost all of the described techniques are performed automatically and require little to no manual input from operators on the golf course.

In a typical round of golf, the statistics that are registered may include only the number of shots a player takes on each hole. This shot registration is typically performed manually. During some professional tournaments, including tournaments hosted by the PGA TOUR, more detailed statistics are captured, such as the location and lie of the ball for each shot. In recent years, ball trajectory data from radar-based tracking systems such as the TrackMan system have also been used on the PGA TOUR to capture shot data on tee shots. These systems have generally measured the three-dimensional position of the ball while in-flight until it impacts the ground. The final rest position, however, has generally been determined manually by an operator using a surveyor-type of laser range finder. This determination of the final rest position is very labor-intensive requiring several hundred operators for the tracking of all of the shots through all of the rounds of a typical four-day tournament on the PGA Tour. In some scenarios, volunteers have also been tasked with pressing a button on a hand-held device to capture the time of shots being made in a tournament.

The embodiments according to the present disclosure enrich the dataset compared to the existing methods for capturing data during professional tournaments, enhance the captured data, and automate many of the tasks currently performed manually. These solutions, automating almost all of the operations during professional tournaments, may also be applied to any golf course, making the same or similar data available for amateur golfers playing on local golf courses.

The embodiments according to the present disclosure perform fully automatic or semi-automatic tracking for every shot on a golf course and assign each golf shot to a unique playerID, so that all shots from the same player are tagged with the same playerID that is unique to that player. In addition to tracking the flight, bounce and roll of each golf shot from its launch location to its rest location, various key tags are collected by the tracking system for each shot, including: the number or other identifier for the golf hole being played, data regarding a lie of ball, the shot number (e.g., the number of shots taken by the player on this hole up to and including the current shot), the impact time at which the shot was made, the type of club used for the current shot, and environmental conditions like wind and temperature.

A system according to the present disclosure can automatically record every shot taken by every player during a golf round. Those skilled in the art will understand that certain systems may also receive manual input when that is desired. For example, in tournament play, cameras may be moved into the fairway behind a player lining up a current shot (e.g., the camera will be further from the hole than the ball the player is lining up to hit). This camera may be positioned manually and automatically calibrated, as will be described in greater detail below, and tracking information may be inserted into images from the camera or derived from images from the camera. In addition, such a manually positioned camera may also include a mobile unit providing further tracking information to the system. As would be understood by those skilled in the art, manually re-positioning or aiming a camera (and any attached radar or other tracking unit) can be seamlessly integrated with automated tracking and imaging operations as desired to create a semi-automated tracking system.

Recording every shot during a golf round provides a complete and attractive data set for players and/or third parties. However, it should be understood that the present solutions can also be used only for parts of a golf round, such as a few complete golf holes, selected tee shots, etc. as desired. Additionally, the recording and/or dissemination of this data may be performed for only a selected group of golfers or even for a single golfer and may be provided, for example, as an additional service (e.g., for an additional fee).

To be described in detail below, a player identification system may be used to track individual players and associate data relevant to that player, e.g., shot data captured during play, to the individual player. Golf ball and/or golf club statistics captured during play can be associated with a specific golfer with a unique playerID. Captured statistics can include any information relevant to the game of golf such as: carry location, final rest position, trajectory including bounce and roll, ball launch data (speed, angles, direction, spin rate and spin axis), shot number on a hole, hole number, lie of ball for each shot, impact time, clubs used, swing data, etc. Of course, data from such a system may also be aggregated and used to evaluate different ball and/or club types under various conditions and/or with different player anatomies or swing types, etc. Such aggregated data may also be used to evaluate course design (or re-design) and/or to select tee and pin placements.

According to some embodiments, the full course tracking system can be used during a professional golf tournament to enrich a broadcast of the event by providing real-time data that can be overlaid on the broadcast feed, including, e.g., tracers for shots, advanced shot metrics, landing predictions, etc. This information may also be made available to players for their use in improving their games or for evaluating differences in execution between practice and tournament conditions. However, the same system can also be used during any amateur golf round, whether during a golf tournament, a practice round, or any other time. During amateur rounds and practice rounds, the groupings of golfers and schedule for play might be available to the system, e.g., via a tee booking system or similar, or this information might not be available. In scenarios where the tracking system is available to golfers during a non-scheduled tee time, the system may include some mechanism for receiving consent from the golfer prior to tracking the play of the golfer. This consent may be given before a round or, in some cases, after the round.

The exemplary embodiments described below relate to concepts including: a tracking system for full course tracking (tracking of every shot, or nearly every shot taken during a round of golf or even an entire multi-round tournament); tracking unit devices that can be used in the tracking system, including specifications and operations for radar-based, camera-based, lidar-based, and/or other sensors operable to identify and/or track golf shots and/or golf clubs; tracking unit devices and operations that are specifically configured for tracking bounces and rolls of golf shots; calibration schemes for the tracking units and/or other sensors; a broadcast system for broadcasting a video feed of a golf event that can operate in coordination with the tracking system, including calibrations of the broadcast cameras with the sensors of the tracking system; a player identification system; an automated broadcast feed that can be tailored for specific players; automatic tracers; automatic detections of player events, including when a player is about to take a shot; calibration and control of robotic cameras based on real-time tracking data provided by the tracking system; a safety/warning system for onsite spectators; a scheme for amateur round tracking; and non-fungible token (NFT) generation. Throughout the description, power-saving schemes will be described wherein, for example, a tracking unit and/or sensor are triggered to power-on based on, e.g., tracking data provided by a different tracking unit indicating an object will be entering the field of view of the powered-off tracking unit. In some preferred embodiments, a world coordinate system and a common time reference used for time-synchronization is used by the tracking system for the entire golf course to, for example, enable the rapid transfer of data from one sensor into the local coordinate system of another sensor.

System Overview

The present disclosure relates to a tracking system comprising multiple tracking units distributed around the entire golf course. The arrangement of the tracking units can depend on multiple factors, including, e.g., the layout of the hole, the capabilities of the tracking unit, the desired tracking coverage of the hole, or other considerations to be explained in detail below. It should be understood that the term "hole," as used herein, may relate to the entirety of the golf hole including, e.g., a tee box, fairway, rough, green, hazards, bunkers, etc., in accordance with common golf terminology. The actual hole located on the green, into which the golf ball is ultimately intended to be sunk and marked by a flag, may be referred to as a "cup" herein, although common golf terminology may also refer to this feature as a "hole." Those skilled in the art will understand the distinction between the broader definition of "hole" encompassing the entirety of the golf hole and the narrower definition of "hole" encompassing only the cup located on the green and marked by a flag.

Figure 1:
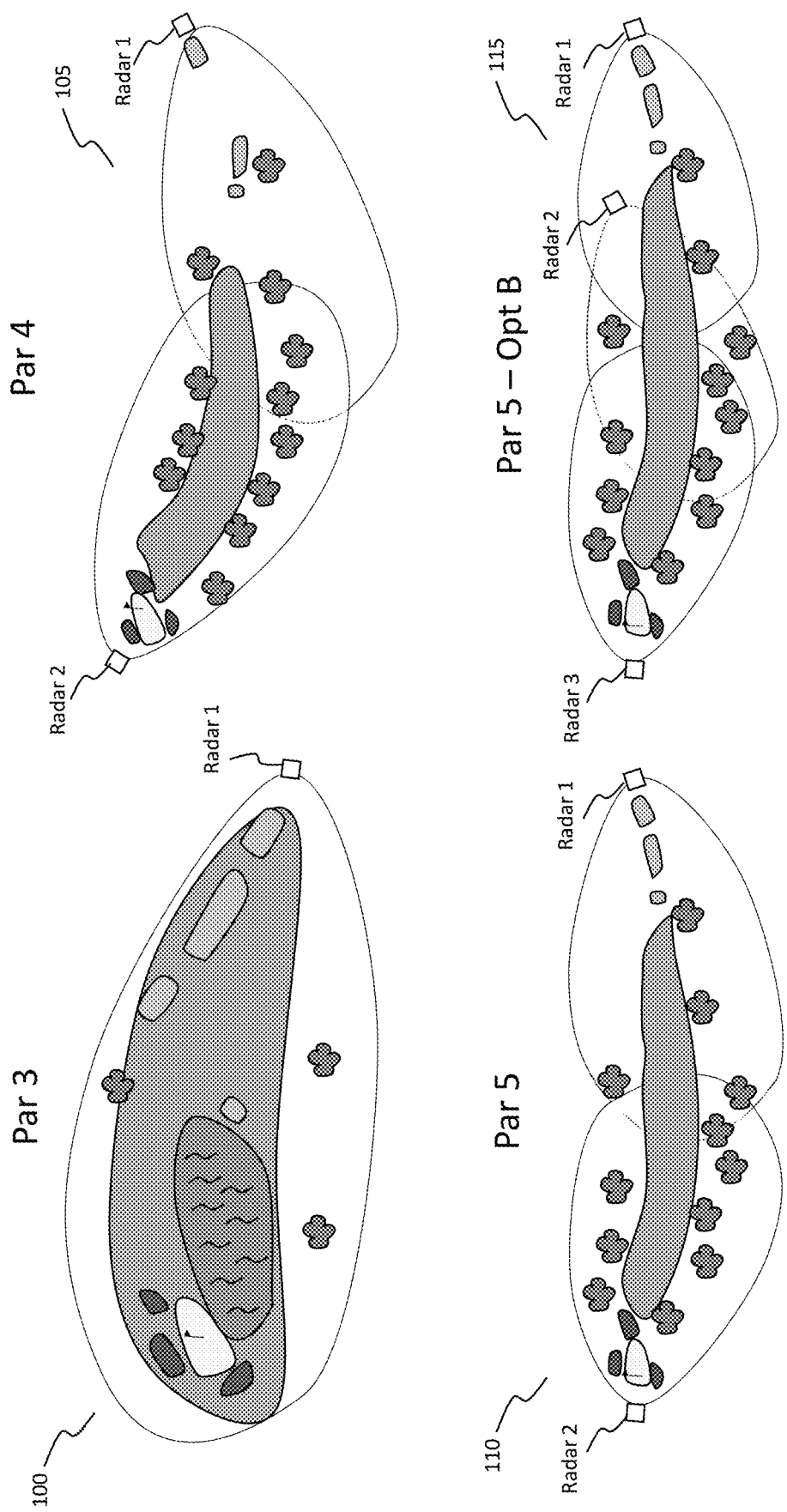
FIG. 1 shows exemplary layouts 100-115 for the tracking units of four exemplary holes.

FIG. 1 shows exemplary layouts 100-115 for the tracking units of four exemplary holes. As shown in FIG. 1, the configuration of system components for each of the holes depends on the length and the layout of the hole. Typically, each hole will have a first tracking unit located close to the tee box of the hole and, depending on the length and layout of the hole, additional tracking units distributed at different locations to ensure strong tracking coverage at any location at which a golf ball may be expected to be located during play of the hole. It may also be advantageous to place tracking units in positions from which a high degree of accuracy and/or high-quality tracking may be expected to be obtained. Additional tracking units might also be desirable to avoid/minimize occlusion by golfers, trees or other objects preventing line-of-sight of primary tracking units. The layout 100 shows a par 3 hole for which a single tracking unit, in this example, a radar unit (radar 1), is located close to the tee box of the hole. The radar unit in this example can provide full tracking coverage of the entire par 3 hole. The layout 105 shows a par 4 hole for which two tracking units, in this example, a first radar unit (radar 1) and a second radar unit (radar 2), are located close to the tee box of the hole and close to the green of the hole, respectively. The two radar units in this example can provide full tracking coverage of the entire par 4 hole. The layout 110 shows a par 5 hole for which two tracking units, in this example, a first radar unit (radar 1) and a second radar unit (radar 2), are located close to the tee box of the hole and close to the green of the hole, respectively. The two radar units in this example can provide full tracking coverage of the entire par 5 hole. The layout 115 shows a par 5 hole for which three tracking units, in this example, a first radar unit (radar 1), a second radar unit (radar 2), and a third radar unit (radar 3), are located close to the tee box of the hole, along the fairway of the hole, and close to the green of the hole, respectively. The three radar units in this example can provide full tracking coverage of the entire par 5 hole.

Figure 2:
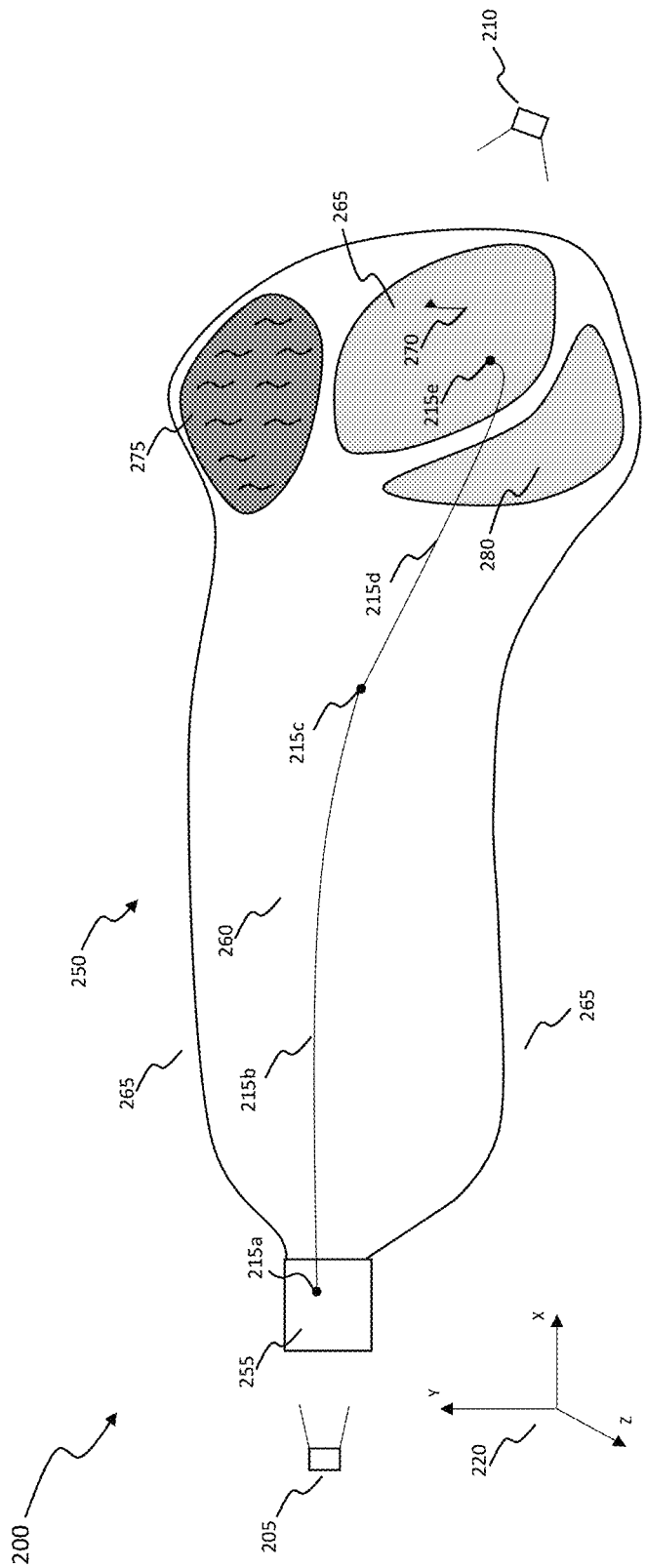
FIG. 2 shows an exemplary diagram 200 for a tracking system of an exemplary golf hole 250 according to various exemplary embodiments.

FIG. 2 shows an exemplary diagram 200 for a tracking system of an exemplary golf hole 250 according to various exemplary embodiments. Each golf hole layout typically includes a tee area or tee box 255, a fairway 260, a green 265 generally surrounding the fairway 260, and a green 265. The green 265 includes the cup into which the golf ball is intended to terminate for a player to complete the golf hole 250, which is marked by a flag 270. In this example, the golf hole 250 additionally includes a water hazard 275 and a bunker 280. The tracking system of the diagram 200 includes a first tracking unit 205 located close to the tee box 255 and a second tracking unit 210 located behind the green 265. As mentioned above, for certain holes, one or more additional tracking units may be distributed at different locations surrounding the hole. The tracking units 205, 210 provide positional and/or motion data of a golf ball 215 and/or a golf club being used, to be described in greater detail below. All positional data may ultimately be determined in a world coordinate system 220, used e.g., for generating tracks across the entirety of the golf course, although some sensors may determine some positional data in a coordinate system specific to a hole and/or a local coordinate system for the sensor, to be described in greater detail below.

The diagram 200 additionally shows an exemplary path of the ball 215 during play of the hole 250. The ball 215 starts at a first rest position 215a on the tee box 255 and is struck along trajectory 215b to a second rest position 215c on the fairway 260. The ball 215 is then struck along trajectory 215d to a third rest position 215e on the green 265. From there, the ball 215 can be putted to the cup marked by the flag 270. The system according to the exemplary embodiments described herein is able to accurately place the ball in motion (215b, 215d) and/or at rest (215a, 215c, 215e). In some embodiments, the first tracking unit 205 may be a tee box (tee area) tracking unit having first capabilities selected for tracking tee shots (e.g., trajectory 215b launched from rest position 215a) and deriving certain information from these tee shots, e.g., launch parameters. The second tracking unit 210 may be a green (green side) tracking unit having second capabilities selected for tracking approach shots (e.g., trajectory 215d launched from rest position 215c and ending at rest position 215e) and/or chips and putts and deriving certain information from these shots, e.g., putting parameters. A third type of tracking unit may comprise a fairway tracking unit having third capabilities selected for tracking shots landing on and launching from the fairway 260, while remaining portable for frequent re-positioning. However, multiple different types of tracking units, including various combinations of sensors and capabilities, may be used, to be described in greater detail below.

Figure 3:
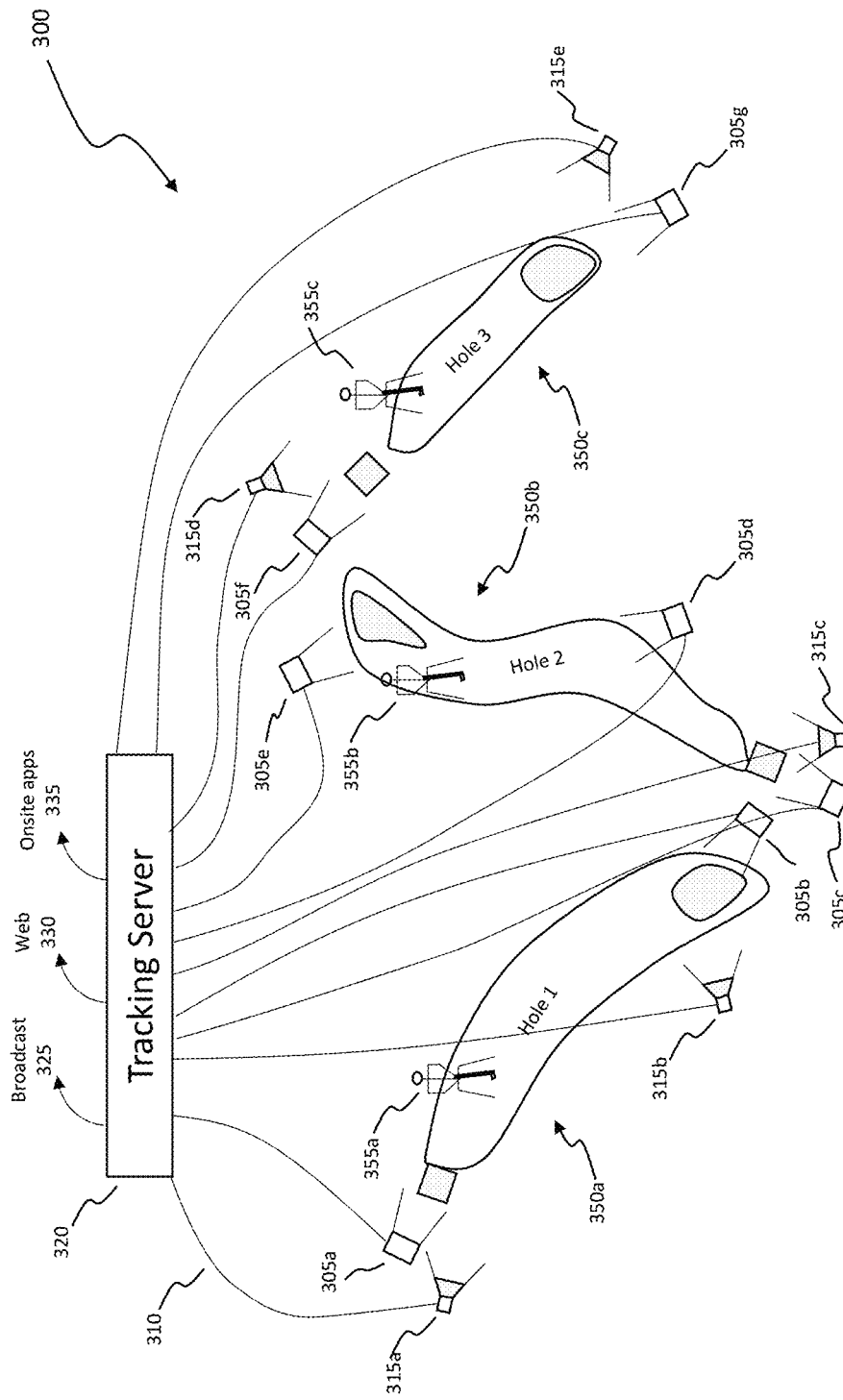
FIG. 3 shows an exemplary diagram 300 for a tracking system of a golf course according to various exemplary embodiments.

FIG. 3 shows an exemplary diagram 300 for a tracking system of a golf course according to various exemplary embodiments. In the diagram 300, only three golf holes 350 are shown, e.g., a first hole 350a (Hole 1), a second hole 350b (Hole 2) and a third hole 350c (Hole 3). However, it should be understood that the principles described for the exemplary diagram 300 can be extended to any number of holes and can encompass an entire golf course including any number of holes, e.g., 9, 18, 27, etc. In the diagram 300, three players 355 are shown, e.g., a first player 355a is shown on the first hole 350a, a second player 355b is shown on the second hole 350b, and a third player 355c is shown on the third hole 350c. To be described in further detail below, the tracking system described herein can, in addition to tracking golf shots, accurately identify the players and associate these players with the golf shots tracked by the system, using, e.g., a playerID. The exemplary tracking system shown in FIG. 3 is additionally equipped for broadcasting a video feed of the golf course, for example when the golf course is used for a professional event such as a PGA TOUR event. However, it should be understood that the broadcasting aspect of the tracking system is optional, and that the tracking system can be used for variety of purposes unrelated to the broadcast of a professional event. Specific techniques related to the broadcast of an event, including data transmissions sent to broadcast (for, e.g., player/shot information/tracking), broadcast camera calibration, automatic feed switching, etc., will be described in greater detail below.

Each hole of FIG. 3 is equipped with a number of tracking units 305 providing tracking coverage of the hole and connected through a wired or wireless connection 310 to a tracking server 320. In this example, a number of broadcast cameras 315 are also placed on each hole that are also connected through a wired or wireless connection 310 to a tracking server 320. The first hole 350a includes a first tracking unit 305a and a first broadcast camera 315a adjacent to the tee box and a second tracking unit 305b and a second broadcast camera 315b adjacent to the hole. The second hole 350b includes a third tracking unit 305c and a third broadcast camera 315c adjacent to the tee box, a fourth tracking unit 305d along the fairway, and a fifth tracking unit 305e adjacent to the hole. The third hole 350c includes a sixth tracking unit 305f and a fourth broadcast camera 315d adjacent to the tee box and a seventh tracking unit 305g and a fifth broadcast camera 315e adjacent to the hole. It should be understood that the location and number of tracking units 305 and broadcast cameras 315 shown in FIG. 3 is provided for exemplary purposes only, and any number of tracking units 305 and broadcast cameras 315 can be used depending on the desired tracking coverage/accuracy, hole layout(s) for the course, and/or the desired broadcast capabilities of the broadcasting entity, e.g., the PGA TOUR.

Additional tracking units, having similar, reduced, or different capabilities than the primary tracking units 305 shown in FIG. 3, may be implemented for full course tracking according to various considerations to be described in detail below. In one example, one or more mobile tracking units used for fairway tracking may have reduced capabilities relative to the tracking units used for the tee area and/or the green. In addition, those skilled in the art will understand that some very short shots (e.g., mishits in locations occluded by spectators, trees, etc.) may not be picked up by the system. To address any possible missed shots, a system may have the ability for the entry of manual corrections/additions. For example, a system might ask each player on completion of a hole to verify the number of shots. In such a situation, although data would not exist for the missing shot(s), scoring would remain accurate.

The tracking processing can be performed either by a processing unit embedded in each tracking unit 305, at the tracking server 320, or through various steps performed in cooperation between an embedded processing unit and the tracking server 320. The tracking server 320 may, for example, be an onsite server or cloud-based processing service. The tracking server 320 includes a processing arrangement and a storage arrangement and is coupled to the tracking units 305, the broadcast cameras 315, and optionally other sensors or devices that may be used in the full course tracking system and/or broadcast system, to be explained in greater detail below. The processing arrangement for the tracking server 320 can include one central processor or a plurality of processors; in some embodiments, the tracking server 320 may process the tracks of dozens or hundreds of objects simultaneously, in addition to various additional functionalities to be described in greater detail below, which would require a relatively high computing power. In some embodiments, the tracking server 320 can also function as or work with a broadcast system providing video coverage of a live event, e.g., a PGA TOUR event, by, for example, outputting/switching of video feeds, audio feeds, etc., to present viewers with a cohesive viewing experience. In other embodiments, the tracking server 320 can provide information to a broadcasting entity responsible for the content to be displayed to viewers. In this scenario, the tracking server 320 and the broadcasting entity may operate in coordination so that live data can be inserted into the broadcast in substantially real-time, to be described in greater detail below.

The tracking server 320 is responsible for associating each ball (in motion or at rest) with an individual player 355 playing that ball, where each player on the course is associated with a unique playerID. The tracking server 320 is additionally responsible for sending the associated ball tracking information, together with the playerID of the player who struck the tracked ball, to various consumers. When the tracking system is used for broadcast purposes, the tracking server 320 can send the tracking information together with the playerID in coordination with broadcast camera data to consumers such as broadcasters 325, web applications 330 and/or on-site applications 335. When the tracking system is used primarily for informative purposes, i.e., is not associated with a broadcast, the information can be, e.g., sent to an on-site database for later retrieval by individual players, sent directly to the individual players via, e.g., a mobile application for a mobile device used by the player, or sent to other interested parties. The player identification system used to identify players and associate those players with data captured by the tracking system will be explained in greater detail below.

Tracking Unit(s)

The exemplary tracking units 305 shown in FIG. 3 can contain one or more sensors, e.g., one or more non-image-based sensors (e.g., microphones, radar and/or lidar systems, etc.) as well as an imaging (e.g., camera-based) system containing one or more cameras. The tracking unit 305 can include non-image-based sensors only, image-based sensors only, or a combination or non-image-based and image-based sensors. For example, a camera system may include multiple camera sensors with different properties such as field of view, resolution, orientation, framerate, wavelength sensitivity, electronical controllable zoom (analog or digital), fixed or moveable, fixed or electronically adjustable pan-tilt orientation, etc. The camera sensors may include passive light reception sensors, time of flight cameras, event-based cameras, etc., and may also include visual, infrared (IR) or near-infrared (NIR) illumination synchronized with the frame exposure of the camera to increase a signal-to-noise ratio (SNR) of the scene being illuminated. Similar to the camera system, the non-image-based sensors (e.g., radar and/or lidar) may include multiple sensors having different properties, e.g., different fields of view, orientations, resolutions, framerates, wavelengths, modulations, etc. To simplify the discussion, the disclosed embodiments will refer to the non-image-based components of the tracking units 305 as radar units. However, those skilled in the art will understand that such components may be substituted by or may include additional non-image-based sensors as desired.

The tracking system may comprise any mixture of different tracking units having different sizes and configurations. Some tracking units may contain a combined radar and camera system, whereas others may contain only a radar system or only a camera system. For example, the angular accuracy of a radar unit is typically related to the separation between various antennas, so a larger separation can produce a higher angular accuracy. In some cases, a larger radar unit may be necessary to achieve a desired accuracy, while other radar units may be smaller to offer portability or a smaller visual footprint. In one example, fairway tracking units may be relatively small and portable so that an operator can change the position and orientation of the tracking unit depending on the varying locations of shots in its vicinity, while tee box tracking units and green tracking units can be larger and substantially stationary in view of the high likelihood or certainty that these tracking units will provide good coverage of certain shots taken for each hole, e.g., tee shots and chips/putts, respectively. Additionally, some tracking units can include robotic cameras that can automatically change orientation, for example, based on a command from the tracking server (based on tracking data from a different tracking unit or sensor) or based on tracking data from the same tracking unit. The robotic camera can be a tracking camera that performs optical tracking and changes an orientation based on ball detections, or the robotic camera can be a broadcast camera that relies on tracking data acquired from other sensors.

In addition to the orientation, a zoom level and a crop can be controlled. In some embodiments, additional sensors (e.g., radar or lidar) are included with the robotic camera on a single tracking unit, and all of the sensors included on the tracking unit can change orientation together. As those skilled in the art will understand, a radar unit that moves with a robotic camera may keep a ball being tracked within a portion of a field of view (e.g., near a center thereof) of the radar within which the radar has heightened sensitivity due, for example, to the fact that such radars often receive stronger reflected signals from objects moving near the centers of their fields of view.

Each tracking unit 305 will provide, either on its own or in combination with other tracking units 305, positional and/or motion data for the golf ball and/or golf club being used by each player within its field of view. To be described in greater detail below, some tracking units 305 can also identify the player(s) within its field of view and associate ball/club data with the corresponding player. As described above, all positional data can be translated into a world coordinate system to locate the positions of the ball and/or player on the golf course. The tracking of ball trajectory and associated parameters, such as spin rate and spin axis of the ball, may be performed exclusively based on the radar data or may combine image-based tracking with radar-based tracking to determine the three-dimensional positions of the ball trajectory. Additionally, a pure image-based tracking or any other tracking technology such as lidar may be used in some scenarios. Preferably, these applications will employ non-invasive technologies that do not require any alteration of the equipment used by the golfer (e.g., ball or club markings) as this would be unlikely to be adopted in any professional tournament. This may be less important in amateur scenarios where players may be more amenable to the use of different equipment if that will enhance results, lower cost of the service, etc. In addition, club tracking, such as club speed, attack angle, club path, face to path angle and impact location on the club face, may be performed using either radar-based tracking, image-based tracking, lidar-based tracking, or any combination of these and other systems.

FIG. 4 shows an exemplary tracking unit 400 containing a radar system 405 and/or a camera system 410 and/or a lidar system 415 according to various exemplary embodiments. The tracking unit 400 can include any combination of the aforementioned sensors, as described above. The various sensors are operable to capture data in accordance with their configured parameters. In some sensors, the captured data can be sent directly to a processing unit, e.g., the tracking server 320 described above with respect to FIG. 3 or any other data processing unit, which will process the data to determine tracks in a coordinate system 420 that may be a local coordinate system or a world coordinate system, depending on the application. Other sensors include internal processing arrangements for performing some or all of the data processing for the captured data. The tracking units 400 can be located adjacent to the tee box and be configured to capture launch parameters for a tee shot 440 of a ball 425 by a player 435, including both launch parameters for the ball 425 and club path parameters for a club 430 used by the player 435. The tracking units 400 may also be located further along the hole and configured primarily for 3D positional tracking.

In a preferred embodiment, the exemplary tracking unit contains a 3D Doppler radar system and a camera system typically including one or two embedded cameras. The 3D Doppler tracking radar is capable of determining a 3D position of a moving object in XYZ coordinates even when no a priori information (e.g., launch position) is available. This means, for example, that a ball suddenly appearing from behind a tree can be accurately positioned in 3D as soon as line-of-sight has been established by the radar. However, predetermined information about the launch position can be used if available.

In this embodiment, the cameras are time synchronized to the radar data and calibrated to the coordinate system of the radar. This means that, at any given time, a 3D position for a ball in motion determined by the radar can be mapped accurately to a frame captured by the camera that corresponds in time, as well as location, in the image. Similarly, a 3D position determined for a ball in motion determined from image data can be correlated with the corresponding radar data, to, e.g., more accurately determine a track. In an alternative embodiment, instead of a 3D Doppler radar, one or more of the tracking units may include a 1D Doppler radar and camera system. In this example, the 1D radar measures only a radial distance or range rate of the ball as it traverses the field of view of the radar, while the camera system determines the angular position of the ball as it traverses the field of view of the camera. When these respective fields of view overlap, the data can be combined to generate a three-dimensional track of the object, as described in U.S. Pat. No. 10,989,791, which is hereby incorporated by reference in its entirety.

Preferably, each camera is intrinsically and extrinsically calibrated, meaning parameters both internal and external to the sensor are known or determined. Internal parameters for a camera may generally comprise, e.g., a focal length, lens distortion parameters and a principal point, while internal parameters for a radar may generally comprise, e.g., phase offsets between receivers. External parameters typically constitute the position and orientation of the sensor. The intrinsic and extrinsic calibrations for the sensors within a tracking unit (or, in some embodiments, across different units within the tracking system) allow for the angular orientation of each pixel of images captured by the camera to be known in relation to the calibration of the radar system. Knowledge of distortion parameters for one or more cameras allows for the un-distortion (correction) of images/videos, if desired, to look more pleasant to the human eye. Various applications for this un-distortion feature will be described in greater detail below, particularly with respect to the tracking of bounces and rolls of a golf shot that may be difficult to capture using radar alone.

If two or more cameras are embedded in the tracking unit, the cameras will typically be configured with different fields of view (FOV) and operated at different frame rates. For example, the first camera may be configured to have 4K resolution and operate at 30 fps with horizontal FOV of 50 degrees, providing a visually pleasant video stream to view. The first camera may be used, e.g., as a broadcast camera or for the generation of clips of shots. The second camera may, for example, have a narrower field of view providing higher pixel resolution at a distance, for example in a greenside tracking unit looking back toward the fairway and configured to track shots aimed at the green.

This precise alignment and calibration of the cameras and the radar allows for the radar tracking and image tracking to supplement and enhance one other. In some scenarios, the ball, club heads and/or people will be detected first by the radar while, in other scenarios, these objects/bodies will be detected first by one of the cameras. In many scenarios, both sensor types will have a solid track of the object at all times when the object is within their respective fields of view. This allows for the possibility to use each sensor in different scenarios where the respective sensor is most accurate and to combine data from multiple sensors when available to increase accuracy as compared to measurements based on only one type of sensor.

The preferred system is further provisioned with technology that enables time-synchronization between tracking units, as well as an advanced calibration scheme that ensures all units are calibrated to the same coordinates (e.g., a world coordinate system), to be described in greater detail below. Essentially, the combination of sensor data and cross sensor enhancement that is possible within a single tracking unit, as described above, is also available across multiple tracking units operating in coordination with, for example, a first tracking unit tracking an initial portion of a flight of a ball while a second tracking unit takes over for later portions of the flight. Those skilled in the art will understand that, for portions of the flight of a ball that are included in both (an overlapping field of view area) of the fields of view of the first and second tracking units, data from both may be combined. Alternatively, the system may identify, for example, a first portion of the overlapping field of view area in which data from the first tracking unit is more accurate, a second portion of the overlapping field of view area in which a combination of data from the first and second tracking units provides the most accurate and/or most reliable data and a third portion of the overlapping field of view area in which data from the second tracking unit is more accurate. The delineation of these first, second and third portions of the overlapping field of view area may be made on a case-by-case basis in consideration of, for example, distances from each of the first and second tracking units, occluding elements, etc. Those skilled in the art will understand that the same general principle will allow for similar changes between different modes of usage of data from various tracking units when the fields of view of three or more tracking units overlap.

In some embodiments, the real-time 3D tracking using data from a first sensor can be used to control the operation of a second sensor. For example, the system can detect events in the real-time 3D tracking information from data from the first sensor, and these detected events can be used as a basis to trigger the second sensor to begin tracking. These events can include, for example: launch of a shot; the ball passing a particular distance from the tee; the ball moving beyond a predetermined distance from a reference line; and/or other events indicating that the ball has entered or will be entering the field of view of the second sensor. The events that will trigger a change in an operational state of the second sensor can be selected and configured based on the layout of a given hole. For example, game logic can be used that considers the geography of the hole, including, e.g., the length of the hole, items that may occlude the view/coverage of the first or second sensors. Additionally, the capabilities of the respective sensors can be considered, e.g., where for the given hole the sensor provides excellent tracking coverage and where it does not. The system may be programmed to begin tracking with the second sensor when the ball passes a particular distance from the tee and/or moves laterally beyond a predetermined distance from a reference line and/or moves closer to the second sensor than to the first sensor. In some embodiments, the sensors can have full or partially overlapping fields of view, however, this is not required.

The detected events can also be used to manage power use more effectively for the different sensors and subsystems of the tracking system. When no events requiring specific system capabilities are currently detected in the data from the first sensor or other system component, power usage of other sensors, e.g., sensors positioned further down the hole, can be reduced, for example, by placing various power-drawing components of the item in a sleep or low power mode until the system detects an event or immediately pending event that requires full activation of the item. This can be of great practical importance, since systems on the golf course are often either battery operated or powered through generators.

In a related embodiment, a robotic camera, e.g., a tracking camera and/or a broadcast camera that can be controlled remotely by. e.g., the tracking server, is controlled in dependence on real time 3D positional tracking information. Using the real-time position data for the ball, the tracking system can control a robotic camera to point this camera at the current ball position (e.g., to track the ball through its flight) and can additionally control zoom and focus to ensure sharp, viewer-friendly images to which viewers are accustomed (e.g., to provide a broadcast video feed) in the same manner as would be achieved by professional camera operators during golf tournaments. The 3D position of the ball relative to the robotic camera is known by the tracking system at all times based on the real-time data acquired by other sensors in the tracking system. Thus, an optimal crop, orientation and zoom level for the robotic camera can be controlled automatically by the system based on the real-time data. Optical tracking of the ball in flight may also be performed using an analysis of data from a robotic camera (or from any other camera) and may be used to control the robotic camera to achieve desired images using any known methods. The robotic camera can be used to replace a manual operator of a camera and can make the video footage much more appealing to viewers. It also enables possibilities for making closeup footage to illustrate, including, for example, the lie of the ball. To ensure stable and viewer friendly movement of the robotic camera, a special filtered version of the real time 3D data from the tracking system can be generated and used to control the robotic camera. Additionally, knowledge about the characteristics of the robotic camera controls, such as delay, max angular acceleration, max angular velocity, focus delays, etc., can be considered and compensated for when controlling the camera. The robotic camera may also be used as a tracking sensor for club and ball positioning in world coordinates. However, this requires calibration of the robotic camera as the field of view is not static. These embodiments will be described in greater detail further below.

For example, in one embodiment, the second sensor can be a camera (e.g., a robotic camera), and the activation command can include parameters for controlling an optimal crop, orientation and zoom level for the robotic camera. The zoom and focus of the robotic camera can be continuously updated based on in-flight tracking of the ball by other sensors or other tracking units, even when the ball is not visible or easily located in images from the camera.

FIG. 16a shows an exemplary method 1600 for tracking a three-dimensional position of a ball launched during play on a hole of a golf course, the tracking being performed using data from both a first sensor and a second sensor, wherein the operation of the second sensor is controlled based on 3D positional tracking information determined from data captured by the first sensor. In some embodiments, the first sensor is a radar (e.g., a radar in a tee box tracking unit). In other embodiments, the first sensor can be a radar of a different type of tracking unit, e.g., a fairway tracking unit, or can be a camera. In some embodiments, the second sensor is a radar, e.g., of a fairway tracking unit. In other embodiments, the second sensor is a camera. In some embodiments, the second sensor can be co-located with the first sensor, e.g., the second sensor being a camera in a tee box tracking unit and the first sensor being a radar in the tee box tracking unit. In a preferred embodiment, the first and second sensors are calibrated to a world coordinate system.

In the following, certain processing steps are described as being performed at a tracking system. As described above, the tracking processing can be performed either by a processing unit embedded in each tracking unit, at the tracking server, or through various steps performed in cooperation between an embedded processing unit and the tracking server. As described above, the tracking server can be a physical server on-site at the golf course or a server included in a cloud-based service or any combination of such elements.

In 1602, the tracking system captures first data using the first sensor, the first data corresponding to a first portion of a trajectory of a launched ball, and calculates a 3D position of the ball in real-time as the data is collected. The second sensor is in an operational state having reduced or different capabilities while the first data is being captured by the first sensor. For example, the second sensor can be in a low power state. In another example, the second sensor can be fully powered on but not yet performing any data capture and/or tracking functionalities. In still another example, the second sensor can be a robotic camera capturing data according to initial camera parameters for, e.g., crop, orientation and zoom level.

In 1604, the tracking system detects an event for the launched ball based on the first data. In one embodiment, the 3D location of the ball is used as a basis to determine whether an event has been detected with respect to the second sensor. For example, when the 3D location of the ball satisfies one or more positional criteria, the event can be detected. As discussed above, these events can include: the ball passing a particular distance from the tee; the ball moving beyond a predetermined distance from a reference line; and/or other events indicating that the ball has entered or will be entering the field of view of the second sensor. In another example, the events can include the launch of a shot.

In 1606, the tracking system controls the operational state of the second sensor (e.g., activates the second sensor or adjusts the data capture parameters of the second sensor)

based on the detected event so that the second sensor captures second data corresponding to a second portion of the trajectory of the launched ball. In some embodiments, the activation command can include a command to fully power on and/or to begin capturing data for 3D positional tracking. In other embodiments, the activation command can include parameters for controlling a robotic camera. In still other embodiments, the activation command can power a processing module for tracking bounces and rolls of a shot after initial impact with the ground, as will be described in further detail below with respect to FIGS. 11-13; 17a-b. In other embodiments, a region of interest can be provided of an area where the ball is likely to be found so that the second sensor can detect the ball more quickly and using fewer processing resources.

The method 1600 described above relates specifically to the activation of a sensor to capture data and/or track a ball in flight based on the three-dimensional tracking data of the ball in flight derived from data captured by another sensor. However, the general principles described above are applicable to many other exemplary embodiments described in greater detail below.

For example, in one embodiment, the second sensor can be a camera (e.g., a robotic camera), and the activation command can include parameters for controlling an optimal crop, orientation and zoom level for the robotic camera. The zoom and focus of the robotic camera can be continuously updated based on in-flight tracking of the ball by other sensors or other tracking units, even when the ball is not visible or easily located in images from the camera.

In another example, the event detection can relate to player detections, e.g., the identity of a player in a video feed, certain motions taken by the player leading up to a shot, etc., wherein a broadcast feed or some other processing modules are activated based on the event detection. For example, a radar can be activated based on the detection of a player ready to hit a shot from the tee box.

In still another example, certain data packets are triggered for transmission to broadcast (e.g., to a broadcasting entity) based on the real time 3D positional tracking of a ball. Metrics related to the flight of the ball are processed and/or transmitted when certain events are detected, e.g., launch parameters calculated upon launch and transmitted once calculated; apex parameters transmitted immediately after apex is detected; smooth trajectory parameters calculated upon initial impact with the ground and transmitted once calculated; bounce and roll and/or final rest position parameters calculated when bounces/rolls and/or ball at rest are detected; etc.

In still another example, the event detection can relate to an estimated landing position for a launched ball. If, based on the data acquired at the beginning of the shot, a landing position is estimated at which players and/or spectators are located, then an automatic warning can be triggered (an automatic "FORE" warning), so that these persons can protect themselves from errant shots. These and additional embodiments will be explained in greater detail below.

Radar Tracking

In radar technology, tracking of balls in flight is typically performed using a multi-frequency continuous wave (MFCW) Doppler radar operating at X-band. X-band Doppler radar is a powerful technology to track golf balls in flight. Under good conditions, balls can be tracked to a distance of more than 300 meters, and radar can function in all light and weather conditions.

FIG. 5a shows an example of a first principle of MFCW Doppler radar tracking. Radar waves are transmitted by the unit at a certain transmit frequency $F_{TX}$. Waves reflected by the ball and received by the unit at a return frequency $F_{RX}$ will experience a Doppler shift proportional to the radial velocity of the ball, $V_R$, relative to the tracking unit. The frequency shift can be detected by mixing the transmitted and received signals and performing a frequency analysis. Various signal processing algorithms can be applied to detect and track the ball and ultimately estimate a trajectory and various data points.

FIG. 5b shows an example of a second principle of MFCW Doppler radar tracking. Angular measurements can be performed by a MFCW Doppler radar including multiple receiving antennas. The antennas are arranged so that a wave front reflected from the ball will reach two receiving antennas with a time difference that depends on parameters including the direction from the unit to the ball and the distance/direction between the antennas. A system including three or more receiving antennas spanning a plane roughly perpendicular to the main beam and tracking direction may perform angular measurements in both the horizontal and vertical dimension to generate three-dimensional tracking.

After mixing, the time shift may be observed as a phase shift modulus $2\pi$ between the signals in the receiving channels. The $2\pi$ ambiguities can be resolved by having more than three receiving antennas cleverly spaced in a two-dimensional grid, as described in U.S. Pat. No. 9,958,527, which is hereby incorporated by reference in its entirety. Multiple receiving antennas can also increase the signal-to-noise ratio of the received signal when the signals from multiple receivers are added coherently.

FIG. 5c shows an example of a third principle of MFCW Doppler radar tracking. Range measurements can be performed using multiple transmitting frequencies. The wave front reflected from the ball, club, or any other item to be tracked for each of the two frequencies will reach a common receiving antenna with different phases that depend on the distance to the ball and the frequency separation. After mixing, the phase difference(s) can be observed as a phase shift modulus $2\pi$ between the signals in the receiving channels from the two or more different transmitter frequencies. The $2\pi$ ambiguities can be resolved by having more than two frequencies or from predetermined knowledge about the approximate distance to the measured item. For example, for a ball trajectory, prior information about the distance to the ball at certain parts of the trajectory can be used, e.g., the range measurement at launch can be assumed to be within a predetermined range interval for a radar positioned at the tee box.

As an alternative to transmitting multiple frequencies for determining the range to the ball, a frequency-modulated or phase-modulated continuous wave (CW) radar, such as a FM-CW radar, can be used, as is well known to those skilled in the art.

Key strengths of radar tracking technology are its speed, robustness, and maturity; the ability to directly measure, rather than infer, the three-dimensional position of the golf ball at any given time during the entire flight of the ball; and the enormous and growing data records from which detailed aerodynamical models representing the flight of a golf ball have been built.

Moreover, the tracking units can be equipped for state-of-the-art sensor fusion of radar data and camera data and are inherently scalable. Multiple tracking units may be adopted where additional accuracy is critical, combining, for example, a tee area system with a greenside system (as well as additional mid-hole tracking units, where desired) to provide extreme accuracy at key events (e.g., launch and/or landing) for every shot taken on the hole.

At every instance in time for which data is captured by the radar (e.g., in ~20 ms intervals), determinations may be made, for every moving object visible to the radar, of the radial speed; the range; the horizontal and the vertical angle; the 3D position; and any additional information as described herein.

When a sufficient number of such detections of the golf ball have been made successively in time, typically spanning 100-500 ms, launch of the ball is confirmed and an aerodynamical model is fitted to the data. The aerodynamical model may, for example, include a constrained parametric partial differential equation based on Newtonian physics fit to the data in a maximum likelihood sense under an appropriate weighting of the data. In the event that the radar does not directly detect the time of impact in the raw radar data, the model may be extrapolated backward in time to an expected impact position or height. Alternatively, data from other sensors (e.g., a microphone) may be used to determine the launch time. Launch parameters may then be extracted by evaluating the model at the deduced time of impact. The launch parameters may include, e.g., a timestamp of the impact; the ball position at rest, prior to impact; the ball speed; the vertical launch angle; and horizontal launch angle. The aerodynamical model thus serves to smooth the raw radar data and provide a suitable representation of the flight of the ball thus far.

The remaining flight of the ball is tracked using, for example, a nonlinear Kalman filter, increasing the likelihood of tracking the entire flight of the ball until impact with the ground. Furthermore, if line-of-sight to the ball is occluded for any period of time, the signal from the ball may be reacquired once line-of-sight is re-established. Once landed, bounces can be successively tracked if visible to the radar or by image-based tracking units or image-based components of tracking units. A detailed description is provided further below with respect to methodologies for tracking bounces and rolls and determining a final rest position of the ball.

Live data captured by the system may be transmitted continuously while the ball is in motion, including data captured by the radar unit, to, e.g., the tracking server 320 and/or directly to a third party for broadcast after processing at the tracking unit. Similarly, data received at the tracking server 320 can be continuously processed and transmitted to the third party or broadcast. Alternatively, data can be transmitted only at key points of the shot, such as at launch, apex, carry landing and ball at rest.

FIG. 6 shows a diagram 600 of exemplary data packets 605-630 including certain data for a golf shot transmitted to a broadcast entity and/or other applications during real-time data acquisition for the golf shot according to various exemplary embodiments. The data packets 605-630 are shown relative to an exemplary plot of a trajectory of the shot over time, and an approximate time of transmission of the data packet is provided, relative to the launch time of the shot. Additionally, the approximate times of transmission for the data packets 605-630 are indicated and distinguished for different types of radar sensors. For example, the approximate times of transmission may vary across radar sensors having different parameters and/or processing capabilities, requiring different amounts of processing time for the data packet, and/or tracking different types of shots that typically have shorter or longer time durations from launch to rest. For present purposes, the latency time required for the data transmissions, e.g., from the tracking unit 305 to the tracking server 320 or to the broadcast/application; and/or from the tracking server 320 to the broadcast/application, can be ignored. In the present example, for ease of clarity, it is presumed that the tracking server 320 is receiving the data packets from the tracking units and transmitting the data packets to a receiving broadcasting entity that is broadcasting live video of the shot from any number of vantage points. The tracking server 320 can receive data/tracks from a single tracking unit or from multiple tracking units. When the processing of the raw radar signals occurs on the tracking server 320, the data packets 605-630 shown in FIG. 6 are generated by the tracking server 320 and sent to broadcast.

The live video may include a tracer of the shot, determined in substantially real-time using techniques described in further detail below. During the broadcast of the shot, simultaneously with the display of the tracer, the information included in the received data packets can be displayed to enhance the broadcast with real-time information for the ongoing shot. Those skilled in the art will understand that a tracer generally refers to a video feed graphic showing a visual representation of the trajectories of a shot inserted at positions within the images corresponding to positions in the images occupied by the ball from launch to the position of the ball in the current image. The tracer graphic may include numerical data shown at various points of the trajectory, e.g., ball speed, apex height, carry, etc.

A first data packet 605 transmitted from the tracking server to the broadcast includes launch data, for example, an impact time, a ball position at rest, a ball speed at launch, and both a horizontal and vertical launch angle. To process and transmit these parameters via some communications medium to the broadcasting entity, a typical tracking unit (in combination with the tracking server) may transmit with a delay of, for example, less than ~600 ms (for a tee box tracking unit), ~1000 ms (for a green tracking unit), or ~650 ms (for a fairway tracking unit). That is, the data is processed, included in images and ready for broadcast in a manner requiring a minimum delay (very near "real time") from pure live timing and efficiency in data collection and processing is very important. The launch data can be displayed in the broadcast as numerical values or graphics overlaid on the video feed, or in various other manners included in a rendering of the hole/shot in addition to being stored for later manipulation and analysis.

A second data packet 610 transmitted from the tracking unit to the broadcast includes real time trajectory data, for example, the three-dimensional position of the ball, as this data is captured and determined. At any time during the flight of the ball, a tracking unit 305 may begin transmitting this real-time trajectory information in data packets 610 and proceed to transmit these data packets 610 at given intervals that may be limited by the capabilities of the tracking unit and/or the transmission medium over which the data is communicated. The transmissions can end after some predetermined duration, when the shot reaches some predetermined position, e.g., its apex, or upon the transmission of a further data packet containing additional information. In the example of FIG. 6, transmission of the real-time trajectory data packets 610 is triggered to begin upon transmission of the first data packet 605 containing the launch data. The transmissions of the real-time trajectory data packets 610 are ended when the third data packet 615 is sent, as described below. However, those skilled in the art will understand that the real-time trajectory data packets 610 can be configured for transmission for any duration during the flight of the shot.

The nonlinear Kalman filter can be smoothed on every occasion for which data is sent to broadcast for live rendering of the trajectory. This provides the most accurate a posteriori estimate for the trajectory of the ball in accordance with all data recorded thus far. The smoothed trajectory can be further filtered with an autoregressive process before being displayed to enhance viewer experience. The trajectory data can be displayed in various ways, including, e.g., as a trajectory plot on a rendering of the hole. Numerical data can also be used directly, including, for example, as a counter for distance, curve, height, etc.

An optional third data packet 615 transmitted from the tracking unit 305 to the broadcast includes a landing prediction. The landing prediction may include an estimated three-dimensional landing position for the ball, based on the information gathered about the flight of the ball so far. The landing prediction may also provide uncertainty information regarding the estimate. The tracking unit can be specified to transmit the third data packet 615, relative to the launch time, after, e.g., ~1500 ms (for a tee box tracking unit), at the apex of the shot (for a green tracking unit), or after ~1500 ms (for a fairway tracking unit). The landing prediction can be displayed in the broadcast in various ways, including, e.g., as a location on a rendering of the hole. A fourth data packet 620 transmitted from the tracking unit 305 to the broadcast includes a spin rate. The tracking unit can be specified to transmit the fourth data packet 620, relative to the launch time, after, e.g., ~2500 ms (for a tee box tracking unit). For a green tracking unit and/or a fairway tracking unit, the spin rate may not be transmitted to the broadcast; determination of a spin rate is a relatively complex computation, and this information may be omitted for the shorter shots typically captured by the green and fairway units. The spin rate determination can be displayed in the broadcast as, e.g., a numerical value or in any desired graphic manner.

A fifth data packet 625 transmitted from the tracking unit 305 to the broadcast includes a live apex, including, for example, an apex height, range and side. Apex side refers to the lateral distance of the ball from a known or assumed target line of the shot, e.g., the direction to the pin for shorter holes or the direction to the center of the fairway at a certain distance from the tee box for longer holes. Alternatively, apex side can be determined relative to the initial launch direction of the ball. The tracking unit can be specified to transmit the fifth data packet 625 when the tracking unit 305 determines the apex of the shot has been reached, regardless of the type of sensors included in the tracking unit 305. The live apex determination can be displayed in the broadcast as, e.g., a numerical value or a graphic overlaid on a rendering of the hole.

A sixth data packet 630 transmitted from the tracking unit 305 to the broadcast includes final measurements for the shot after the ball has landed. Once the ball has impacted the ground, an aerodynamical model, more complex than the model employed at launch, may be fit to all of the gathered data to provide a determination of the most likely trajectory of the ball, from impact through apex to landing. The aerodynamical model can capture the spin decay of the ball in addition to quantifying the manner in which ball spin and speed affect the instantaneous drag and lift forces on the ball. The model may further account for the effect of weather and wind. In one aspect, the aerodynamical smoothed trajectory can be used to estimate effective wind speed and direction impacting the flight of the ball.

The model is appropriately evaluated to extract values for all final data points, including: timestamp of the impact; ball position at rest (if measured), before impact; ball speed; vertical launch angle; horizontal launch angle; apex height, side, and range; estimated spin axis (if not measured); an estimated spin rate (if not measured); carry and side (flat); landing angle and speed (flat); and flight time (flat). The "flat" values for carry and side, landing angle, speed and flight time refer to values determined at the same height/level at which the ball was launched. Flat values are useful for comparing shots that are not launched/landed at the same location. The aerodynamical model is further used to extract actual rather than flat values for flight time; landing angle; landing speed; range and side by intersecting the trajectory with a known 3D representation of the golf hole layout. The "actual" values refer to values determined at the actual collision of the ball with the ground where elevation differences are taken into account. If desired, the aerodynamical model can be summarized with a set of polynomials allowing for easy transfer, visualization, and manipulation by third parties.

The sixth data packet 630 can include the smoothed trajectory data and any desired key metrics, including more accurate versions of those metrics determined/predicted and transmitted in the prior data packets 605-625. To process and transmit these parameters via some communications medium to the broadcasting entity, a typical tracking unit 305 may require or be otherwise specified to transmit the sixth data packet 630, relative to the ground impact time, after, e.g., ~300 ms (for a tee box tracking unit), after ~350 ms (for a green tracking unit), or after ~350 ms (for a fairway tracking unit). The final shot measurements can be displayed in the broadcast in various ways, including any of the ways described above with respect to data packets 605-625.

It should be understood that the specific configurations and transmission times for the data packets 605-630 described above are provided for exemplary purposes, and any greater or lesser number of similar or different data packets can be transmitted to the broadcast based on any reason, e.g., based on specific request from the broadcaster, the capabilities of the tracking units, etc. For example, packets transmission architectures specific to different sensors can be configured so that the sensors transmit different data at different times, depending on factors such as processing time for shot parameter determinations, the type of shots typically tracked, etc. Additional data relating to the bounce and roll of the shot after landing may be provided, for example in the sixth data packet 630 along with the final measurement data for the trajectory, or in a separate packet at a different time. Specific techniques for analyzing bounces and rolls of shots will be described in greater detail below with respect to FIG. 13.

FIG. 16b shows a method 1610 for transmitting tracking data for inclusion in a broadcast according to various exemplary embodiments. As described above, a tracking system can comprise radar units for tracking the launch and/or the flight and/or the ground impact of the ball (and in some embodiments the radar units can track bounces and rolls after initial ground impact). The tracking system can also comprise cameras for tracking bounces and rolls. Data can be acquired for the entirety of the shot trajectory, and the various tracking units can operate in coordination with a tracking server to calculate 3D trajectories of balls and detect events related to the flight of the ball.

In 1612, a launch event is detected by the tracking system and launch data for a launched ball is captured using a sensor of a first tracking unit. The tracking units (and/or tracking server) begin processing the launch data immediately after launch to derive launch parameters.

In 1614, at least a first data packet is transmitted to a broadcasting entity including determined launch parameters.

The first data packet can be transmitted immediately after the launch parameters have been determined at the tracking server (or received at the tracking server after determination at the tracking unit), or at some predetermined time after launch.

In 1616, a plurality of second data packets are transmitted to the broadcasting entity including real-time 3D trajectory data. In one embodiment, transmissions of the second data packets can be triggered at some predetermined time after launch and end some predetermined time after beginning. In another embodiment, transmissions of the second data packets can be triggered upon transmission of the first data packet. In still another embodiment, transmissions of the second data packets can be triggered when a 3D positional event for the ball is detected, e.g., when the ball reaches a particular point in its trajectory, e.g., a predetermined height or distance from tee. In still another embodiment, ending the transmissions of the second data packet can be triggered when a 3D positional event for the ball is detected, e.g., when the ball reaches a particular point in its trajectory, e.g., the apex or some height determined as a percentage of a predicted apex height.

In 1618, additional data packets may be transmitted to the broadcasting entity while the ball remains in flight. For example, a third data packet can include a predicted landing position (transmitted, e.g., after the transmissions of the real-time trajectory data in 1616 has ended), a fourth data packet can include a spin rate (transmitted, e.g., after a predetermined duration has elapsed after the flight or immediately after enough data is captured and processed to accurately determine the spin rate), and a fifth data packet can include a live apex (transmitted, e.g., upon detection).

In 1620, an impact event is detected by the tracking system (e.g., the system detects that the ball in flight has initially impacted the ground) and data for the ball trajectory is compiled across sensors and/or fit to aerodynamical models to determine final measurements for the trajectory of the ball (that may be more accurate than the measurements provided in the previous data transmissions).

In 1622, at least one sixth data packet is transmitted to the broadcasting entity including the final measurements for the trajectory of the ball. The sixth data packet can be transmitted immediately after the final measurements are determined, or at some predetermined time after the ground impact.

In 1624, landing data for the ball, including bounces and rolls and/or a final rest position, may be tracked by the tracking unit and/or a further tracking unit, e.g., a camera in the vicinity of the ground impact. The tracking units (and/or tracking server) processes the bounces and rolls and determines 3D position data during this portion of the ball motion, and can further determine a rest position, as will be described in greater detail below with respect to FIGS. 11-13.

In 1626, at least one seventh data packet is transmitted to the broadcasting entity including the landing information. The seventh data packet can be transmitted immediately after the landing information is determined, or at some predetermined time after the ball comes to rest.

In 1628, the broadcasting entity receives each of the packets transmitted over the duration of the flight of the ball and subsequent to impact/rest and presents the data included in the data packets in a broadcast video feed. The information can be processed into visually pleasing graphics, etc. The bounce and roll data can be combined with the initial trajectory data to display a full travel path of the ball from launch to rest.

Although seven types of data packet transmissions are included in the method 1610 above, those skilled in the art understand that a different number and/or type of data packet can be used.

Certain phenomena may impede the quality of radar tracking of the ball, such as: shots with particularly low ball speeds; shots moving more or less perpendicular to the line-of-sight to a radar unit; strong multipath reflections, primarily from the ground; objects occluding the direct line-of-sight to the radar; and external devices emitting electromagnetic interference. Most phenomena affecting the quality of the radar tracking may be aided, however, by enhancing the raw radar data with vision tracking of the ball.

In a preferred embodiment, one or more tracking units may be equipped with tracking cameras capable of image plane tracking or three-dimensional positional tracking in addition to the tracking capabilities of the radar itself. The radar will often provide a region of interest to the camera reducing the computations required to detect the exact pixel location of the ball and may also be used to aim and focus the camera to further enhance the quality of image-based tracking data. Data from the two sensors are in turn merged, extracting precise estimates for range and range rate from the radar with accurate measurements of horizontal and vertical angles from the camera. The fusion of the two technologies provides the best of both worlds: the speed, robustness, weather-resistance and range-measuring capabilities of radar tracking combined with the enhanced angular accuracy of camera-based tracking.

The tracking system is inherently scalable and allows the addition of any number of tracking units for joint tracking and sensor fusion. This may be decided on a case-by-case basis and may be applied where accuracy and/or reliability is of the utmost importance. Aside from the obvious benefit of increasing accuracy, additional sensors may equally address a number of the aforementioned issues impeding radar tracking to ensure that all shots are tracked.

Calibration

In order for the tracking units to output meaningful data, it is paramount that each tracking unit 305 is able to map its measurements to a world coordinate system different from its own local coordinate system. This allows trajectories, in particular, to be overlayed on images or video of the course, as well as to insert graphics such as tracers into a broadcast video feed. The accuracy of certain data points depends both on the measurement accuracy of the tracking unit 305 as well as the accuracy of the calibration of these measurements to world coordinates. The types of measurements so affected can include: ball position at rest (before impact); horizontal launch angle; apex side; and carry side (flat).

The method for calibrating a tracking unit to a world coordinate system can be the same across tracking units 305, irrespective of whether an individual tracking unit 305 is placed at the tee, looking down the fairway; or at the green, looking back at the fairway. The calibration can be done in a number of different ways. In a preferred embodiment, GPS positions of key reference points on each hole are determined. In addition, the GPS position of each of the tracking units 305 is determined. For each tracking unit 305 containing a camera system, one or more reference positions are determined in the camera images, permitting the orientation of the tracking unit 305 to be determined in world coordinates. Should the tracking unit 305 be moved subsequent to performing a calibration (because, for example, the tracking unit 305 is bumped by someone on the course or because the structure to which it is mounted causes it to move), the measurements listed above may be affected. Changes in orientation of the tracking unit 305 may be detected by feature matching in images from the built-in cameras. Alternatively, changes in orientations can be determined by motion sensors built into one or more of the tracking units 305 or in other ways.

A fairway tracking unit 305 can be calibrated to the world coordinate system in a similar manner, however, for portable tracking units, it may be preferred to omit the calibration to the world coordinate system for the sake of speed. The fairway tracking unit 305 can be calibrated to, e.g., a broadcast camera, for providing tracers and/or other information relative to a common coordinate system with the camera, to be described in greater detail below.

Adding Separate Cameras for Broadcasting/Filming

As mentioned, some or all of the tracking units 305 may include a camera system. However, one or more additional cameras may be placed at each or some of the holes for the purpose of broadcasting/filming the golf shots. In the following, dedicated cameras for filming are referred to as broadcast cameras irrespective of whether the camera is actually used for broadcasting, so long as the primary purpose of the camera is to provide a good viewing experience either in real-time, near real-time or after the fact, and is not primarily to provide data for tracking.

The position and orientation of the broadcast camera can be determined in a manner similar to that used for the tracking units 305. Thus, any ball in movement or at rest can be located, at least approximately, in the images generated by the broadcast camera. In this way, ball tracking information such as tracers or other in image illustrations may be inserted into the images from the broadcast cameras at positions in the images corresponding to the locations determined based on the tracking information from the tracking system.

In some cases, a camera system present in a tracking unit 305 may be used as a broadcast camera. In this case, the same images used for tracking can be used for broadcasting.

Adding further cameras to supplement the tracking units 305 is a straight-forward process. The calibration scheme facilitates the inclusion of other cameras in the tracking and visualization task and includes time synchronization between the tracking units 305. In one example, a pan, tilt and zoom (PTZ) camera may be added, such as a robotic camera. With a PTZ camera, the pan, tilt and zoom can be controlled directly based on the real time ball trajectory captured by the tracking system, to be described in greater detail below.

Player Identification

As described above, a unique playerID can be associated with each player on a golf course and can be used to accurately associate each golf shot tracked by the tracking system with the player who took the shot. This player identification functionality may be implemented in a number of different ways, alone or in combination with alternative options, as described below.

In a first option, the system analyzes swing characteristics for each golfer in a tournament and generates a unique identifier for each golfer based on unique aspects of the golfer's swing characteristics. For example, unique swing characteristics may include a combination of biometric data points (e.g., ratios of forearm to upper arm length, height, etc.) with data regarding the biomechanics of the swing of each golfer (forearm and upper arm positioning relative to club shaft at different points during the swing, degree of twisting of the body relative to legs, etc.).

In a second option, the system recognizes the clothes and/or faces of the golfers. For example, each golfer may be manually identified to the system at the beginning of each round, and characteristics of the clothing worn by the golfer may then be matched to the golfer in the system for recognition throughout the round. This information may be used by the system on its own, or in combination with any other biometric and/or biomechanical features to recognize each golfer for every shot. This option may be used alone or, for example, in combination with any or all of the other options. In a third option, each golfer carries an electronic identifier that can be located by the system. For example, this could be as simple as an app on a smartphone that transmits a unique identifier recognized by the system as well as its GPS coordinates, which can then be mapped to world coordinates. This option may be used alone or, for example, in combination with the first or second option.

In a fourth option, the player identification functionality can additionally use logic concerning the manner in which players typically play a round of golf. For example, players generally play in groups of 2-4 (e.g., on tour it is typically 3 golfers), and the players in such groups play each hole together throughout the round, taking turns so that the member of the group furthest from the hole takes the next shot. In another example, after a player hits a shot, the next shot from that player will occur from a location close to the point at which the tee shot landed. In still another example, the system may employ knowledge as to the lay out of the course. For example, after a group has completed a hole (e.g., hole 1), the system predicts that the group will move to the tee box for the next hole (in this case, hole 2). These game logic methods according to the fourth option may be used in combination with the aforementioned options 1-3 to improve the player identification and/or reduce the processing burden required for identifying the players. Using this type of game logic, and by tracking the progress of each group as the group progresses through the course, the player ID tracking may generally need to differentiate only between the members of a given group (e.g., the system tracks each group and then, knowing where that group is on the course needs only to determine which of the 3 players in the group known to be playing at a particular point on the course is taking a particular shot). This additional assistance should be available for every shot during a round except for the very first shots of the group to start the round (e.g., the tee shots for a group at the first hole). Even for these first tee shots, information may be available to the system concerning the identities of golfers in a group currently on the $1^{st}$ tee. This option may be used in combination with any of the three preceding options to, for example, narrow the list of options considered by the player identification system when determining the identity of a player detected to be preparing to hit.

With respect to the image-based options (first and second options) discussed above, a visual profile can be generated when the player is detected for the first time and associated with a unique playerID. When a player is detected in a video stream, an algorithm can match the detected visual profile with previous visual profiles detected earlier (e.g., during the same round or, for non-clothing based characteristics, in previous events). A player will, for example, rarely change shoes, pants or headwear during a round, and will also seldom change upper body clothing appearance during a round. If it starts to rain, a player might decide to put on a rain jacket or may remove a sweater if it gets hot, etc. Taking advantage of these characteristics, an algorithm can re-identify a player in any camera (given sufficient image quality). This functionality could be implemented by, for example, a convolutional neural network (CNN). To discriminate between players, a feature extraction and a classification of the features associated with the unique playerID can be used. The feature extraction could be done by detecting the color of clothing, height, limb length, swing type of the golfer, or by training an auto encoder. In the latter case, the feature vector is provided by the auto encoder, but not necessarily in explicit characteristics for human interpretation. When a golfer is first identified, a feature vector $v\_0$ can be associated with the detection and subsequent player detections resulting in feature vectors $v\_ni$ close to the original detection $v\_0$, will be interpreted as being the same golfer. The cluster of detections corresponding to a specific golfer can be updated with the new feature vector if the detection is made with high confidence.

When the hitting order is defined on the first tee, the name and/or playerID for each player can be associated with a unique visual profile, and any subsequent matches to this visual profile throughout the round can be tagged with the playerID associated with that player. This identification functionality can be further improved by taking advantage of game logic, e.g., knowledge regarding which players are playing in the same group during the round; knowledge that these players will then play hole 2 after they play hole 1; etc. For non-tee shots where, for example, the image quality might not be sufficient to identify the player, the player identification system can use knowledge from the tracking system, including ball flight tracking as well as the final rest position of a previous shot determined by the tracking system. Using this data, the system can determine the location from which the next shot of a given player will be taken with high confidence.

A database of players can be created so that, even at the first tee, the system will be able to recognize players found in the database and associate that player with the corresponding playerID of the player. For example, this type of database can be created for all players on the PGA TOUR. For players attending a PGA TOUR event for the first time, the system can create a new visual playerID either when the player hits his first shot on the 1st tee or prior to this first shot (e.g., during practice rounds, warm-up activities, etc.). In summary, this will provide automatic player ID tracking throughout the round. The system can work based on logic similar to that employed by a trained human that knows all the visual appearances of the players.

FIG. 16c shows a method 1630 for player identification and associating shot data with a particular player profile associated with a unique playerID according to various exemplary embodiments. The system for performing the method 1630 includes, at least, a camera and one or more tracking units for capturing shot data for a player identified in images from the camera.

In 1632, the player identification system receives player information for creating a database of visual profiles including information for recognizing players associated with the visual profile. For example, the database can comprise visual information for the players, e.g., swing characteristics (including, e.g., a combination of biometric data points with data regarding the biomechanics of the swing of each golfer), clothing characteristics, facial characteristics, or a combination thereof. Each visual profile is further associated with a playerID that can be used by the player identification system to associate shot data with the visual profile. In some embodiments, the database can comprise PGA TOUR players for, e.g., tracking professional events while in other embodiments the database can comprise amateur players.

In 1634, the player identification system can receive/generate player information for new players not yet identified in the database or associated with a unique playerID/visual profile. For example, the system can analyze the swing, clothing, or facial characteristics for the new player and associate the determined information with the new visual profile. In addition, clothing characteristics can be updated for any players already associated with a visual profile, e.g., at the beginning of a current round. In some embodiments, for example, during amateur player tracking, an application connected to the player identification system and/or tracking system can be installed on, for example, a smartphone or smartwatch. Each golfer can provide a positive indication within the application that can be used to associate a tracking system playerID with the golfer, for example, at the beginning of a round. Further considerations related to amateur round tracking will be described in greater detail below. The database can be populated using either one of or a combination of 1632 and 1634.

In optional 1636, the player identification system executes an algorithm utilizing golf game logic to improve its player identification functionality (e.g., all of the players playing together in a group can be associated with one another for a round of golf so that the system can assume any golfer playing together with a recognized member of a group is another member of this group). This can include logic concerning the manner in which players typically play a round of golf; the lay out of the course; etc., so that, as players/groups are tracked around the course in association with shots taken from particular locations, the player identification system need only differentiate between the members of a given group. In some embodiments, a trained convolutional neural network (CNN) is used to execute the game logic and/or player detection/matching functionality described below.

In 1638, a player is detected in a video stream from a first camera during play of the golf round and a visual profile is detected, e.g., based on clothes, face, swing mechanics, etc. The detected visual profile is matched with a visual profile in the database. In some embodiments, a position of the player is determined, e.g., in world coordinates. As described above, the player can be detected based only on the visual characteristics observed in the video stream. An electronic identifier (e.g., transmitted from the player's phone) can be used to improve the matching (and, in some embodiments, can be used instead of the image analysis). The CNN can also be used to improve the matching of the detected visual profile to the visual profile in the database.

In optional 1640, the optional CNN of step 1636 can be updated based on player detections such as that of step 1638. In some embodiments, the CNN is updated after each player detection in a camera feed while in other embodiments, the CNN is retrained less often (e.g., after a number of detections or after a predetermined duration from a prior detection).

In 1642, a golf shot is detected by the player detected in the video stream. In some embodiments, the first camera used to identify the player is also used to detect the shot, while in other embodiments, the shot is detected by other sensors in the tracking system. In some embodiments, to be described in greater detail below, a golf club or golf club type used by the player is also identified and associated with the shot.

In some embodiments to be explained in further detail below, particularly with regard to amateur round tracking, for a player to be matched with a shot, it is not required for a player to be detected in a video stream. For example, the player may have a wearable device associated with the player that is operable to detect a swinging motion. The wearable device can detect a swing and associate the swing with a time stamp and/or a location (e.g., GPS location) and transmits this information to the tracking server. When the tracking system then detects and tracks a shot, the tracking server compares the swing detection (and associated time stamp and/or location), either in real-time or at a later time (e.g., the end of the round), to match the swing to the detected shot based on the timestamp and/or location associated with the swing and the shot to associate the shot with the player from whose wearable device the swing information originated. In an alternative embodiment, instead of using a wearable device detecting swing motion, a device that provides time stamped location information, such as a mobile phone, can be used to match up the shot tracking recorded in world coordinates with the corresponding location of the device at the point in time of shot taking.

In 1644, the shot is matched with the detected player and associated with the unique playerID of the player. The matching can be performed based on the launch position of the shot in world coordinates, as determined by the tracking system, being matched to the position determined for the player detected in the video stream from the first camera.

As will be described in greater detail below, this association of shots with a unique playerID can be used for a variety of purposes, for example, transmitting the data for the shot to the player immediately after processing, compiling shot data for an entirety of a player round, compiling clips of each shot taken by a given player during a round, etc. According to further embodiments to be described in detail below, the method 1630 described above can be optimized for either professional event tracking or for amateur round tracking.

In optional 1646, data for the shot and the associated player is output during play. In one example, for, e.g., professional round tracking, the shot information for the player can be transmitted to a broadcast. In another example, for, e.g., amateur round tracking, the shot information can be transmitted to an application on a personal device of the player. The ball tracking data may be transferred into a personal application immediately after being recorded, so that the player can review the data while playing the round of golf One particularly interesting application for this feature could be to aid a golfer in finding his/her ball. For example, when a shot is hit that cannot be easily found by the golfer, the personal application may narrow down the location in which the ball is likely to be found, for example, on a golf hole map provided within the application. In another example, if the ball was, e.g., hit into a water hazard or out of bounds, the system can accurately determine the areas where the new ball is allowed to be dropped and indicate this area to the golfer via the application. Further examples for applications of the playerID feature to both professional and amateur round tracking will be explained in further detail below.

In 1648, data for all shots taken by a particular player during a round of golf is compiled onto the database for, e.g., presentation to the player at the end of the round or other uses. The data can be used for a variety of purposes, e.g., providing statistics to a player for analysis, generating graphics, etc.

Automatic Club Type Tagging

For a camera placed behind or on the side of the player (e.g., on a tee box looking down the fairway) an algorithm can be trained to recognize the type of club each player is using for all or a subset of shots. In this view geometry, the images from the camera will provide a view of the club head from the back. FIG. 7 shows exemplary images 700 of a club head from a position behind the player. The camera used for club data tracking on tee shots can operate, for example, at 200 fps and with a pixel resolution of 2.5 mm/pixel. These camera specifications may correspond to the minimum camera capabilities necessary for club trajectory tracking.

One option for determining a club type based on camera data is to train a neural network to recognize different categories of clubs. For example, the neural network can be trained to distinguish between 7 different categories of golf club including: driver, wood, hybrid, long iron, short iron, wedge and putter. A more refined training of the neural network can allow a more granular analysis to determine more specific characteristics of the club, e.g., the specific club type, distinguish characteristics between different clubs within a same club type, etc.

In an alternative option, an electronic tag emitting a unique identifier when in use (e.g., in swinging motion) can be used for identification of the club type. A receiver can receive the signal when the club is in use and match the identifier for the club with the player profile associated with the identifier. The receivers can be located, for example, at each tee box. For this option, the club identification system can additionally use data from the tracking system, for example, to confirm that the club sending the signal was likely to have been used for the shot.

On the PGA TOUR, the club category for particular player shots is currently entered manually, so an automated way of determining this would be highly desirable. The club information can be associated with the shot and, by further association, with the player who took the shot.

Broadcast Camera Calibration

For accurately rendering tracers on a broadcast camera feed, the broadcast camera is calibrated to world coordinates. This can be accomplished in the same manner as the calibration of the tracking units to world coordinates, as described above.

For portable units, e.g., fairway tracking units, it is not necessary to map shot trajectories to a world coordinate system. In some scenarios, a broadcast camera can be co-mounted with a fairway tracking unit. To draw a tracer in the feed from the broadcast camera that is co-mounted on a tripod with a fairway tracking unit, a calibration of the broadcast camera to the tracking unit coordinates is all that is required. This baseline calibration may be performed, for example, in the morning before each round, establishing a relationship between the intrinsic parameters of the built-in camera of the tracking unit and the broadcast camera for different zoom levels. For each stroke, the zoom level is determined using feature matching between images from the two cameras, including, for example, position of the ball in the images from the same time (e.g., stationary position of the ball before the shot), and other information, which could include tracking data such as the tee position and range of the ball at launch. This allows the broadcast camera to be zoomed independently for each stroke and for accurately rendering a tracer (or placing any other graphics) at desired positions relative to a position of the ball within images from the broadcast camera without requiring the tracker to read a zoom level from the broadcast camera.

Automatic Production of Broadcast Feed

As described above, the full course tracking system permits the automated tagging of shots, i.e., the automatic identification of the golfer taking each shot. A coordinated tracking and broadcast system that includes the ability to film, track, and even insert into the video feed graphics such as tracers (visual representations of the trajectories of shots inserted along the path of the ball), for nearly every shot taken on the golf course, may also make available a collection, for each golfer, of footage and data for every shot taken by the golfer. This in turn permits the assembly (automated or semi-automated) of broadcasts customized for individual consumers or for different markets. For example, if a golfer is highly popular in a particular region or country, the broadcast feed in that region or country, all of the shots (or any subset desired) taken by this golfer can be segregated and inserted automatically into a custom feed. The same may be done in a more individualized manner where a consumer may, for example, indicate a list of preferred golfers and/or a desire for a combination of preferred golfers and the tournament leaders, etc., for inclusion in a custom feed that is viewed, for example, through internet-based distribution.

To make these individual feeds more efficient to produce, the images and/or footage provided by standard broadcast cameras may be supplemented by images and/or footage from the cameras included in some or all of the tracking units positioned around the course. In one embodiment, a first tracking unit positioned adjacent to the tee box for each hole includes at least a first camera and potentially additional cameras, in addition to, e.g., the radar tracking unit. For certain holes, such as those where the green cannot be clearly viewed from the first camera (e.g., holes with large elevation changes or which bend so that trees or other obstructions interrupt the sightline of the first camera before the ball reaches the green), a second tracking unit including a second camera may be positioned behind the green (i.e., on a side of the green opposite a direction of approach to the green from the fairway). Where necessary or desired, additional tracking units including additional cameras may be positioned along the length of the fairway between the tee box and the green to ensure complete coverage of every shot. For example, an initial portion of a tee shot may be shown by a standard broadcast camera located behind the tee box (or by the first camera) and, after the ball has been launched, the system may switch automatically to another camera in any of several different manners.

First, based on game logic including, for example, an analysis of the geography of a given hole (e.g., knowing the length of the hole and the distance to any items that may occlude the view of the broadcast camera behind the tee box or the first camera), the system may be programmed to switch to the second camera (e.g., located behind the green) when the ball passes a particular distance from the tee and/or moves laterally beyond a predetermined distance from a reference line. Alternatively, the system may match the trajectory of a shot measured by the first tracking unit to that measured by the second tracking unit (i.e., the system can determine that trajectories being tracked simultaneously by the first and second tracking units correspond to the same ball in flight) and, when a predetermined criteria is met (e.g., the ball is closer to the second tracking unit than to the first tracking unit) the system can automatically switch the broadcast feed to the second camera. This may be useful if one of the tracking units is a mobile unit as the use of predetermined cut-off points is not practical if the positions of the first and second tracking units relative to one another change from shot to shot.

In addition, the system can manage the individualized broadcasts so that if, in a given feed, two desired golfers take shots simultaneously or near simultaneously, a shot from one of the golfers can be identified and buffered for broadcast after the feed of a shot by the other desired golfer has been completed. Parameters for this may be set into the system (e.g., delay the feed of the second shot until a certain amount of time has elapsed after the previous shot has come to rest, etc.). This automation allows for the production of many different high quality individualized feeds without increasing the need for human operators to manage the vastly increased number of camera angle switches required, etc. The same approach described above can also be used to automatically create highlights for broadcast/webcast or on demand services (e.g., to generate clips of highlights for a specific golfer or group of golfers, etc.).

In addition, to ensure a smooth transition of announcing/commentary between the feeds, a computer-generated commentator can be used to automatically provide information relevant to the viewer, similar to what a human commentator would provide, based on information known to the tracking system. For example, historical data could be used to provide context for an upcoming shot. The historical data can comprise, e.g., phrases commonly used in each of a plurality of recurring scenarios, shots executed by the same player in similar shot scenarios, shots executed by other players in similar shot scenarios (from the same day of the same event, from a previous day of the same event, from prior tournaments, etc.), or general performance metrics compiled for the player. In another example, current data could be used to provide the context for the upcoming shot, e.g., current hole number, current shot number, distance to cup, information on the lie, etc. The automatic commentary can be provided in a textual format (e.g., as subtitles), or can be audible (e.g., computer-generated speech) or may combine audio and text. If the broadcast feed does not include an audio feed, or if it is desired to augment the audio feed, artificial sounds may be inserted into the broadcast feed, e.g., the sound of a shot (inserted into the feed when launch is detected, or after a delay, if the natural sound is muffled or unavailable for any reason), background audio, etc. The automatic commentary can be provided in substantially real-time (during a live broadcast) or can be provided in highlight clips, etc., generated after the live event.

It should be understood that the principles described herein for tracking and imaging golf balls and for the automatic production of a broadcast can be applied in other settings, e.g., for other sports, particularly in scenarios where coverage of multiple different events happening simultaneously is desired. In one example, these principles can be applied to the live coverage of a tennis tournament. In another example, these principles can be applied to the live coverage of American football, when many different American football games are occurring within a same time slot. With regard to the video feeds generated after the event (e.g., highlight reels), these principles can be applied to any sport, e.g., baseball, football (soccer), etc.

FIG. 16d shows a method 1650 for automatic broadcast feed switching according to various exemplary embodiments. The system for performing the method 1650 can include multiple cameras providing broadcast video feeds to a broadcasting entity, tracking units for 3D positional tracking of launched balls, and a tracking system comprising a processing apparatus for detecting events in the tracking data that can trigger the switch of a current broadcast video feed to a new broadcast video feed.

In 1652, a broadcast video feed is generated based on the video feeds of one or more broadcast cameras according to predefined rules. For example, a third-party broadcast can be used, i.e., a video feed controlled by a different entity (a broadcasting entity) or selected based on criteria outside the scope of the present embodiments. For present purposes, it can be assumed that a current broadcast feed is a tee-box broadcast feed showing a player in the moments before taking a tee shot.

In 1654, the tracking system detects an event for the launched ball based on trajectory data for the ball. In one embodiment, the 3D location of the ball is used as a basis to determine whether an event has been detected with respect to the current broadcast camera relative to other potential broadcast cameras. For example, when the 3D location of the ball satisfies one or more positional criteria, the event can be detected. As discussed above, these events can include: the ball passing a particular distance from the tee; the ball moving beyond a predetermined distance from a reference line; and/or other events indicating that the ball has entered or will be entering the field of view of a second camera. In another example, the events can include the launch of a shot.

In 1656, the broadcast feed is switched to the video feed of a second camera based on the detected event so that the second camera captures a second portion of the trajectory of the ball. A delay may be implemented after the event detection and before the feed switch. For example, a shot may be detected from a tee box unit and a predefined delay (e.g., 3 seconds) can be applied before switching to a fairway unit.

If the second camera is a robotic camera, the parameters for the camera can be controlled prior to switching the feeds. For example, an optimal crop, orientation and zoom for the robotic camera can be adjusted to provide a visually-pleasing video feed for viewers of the broadcast.

FIG. 16e shows a method 1660 for automatic production of custom (e.g., individualized) broadcast feeds according to various exemplary embodiments. The system for performing the method 1660 may be similar to the system for performing the method 1650 described above. In addition, the present system may comprise cameras (that can be, e.g., the same as the broadcast cameras) for detecting players in image data and identifying the player, and/or attributes thereof, for triggering the switch of a current broadcast video feed to a new broadcast video feed.

In 1662, criteria for a custom broadcast feed are received. The criteria can designate, e.g., a prioritization of players to be shown in the broadcast feed. For example, the custom feed may be generated based on criteria including: all shots for one or more particular golfers are to be shown in the custom feed; all shots for all golfers from a particular country/region are to be shown in the custom feed; tiers of particular players are identified and prioritized for broadcast accordingly; particular holes are prioritized; particular types of shots are prioritized (e.g., very challenging shots); etc. The criteria can further identify features to be overlaid on the broadcast, e.g., particular data points and/or graphics to be displayed in the broadcast feed. The criteria can encompass any manner of prioritization of players, shots, holes, or scenarios including criteria based on metrics from broadcast or social media indicating, for example, that a particular player, combination of players or a shot or hole is the subject of trending social media interest or increased betting activity. Highlights can be generated of particularly important or well-executed shots. Shots can be identified as such based on a measure of how good a shot is, e.g., the well-known "strokes gained" metric. Thus, shots having a particularly high or low strokes gained value can be included in a highlight reel. Additionally, all shots from the current leaders (e.g., 5 or 10 players) can be included.

In 1664, the custom broadcast feed is generated according to predefined rules including the custom feed criteria. For example, a third-party broadcast can be used in the custom feed broadcast at times when the custom feed criteria allow for it (e.g., when players of interest are not currently hitting a shot). In some embodiments, multiple players of interest are identified in the custom feed criteria and the video feed will switch from player to player until, for example, an event is detected triggering the switch of the broadcast to a particular camera.

In 1666, an event is detected triggering the switch of the broadcast feed to a different camera. The event can include: a player being detected and identified by a particular camera unit; an identified player being located near a launch area (e.g., tee box); an identified player being positioned in a hitting stance; etc.; these types of events relating to a pending shot to be taken. In some embodiments, to be described in greater detail below with respect to FIG. 9, a neural network can be used to detect these events related to an upcoming shot. Other types of events may include determinations of a current 3D position of a ball in flight (after launch) that are used to determine whether to switch to another camera, e.g., a camera with a FOV covering the fairway and/or the green, that can provide a better view than the current broadcast camera, as discussed above with respect to method 1650 of FIG. 16d.

In 1668, the broadcast feed is switched from the current camera to a different camera based on the event detection. The camera and/or radar unit detecting the event may be different from or located separately from the camera that is switched to.

Automatic Tracer on Every Shot

FIG. 8a shows a first image 800 from a video feed depicting a shot including an overlay of the shot trajectory, i.e., a first tracer 805 for the shot, and some associated trajectory data. In this example, the first image 800 is captured by a tee box tracking unit that includes a radar and at least one camera. The first tracer 805 can be automatically created in the images provided by the cameras in the tracking unit since, as described above, every pixel orientation in the images is known relative to the coordinate system of the radar. Even when the tracking unit is not calibrated to a world coordinate system, an overlay such as that shown in FIG. 8a can be generated. FIG. 8b shows a second image 850 from a video feed depicting a shot including an overlay of the shot trajectory, i.e., a second tracer 855 for the shot, and some associated trajectory data. In this example, the second image 850 is captured by a greenside tracking unit. A similar graphics overlay including, for example, the first tracer 805 or the second tracer 855 described above, can be inserted in images from any camera so long as the camera is calibrated to the radar tracking the shot. A tracer can be inserted in any image, such as for the video feed of an external broadcast, even when the radar unit tracking the ball is not located at the same tracking unit as the camera used for the external broadcast, as long as the radar coordinate system of the radar that tracks the ball trajectory is calibrated relative to the camera. Additional information, such as ball speed, carry and curve can additionally be tracked and displayed as numbers, such as those shown in FIGS. 8a-8b.

Ball locations determined based on radar tracking alone may include some uncertainty before more advanced aerodynamical models have been fit to the data. To provide a visually pleasant tracer, it is important that the tracer start in the image at a location accurately correlated to the position from which the ball is launched. It is consequently preferable to detect a location of the ball in one or more the image before launch of the ball as precisely as possible.

To identify a location of the ball, a ball identification algorithm can be used. When a player has been identified in a camera and is determined to be getting ready to hit a shot (e.g., based on an identified pose), the ball identification algorithm will search for the precise location of the ball in the image. This location can then be used to determine a location for the beginning of the tracer. If this data is unavailable (e.g., when the ball is obscured by deep rough) the system may need to extrapolate backward from the first detected locations of the ball in flight to a launch position that may still be corrected using the player stance as a general marker of the original ball location. Thus, as the tracking system detects a shot and outputs trajectory data, these data can be shown automatically in the broadcast as tracers with little or no human input.

Finding the ball location may also use an analysis of player movement to detect a player taking a stance over the ball (as is always done before hitting a shot) with the ball located close to the club head before starting the swing. One might also train a neural network to look for and recognize the ball by searching locations in the neighborhood of the club head when the player is taking his/her stance before the ball is struck.

FIG. 16f shows a method 1670 for automatically inserting tracers into a broadcast feed according to various exemplary embodiments. The system for performing the method of 1670 includes a radar tracking unit providing 3D positional tracks of launched balls and a broadcast camera providing a video feed of ball launches, wherein the broadcast camera (or broadcasting entity upstream from the actual camera) is configured to insert 3D graphics in the broadcast feed, the 3D graphics at least including tracers. However, in other embodiments, a tracking camera (separate from or same as the broadcast camera) can be used to provide the 3D positional tracks.

In 1672, the radar coordinate system of the radar that tracks the ball trajectory is calibrated relative to the broadcast camera. The broadcast camera can be calibrated to the radar in any of the ways discussed above. For example, for a mobile and/or robotic tracking unit (including either one or both of the tracking unit and the broadcast camera (co-mounted)), to draw a tracer in the feed from the broadcast camera, a calibration of the broadcast camera to the tracking unit coordinates is all that is required. For a camera tracking unit, a relationship between the intrinsic parameters of the camera of the tracking unit and the broadcast camera can be established for different zoom levels, as described above.

In optional 1674, a location of the ball is precisely detected in one or more broadcast images before launch of the ball. This optional step may improve the rendering of the tracer start point in the image by determining a location in the image accurately correlated to the position from which the ball is launched. A ball identification algorithm will search for the precise location of the ball in the image, which can then be used to determine a location for the beginning of the tracer. In another embodiment, player stance may be used to locate the ball, and/or a neural network can be trained to look for and recognize the ball by searching locations in the neighborhood of the club head when the player is taking his/her stance before the ball is struck.

In 1676, a tracer is generated for the broadcast video feed based on trajectory data captured by the tracking unit. If information for the precise ball location prior to launch is unavailable (e.g., when the ball is obscured by deep rough), the system may need to extrapolate backward from the first detected locations of the ball in flight to a launch position that may still be corrected using the player stance as a general marker of the original ball location. The broadcast camera can be zoomed to any zoom level independently for each stroke without requiring the tracking unit to read a zoom level from the broadcast camera (in scenarios where the baseline calibration has been performed and intrinsic parameters have been mapped to different zoom levels, allowing present parameters to be determined from like detections in a tracking and broadcast camera). In some embodiments, a first tracer can be generated for a first video feed from a first broadcast camera (e.g., located at the tee box) and follow the ball during a first portion of its trajectory (e.g., its initial trajectory), while a second tracer can be generated for a second video feed from a second broadcast camera (e.g., located at the fairway or green) and follow the ball during a second portion of its trajectory (e.g., its descent).

The live video can automatically be augmented with graphics such as, for example, tracers and lower 3rd graphics (e.g., ball speed, apex, carry, curve, spin rate etc.). In addition, other graphics can be added automatically showing, for example, player name, shot number on this hole, hole number, current score and other lower 3rd graphics seen in live sports broadcasts.

As such a fully automatic broadcast can be generated. The video of each shot can be clipped and trimmed to contain exactly the relevant timespan based on the ball tracking. Further each clip can have tags such as: player name (or playerID), shot number on this hole, hole number, etc. The clips can be stored with and/or without tracer information and/or other graphics. This database of clips will essentially contain every shot for every player for any tournament.

Automatic Detection of Events

Using the live video streams from the cameras in the tracking units, a neural network can be trained for the specific application of specific golf scenarios (e.g., tournament scenarios). The network can be applied to any camera stream and is particularly useful for the cameras of the tracking units positioned behind the tee boxes. In this case the network will output detections of events such as, for example, when players and/or other people are on the tee, when a player is getting ready to hit a ball, and when a shot is hit. These detections can be used to automate event generations useful for onsite staff, broadcasters and betting applications. The events detected may include: player on tee; player getting ready to hit shot (addressing the ball); player swinging; shot hit; tee box cleared.

FIG. 9 shows exemplary images 900-915 that can be analyzed by a neural network to detect events related to a player swing. In 900, the player is detected in the image prior to taking the shot. The neural network has not yet detected a shot-related event. In 905, the player is detected as approaching the ball. In 910, the player is detected as swinging. In 915, the player is detected as hitting the ball.

When developing an algorithm or network to recognize a golfer, the neural network can consider various factors when detecting events. One factor to consider is that, generally, only a golfer will be holding a golf club while, at the same time, positioning himself/herself in an address position to hit a golf shot. The particular angle of the golf shaft at address is also unique and can be used as well. Additionally, the relative position of the ball and the club head is a good indicator that can be used to identify a player that is addressing the ball and is about to start the swing. Technology similar to that used to identify individual golfers may also be used to exclude people moving with the golfers from such identifications. For example, caddies and their clothing may be identified and stored in the system so that, such individuals will not be identified as golfers even when they are holding clubs and/or standing over the ball.

The event detections can also be used to manage power use more effectively for the different sensors and subsystems of the tracking system. When no events requiring specific system capabilities are currently detected in the field of view of a tracking unit or other system component, power usage of that item can be reduced, for example, by placing various power-drawing components of the item in a sleep or low power mode until the system detects an event or immediately pending event that requires full activation of the item. This can be of great practical importance, since systems on the golf course are often either battery operated or powered through generators.

In a further aspect, the event detections for an upcoming shot, e.g., detecting a player approach to the ball or positioned over the ball, can be used to predict when the upcoming shot is going to happen. This can be of great practical importance with regard to live betting applications, for example, wagering on a distance traveled for an upcoming drive or a distance from the pin. For example, if the system estimates that an upcoming shot will be executed within, e.g., 5 seconds, the live betting window for that upcoming shot can be closed in dependence on the estimated shot time. Existing methods typically rely on a manual trigger to close the betting window.

For live betting applications, the tracking system can be designed to be tamper-free, or to detect tampering, so that, for example, a manual operator cannot tamper with a sensor to gain a betting advantage, e.g., by delaying a live feed of the shot so that a bet can be placed after the actual execution of the shot.

Controlling Robotic Camera from Real Time 3D Tracking Data

The tracking system will track the ball in motion with very low latency and continuously update a future predicted trajectory of the ball, enabling the system to control other cameras in real time. Using the real-time position data for the ball, the tracking system can control a robotic camera to point this camera at the current ball position (to track the ball through its flight) and can additionally control zoom and focus to ensure sharp, viewer-friendly images to which viewers are accustomed in the same manner as would be achieved by professional camera operators during golf tournaments. The robotic camera as described herein may correspond to, e.g., the broadcast cameras 315 described in FIG. 3. However, the robotic camera may also be used primarily for tracking and not as a broadcast camera.

The 3D position of the ball relative to robotic camera is known by the tracking system at all times based on the real-time data acquired by other sensors in the tracking system. Thus, an optimal crop, orientation and zoom level for the robotic camera can be controlled automatically by the system based on the real-time data. Optical tracking of the ball in flight may also be performed using an analysis of data from a robotic camera (or from any other camera) and may be used to control the robotic camera to achieve desired images using any known methods. The advantage of the proposed system is that the zoom and focus of the robotic camera can be continuously updated based on in-flight tracking of the ball by other sensors or other tracking units even when the ball is not visible or easily located in images from a particular camera (e.g., when a white ball disappears into the background of white clouds). That is, controlling the aiming and focus of a robotic camera based on three-dimensional tracking data may be used to enhance optical tracking using images from the robotic camera as this ensures that the sharpest possible images of the ball will be captured enhancing the likelihood of detection of the ball in the images. Without the knowledge of the 3D position of the ball relative to the robotic camera, this detection will in many cases not be possible or will be delayed as an optical tracking system tries to reacquire a ball whose location cannot be identified (e.g., when the camera is focused on a distance that does not correspond to a current position of the ball, the ball has been lost against a similarly colored background or when a line of sight has been occluded).

In some scenarios, the robotic camera can be located on a tracking unit that includes additional sensors, e.g., radar or lidar, wherein the entire tracking unit changes orientation based on the tracking functionality of the camera. This change in orientation can improve the tracking of the additional sensors, in addition to the tracking of the robotic camera. For example, some shots may have unexpected trajectories (e.g., poorly hit shots) that are not well-covered by the initial FOVs of the sensors. When these shots are detected by the tracking camera, the orientation of the entire tracking unit, including the additional sensors, may be changed to provide, e.g., an improved sensitivity for the radar.

The robotic camera can be used to replace a manual operator of a camera and can make the video footage much more appealing to viewers. It also enables possibilities for making closeup footage to illustrate, including, for example, the lie of the ball.

To ensure stable and viewer friendly movement of the robotic camera, a special filtered version of the real time 3D data from the tracking system can be generated and used to control the robotic camera. Additionally, knowledge about the characteristics of the robotic camera controls, such as delay, max angular acceleration, max angular velocity, focus delays, etc., can be considered and compensated for when controlling the camera. The robotic camera may also be used as a tracking sensor for club and ball positioning in world coordinates. However, this requires calibration of the robotic camera as the field of view is not static.

Calibration of Robotic Camera

To use a robotic camera as a tracking sensor, the robotic camera needs to be calibrated. The calibration includes two parts: the extrinsic and intrinsic calibration. As described above, the extrinsic parameters essentially include two parts: a determination of the position of the camera in world coordinates and an orientation in world coordinates. The determination of the position of the robotic camera is done in a manner similar to that employed for the tracking units and/or the broadcast cameras as described previously. What remains is to determine the orientation in world coordinates and the intrinsic parameters.

FIG. 10a shows an exemplary image 1000 captured by a robotic camera 1005 for determining an orientation of the robotic camera 1005 in world coordinates 1020. The image 1000 is shown with a two-dimensional (u,v) coordinate system local to the camera 1005. A ball 1010 has been located in the image 1000 at pixel coordinates $(u,v)_b$ 1015 in the image. There are various methods to determine the location of the pixel $(u,v)_b$ 1015 in world coordinates 1020.

According to a first option, the position of the pixel $(u,v)_b$ 1015 can be determined in world coordinates 1020 by pre-calibrating the intrinsic parameters (e.g., focal length, principal points, lens distortion, etc.) for each different zoom level used by the robotic camera 1005. The orientation of the robotic camera 1005 in world coordinates 1020 is determined by using the offset of pan and tilt of the orientation of the camera 1005 when viewing the ball 1010, determined from pan/tilt sensors on the camera or from the tracking-based control signal applied to the camera orientation, as compared to a pre-determined orientation of the robotic camera 1005 in which a calibration relative to world coordinates was performed, for example, in a manner similar to that described previously for the tracking unit camera and/or the broadcast camera. That is, the system determines based on pan/tilt information. a three-dimensional line described by a vector R and a point p in world coordinates, where p is the position of the camera. This vector R extends in the direction from the camera (e.g., from a focal point of the camera, the point p) towards the ball (or any other object whose location is to be determined). Knowing this line from the camera in three dimensions, the three-dimensional position of the ball (or other object) on the line described by the vector R and the point p may be obtained by combining data on this line to distance information for the ball (e.g., radar or other data in world coordinates or in any other coordinates that can be translated into a coordinate system for the camera) or by determining where the line described by the vector R and point p intersects with the surface of the golf course as represented in a three-dimensional model of the golf course. This allows the three-dimensional position of the ball along the line described by the vector R and point p to be determined in three dimensions in world coordinates. Those skilled in the art will understand that determining the position of the ball by identifying an intersection of the line described by the vector R and point p and a three-dimensional model of the surface of the golf course, allows the determination of the position only of a ball that is resting on the surface of the golf course. The further options described below describe different methods of identifying this vector R so that this information can be used with distance information or three-dimensional surface model information to locate the ball in three dimensions in world coordinates based on the pixel location in an image from the camera.

According to a second option, the position of the pixel $(u,v)_b$ 1015 can be determined in world coordinates 1020 by first detecting the position of pixel $(u,v)_b$ 1015 in the image 1000 in local (u,v) coordinates, then changing the orientation of the robotic camera 1005, without changing a zoom level, to point the robotic camera 1005 toward a predetermined reference position 1025, ensuring that the reference position 1025 is located in the same position in the image $(u,v)_b$ as the ball 1010 was located in the image 1000.

FIG. 10b shows a process for determining an orientation of the robotic camera 1005 based on the first image 1000 of FIG. 10a and a second image 1030 captured by the camera 1005 using a different orientation. Similarly to FIG. 10a, the ball 1010 has been located in the first image 1000 at pixel coordinates $(u,v)_b$ 1015. The camera 1005 changes orientation so that a reference position 1025 (whose location is known in world coordinates) is located in the second image 1030 at coordinates $(u,v)_b$ 1015 same as the coordinates $(u,v)_b$ 1015 in the first image 1000. This enables the system to identify the line described by the three-dimensional vector R from the camera to the ball in the first image 1000.

The offset of the pan and tilt between the two scenarios is then used to calculate the vector R (three-dimensional orientation of the camera in world coordinates 1020 when viewing the ball 1010 relative to the reference position 1025). A clear advantage of this method is that the intrinsic parameters of the camera 1005 have no impact on the accuracy of the determination.

According to a third option, the position of the pixel $(u,v)_b$ 1015 can be determined in world coordinates 1020 by first detecting the position of pixel $(u,v)_b$ 1015 in the first image 1000 in local (u,v) coordinates, then detecting the same position in a second image 1040 from a tracking unit camera 1035. In a preferred embodiment, the robotic camera 1005 and the tracking unit camera 1035 are co-located, but this is not required.

FIG. 10c shows a process for determining an orientation of the robotic camera 1005 (three-dimensional vector R) based on the first image 1000 of FIG. 10a and a second image 1040 captured by a second camera 1035. The second camera 1035 may be a tracking unit camera calibrated to world coordinate system 1020. The first image 1000 from the robotic camera 1005 can be located within the second image 1040 from the tracking unit camera 1035. One option for locating the first image 1000 within the second image 1040 is to perform feature matching between the two images 1000, 1040, using identified features 1045 whose locations are known in world coordinates (e.g., trees, bunkers, lakes, golf flags, green contours and other unique features that can be identified in the images). Since the position in the second image 1040 is known in world coordinates 1020, this can be transferred to the first image 1000, whereby a combination of the vector R, the position p of the camera in world coordinates, and distance information allows for the determination of the world coordinate position of the ball 1010 in the robotic image 1000 using distance and/or a three-dimensional model of the golf course as described above.

According to a fourth option, the position of the pixel $(u,v)_b$ 1015 can be determined in world coordinates 1020 by first detecting the position of pixel $(u,v)_b$ 1015 in the first image 1000 in local (u,v) coordinates, then zooming out the first image 1000 (e.g., generating a second image 1050 comprising a zoomed out version of the first image 1000) so that at least two reference points 1060, e.g., 1060a and 1060b, are visible in the image 1050.

FIG. 10d shows a process for determining an orientation of the robotic camera 1005 based on the first image 1000 of FIG. 10a and a second image 1030 comprising a zoomed out version of the first image 1000. Similarly to FIG. 10a, the ball 1010 has been located in the first image 1000 at pixel coordinates $(u,v)_b$ 1015. The camera 1005 zooms out so that reference points 1060 are visible in the second image 1030, while the pixel location at coordinates $(u,v)_b$ 1015 in the second image 1030 remains the same as the coordinates $(u,v)_b$ 1015 in the first image 1000. The reference points 1060 are detected in the second image 1050 at some pixel locations 1055, e.g., 1055a and 1055b, while keeping track of the location 1015 of the ball position in the image 1000. Assuming negligible lens distortion, it is necessary only to determine the focal length. The focal length is determined by correlating the reference point positions 1055 with the predetermined angles in world coordinates 1020 of the corresponding two reference positions 1060. Hereafter, the position of the ball 1015 in the zoomed-out image 1050 can be determined in world coordinates 1020.

FIG. 16g shows a method 1680 for calibrating a robotic camera to a world coordinate system according to various exemplary embodiments. The system for performing the method 1680 can include only the robotic camera and a processing apparatus for controlling the operation thereof. In some embodiments, the system can include a further camera.

In 1682, a robotic camera is provided with uncalibrated intrinsic parameters. For example, the robotic camera was either recently powered on or recently changed orientation relative to a previous orientation.

In 1684, a first image (e.g., a calibration image) is captured with the robotic camera and a ball is detected in the image. The (u,v) coordinates of the ball are determined in the camera coordinate system.

In 1686, a second image is received from either the robotic camera (using a different orientation and/or different zoom level) or from a second camera capturing a second image of the same ball at the same time.

In 1688, the orientation of the robotic camera is determined based on the first and second images.

Safety/Warning System for Onsite Spectators

The real time ball flight tracking can be updated in real time to predict, while the ball is in the air, a landing spot, as described above. This landing spot prediction can be used to warn spectators of an errant shot approaching, e.g., an automatic 'FORE'. For example, spectators in the affected area can be given appropriate instructions to seek cover, protect their heads, etc.

The alerting system may include, for example, wired or wireless geo-referenced speakers that can be triggered by the tracking system. The golf course would preferably be divided into different spectator zones. The FORE warning can be triggered in one or more spectator zones whenever an errant shot is approaching these zones with sufficient probability. The warning system could also be a personal application on a smartphone, tracking the location of each spectator (or any spectators that opt into the service). A special warning, such as a vibration/sound or similar, can be triggered by the smartphone application when an errant shot is likely to land in a zone in which a spectator is located.

FIG. 16*h* shows a method 1690 for a warning system for on-site spectators according to various exemplary embodiments.

In 1692, trajectory data is captured using one or more first sensors.

In 1694, a landing spot is predicted based on the trajectory data captured thus far. The landing spot prediction may be initially performed at an earliest possible time during the flight of the ball and subsequently refined as more trajectory data is captured. The landing spot prediction may comprise a particular point, with the alert area having a predefined radius of uncertainty relative to the point, or may comprise an area based on an actual estimated uncertainty.

In 1696, an alert is triggered and delivered to any interested parties, e.g., within the alert radius. In one example, a speaker located in the proximity of the predicted landing position can be activated to provide an auditory alert. In another example, an alert can be transmitted to the devices of spectators located in the landing spot.

Amateur Round Tracking

All the features of the system described above can be implemented on any golf course. All the ball trajectory tracking is completely independent of the quality of the shots and applies equally well to amateurs as professionals. Additionally, amateur rounds may be played in a manner similar to the customs and rules governing professional golf tournaments, and thus the game logic discussed above for professional events can be similar to amateur rounds. For example, a group of typically 1-4 players first plays hole 1, then hole 2, etc. Thus, the detailed playerID tracking described above can be performed in a substantially similar way.

One aspect of professional event tracking that might not be available for an amateur round is pre-stored information regarding the identities of players in a given group. In order to associate the tracking of the golf round with a particular golfer, some additional functionality can be used.

In one embodiment, an application connected to the tracking system can be installed on, for example, a smartphone or smartwatch. Each golfer can provide a positive indication within the application that can be used to associate a tracking system playerID with the golfer, for example, at the beginning of a round. There can be a special area around the first tee, e.g., a small, marked area on the ground with room for only one person, where a player can synchronize the smartphone with the tracking system. For example, the user can push a 'sync' button in the application while located in the special area, causing the player's name and credentials to be associated with a unique playerID in the tracking system. In another embodiment, the tracking and association of the playerID could also be done via a beacon of some kind, e.g., a smartphone or smartwatch with geolocation functionalities.

In another embodiment, a device worn by the player, e.g., a smartwatch, can be used to detect a swinging motion by the player. The device can be associated with the player and comprise an accelerometer (or other sensor capable of detecting such motion) and processing logic for detecting a change in acceleration that corresponds to a golf swing. The device can have GPS capabilities (or be linked to another nearby device, e.g., a smartphone, that has GPS capabilities) so that an approximate position of the player at the time of the swing can also be detected. The device can also be operable to associate the swinging motion with a time stamp. Thus, when the tracking system detects a shot (and an associated time of shot), the shot can be matched with a detected swing that matches the timing and location of the shot. Particularly in amateur round tracking, there is no requirement that the matching between the swing and the shot be performed in real-time. Thus, the swings detected by the device (and the associated timestamp) can be matched in time to shots detected by the tracking system at a later time, e.g., the end of the round. This would be particularly useful in scenarios where, for example, the device worn by the player has limited capabilities with respect to wireless coverage, processing power, etc. The device can store the swing detections with associated timestamp until a later time when the swing data can be associated with the tracking data. In one embodiment, the player associated with the device can verify the shot information associated with detected swings at the end of the round to ensure the accuracy of the matching. In an alternative embodiment, the player carries a location determining device, such as a mobile phone. The device will record the path in world coordinates of the device with associated timestamps, which can then be matched to the determined launch locations of the shots tracked by the tracking system. The location determining device does not need to be worn by the player, but could be in the player's bag, which will always be in the vicinity of where the player launches the ball from.

The image profile for the player may be stored in the tracking system for future golf rounds, or may be created prior to every golf round. The respective tracking systems of multiple courses could, potentially, share these image profiles under some circumstances. After each round played, the captured data may be transferred into a personal application where each round can be reviewed with all the tracking data for later analysis across golf rounds.

In one embodiment, the ball tracking data may be transferred into a personal application immediately after being recorded, so that the player can review the data while playing the round of golf One particularly interesting application for this feature could be to aid a golfer in finding his/her ball. For example, when a shots is hit that cannot be easily found by the golfer, the personal application may narrow down the location where the ball is likely to be found, for example, on a golf hole map provided within the application, or on another map application (e.g., Apple Maps or Google Maps). This feature can be particularly useful when trying to find a ball in deep rough, where narrowing down the search area substantially increases the likelihood of finding the ball while also reducing the time required to find the ball.

In the case where the golfer hits a shot travelling into a hazard, depending on the golf rules for the specific hazard, the golfer may be given the option to drop a new ball according to where the previous shot crossed the hazard line. Since the system has a track of the ball trajectory and thereby knows accurately where the ball crossed the hazard line, the system can accurately determine the areas where the new ball is allowed to be dropped. This can solve the sometime controversial determinations as to where a ball can be legally dropped, saving time and duress for the golfer while reaching a fairer result. The identification of the allowable drop areas may be indicated in the software application showing the layout of the hole with allowable drop areas.

Non-Fungible Token (NFT) Generation

The proposed system will automatically be able to film and track any special event happening during a golf round, this could be a hole-in-one or any other particular other unique golf shot or event occurring. The system might be configured to automatically detect such moments and create a video clip that might include ball tracer, club and/or ball trajectory information. Creating these clips can be created in such a way that only 1 single digital copy can exist and can thereby by used as a non-fungible token (NFT).

Introduction to Camera Un-Projection Applications

For tracking shots, e.g., from the teebox or hit onto the green, a tracking system may include a radar, a radar and camera in combination, or several additional sensors in combination. These different sensors can track different and/or overlapping portions of the flight of a golf ball. Each of the sensors acquires object data made up of measurements of the ball at one or more times, in a coordinate system specific to the device and, when calibrated to one another, their data may be projected into a global coordinate system with a high degree of consistency for further processing and fusion of data. A Doppler radar capable of angular and absolute range measurements can track the ball accurately in three dimensions; a tracking unit equipped with a radar and a camera can use image tracking to enhance the angular measurements for more accurate tracking; and a system including multiple cameras with overlapping fields-of-view can use stereoscopy to determine a ball position in three dimensions.

Calibration of the sensor is important for accurate measurements. Calibrating a sensor requires a determination of various parameters, both internal and external to the sensor. Internal parameters may comprise of a focal length, lens distortion parameters and a principal point for a camera, and phase offsets for a radar. External parameters typically constitute a position and orientation of the sensor.

Known systems based on Doppler radar tracking have shortcomings, for example: when the ball travels at low speed or rolls on the ground; if the ball travels at certain angles relative to the direction from the radar to the ball, such that the radial velocity $v_r$, relative to the radar, is low; when the ball comes to rest, and the Doppler radar tracking fails completely. Known systems relying on stereoscopy to track the ball can determine a three-dimensional trajectory of the ball even at low speeds but are typically unable to deliver metrics relevant to understanding the short game in golf without a detailed model of the golf course.

Internal or intrinsic parameters of a sensor may be generally defined as parameters relating to the internal workings of the sensor. The intrinsic parameters of a camera are those parameters necessary to link the pixel coordinates of an image point with the corresponding coordinates in the camera reference frame and include the focal length, principal point, and lens distortion parameters. The intrinsic parameters of a camera can be measured in a production setup and stored in the system, and methods for determining the intrinsic parameters in a laboratory setting are considered known to one skilled in the art.

External or extrinsic parameters of a sensor may be generally defined as parameters relating to the positioning of the sensor (e.g., position and orientation) in relation to world coordinates. Knowledge of the external parameters of a sensor allows for the mapping of measured data from the coordinate system of the sensor to that of the global coordinate system, such that it may be compared with data from other sensors or with positions in a three-dimensional model of a part of a golf course.

The extrinsic parameters can be determined in several ways, as will be understood by those skilled in the art. A preferred method of calibration is to measure the GPS position of the camera and a few reference points on the golf course within the field-of-view of the camera. A calibration image is captured with the camera and the location in the image plane of the measured reference points can be determined by human annotation or automatic detection means to calculate the extrinsic parameters. Easily recognizable features that can be used for calibration include, e.g., the location of the pin (hole), edges of bunkers, or objects that are placed temporarily or permanently on the course to be used for calibration purposes. The GPS position of the reference points can be supplemented by a measurement of the distance and/or height difference between the reference point and the camera using, e.g., a laser range finder or similar instrument.

A tracking camera for tracking bounces and rolls and/or rest position according to the present embodiments is typically placed behind the green and mounted to a TV tower or similar structure from which position the camera field-of-view contains the green and surrounding areas. The camera can also be placed along the fairway on long par-5 holes to capture the ball landing position on the fairway. The tracking functionality according to the present embodiments can be implemented using a single camera, e.g., does not require multiple cameras utilizing stereoscopy techniques.

In an embodiment, the lie of the ball is determined based on an image from the single camera of the ball at rest and the 3D model of the terrain at the rest position of ball.

In some embodiments, a system and method is provided to track and provide tracking metrics of bounces and chip shots using a single camera and an accurate 3D model of a part of a golf course, the single camera being calibrated to a part of the golf course covered by the 3D model, by capturing a sequence of images with the camera, detecting a ball in the images, un-projecting the pixel location of the ball detection thus producing lines in 3d space from the camera to the ball position, determining a start and end line corresponding to the start and end of the track, intersecting the 3d model with the start and end line, applying a physical model and determining the track of the ball.

In an embodiment, it is determined whether a ball detected in a sequence of images is bouncing or rolling.

In an embodiment, 3D tracking of the roll of the ball is provided by detecting the ball in a sequence of images, un-projecting the pixel location of the ball detections thus producing lines in 3D space from the camera to the ball positions, intersecting the 3D model with the lines, and determining the track of the ball.

In an embodiment, the stimp of the green is determined from the track of a putt and the slope of the terrain in the 3D model.

In an embodiment, the putt break fan is determined for a given initial ball position, the putt break fan is compared to a measured 3D putt trajectory and the sensitivity of the ball launch parameters for a successful putt is determined. The putt break fan will be described in greater detail below.

In an embodiment, radar tracking of the golf ball is used to guide the ball detector to an appropriate image in time and an appropriate search region within the image.

In an embodiment, an image is captured from the camera, it is determined whether the image contains a person and/or if the person is a golfer in address, and based on this detection the ball detector is guided to an appropriate image in time and an appropriate search region within the image.

In an embodiment, the external calibration parameters of the camera to the 3D model are updated based on the tracking of a bounce.

3D Surface Model for Golf Course or Part of Golf Course

According to various exemplary embodiments described herein, a three-dimensional model of an entire golf course, or of specific parts of the golf course (e.g., one or more greens and areas immediately surrounding these greens), can be used to improve and enhance the tracking of shots within the area covered by the 3D model.

The 3D model is a representation of the golf course (or part of the golf course) stored in computer memory and can be used for rendering 3D graphics of the golf course. The 3D model for a particular golf hole preferably covers parts of the area within the field-of-view of a single camera used for tracking the golf ball according to the present embodiments. Thus, the 3D model covers, at a minimum, the terrain around the green where shots hit from the tee or from the fairway are likely to land. The model can also cover part or all of the fairway and the surrounding rough and/or semi-rough, or it can cover an entire hole. To cover an entire golf course where multiple cameras are used, multiple 3D models may be used, each covering a section of the course, or one 3D model covering the entire course can be used. It is understood by those skilled in the art that any reference to world coordinates can apply to a coordinate system common to all the holes on the golf course or to the area of a single hole on the golf course. The use of the world coordinate system is to allow measurements from different sensors to be fused and to allow measurements of the ball position to be mapped to the 3D model. The world coordinates do not have to be universal to all of the sensors covering a round of golf. That is, so long as all of the sensors tracking the flight of any shot can translate their data to a common coordinate system, the desired results will be obtained. Thus, if one group of sensors covers hole number one and only hole number one, it is not necessary that these sensors should be able to translate into a common coordinate system the data from the sensors of hole number 2. Thus, the use of the term world coordinate system implies only that this system is correlated to the physical surroundings of the sensors and does not imply that this coordinate system is required to be universal throughout out all of the sensors in operation on a golf course.

The 3D model contains, at a minimum, a surface model representing the height of the terrain for a given position on the course. This surface can be represented as a mesh of triangles, as a spline surface, or as another representation well known to one skilled in the art. The surface can also be represented by a coarse model providing a rough representation of the height of the course in combination with one or more fine models providing a more detailed surface map of some or all features represented by the 3D model, wherein the fine model represents an offset to the coarse model. The coarse model can be provided for a given geographic area, while the fine model can be provided only for parts of the area covered by the coarse model, for example, where play is most likely to occur or where extra accuracy of the surface is desired. These areas may include the fairway and surrounding semi-rough, bunkers, the green and the area surrounding the green. This scheme including the coarse model and one or more fine models can be advantageous by avoiding creating and processing a detailed model of the entire course.

In a preferred embodiment, the 3D representation of the golf course is given in world coordinates, such that GPS locations can easily be mapped onto the 3D representation. The 3D representation can also be provided in a local coordinate system and associated with a well-known mapping to world coordinates. The ability to map GPS, and/or a world coordinate system, to the 3D model enables the camera extrinsic parameters to be related to both the golf course and the 3D model, thus enabling the position of the ball on the ground to be determined by capturing an image with the camera, detecting a pixel location of the ball in the image, un-projecting the detection by applying intrinsic and extrinsic camera parameters to determine a camera-ball line in a coordinate system, e.g., a world coordinate system, and determining the intersecting between the camera-ball line with the 3D model.

In one embodiment, the 3D model contains a representation of the types of terrain present on the part of the golf course represented by the model, e.g., each triangle in the mesh may have a terrain type associated with it, or the terrain type can be represented in the fine height model. Types of terrain can include at least the features fairway, rough, semi-rough, bunker, green and fringe, but more features can be included for a more granular representation of the various terrains found on a golf course. These features can be used to improve the tracking of the trajectories of balls impacting these terrains, as will be described below. The model can also include a representation of non-terrain features such as trees, bushes and buildings that can offer realism to any graphics rendering that is based on the 3D model, however, these non-terrain features are generally not used for any tracking purposes.

The 3D model can be obtained, for example, by drone scans using either lidar, optometry, or a combination thereof, or by another method known to one skilled in the art. A scan can result in a point cloud from which a 3D surface model can be created using techniques well known to one skilled in the art. The relation of the course local coordinate system to world coordinates can be established by mapping out several fix points identifiable in the 3D model with accurate GPS measurements. The PGA TOUR, for example, has detailed maps of the golf courses used for play on the TOUR.

System for Determining Ball Position Using Un-Projector

FIG. 11 shows an exemplary tracking system 1100 including at least one camera 1105 capturing a sequence of images of a ball including the ball at rest and a processing arrangement for tracking the ball and/or determining a position of the ball at rest according to various exemplary embodiments. The processing arrangement includes a ball detector 1110 determining a position of the ball in the image coordinate system, an un-projecting module (un-projector) 1115 using intrinsic and extrinsic camera parameters 1130 to determine a camera-ball straight line in 3D space from the camera 1105 to the ball, and an intersection module (intersector) 1120 using a 3D model 1135 of a part of a golf course to determine an intersection point between the camera-ball straight line and the 3D model 1135. The processing arrangement further includes, an output generator 1125 for outputting the determined information for use, e.g., during a broadcast. FIG. 11 is described below in coordination with FIG. 12.

FIG. 12 shows an exemplary diagram 1200 including the camera 1105, the terrain 1205 of the golf course and the corresponding 3D model 1135 overlaid on the golf course terrain 1205 according to various exemplary embodiments. The diagram 1200 includes a trajectory 1210 of a golf ball including an impact position 1215 and a final rest position 1220 of the ball and an exemplary camera-ball straight line 1225 intersecting the 3D model 1135 at the final rest position 1220 of the ball.

The camera 1105 has a sensor and lens chosen to provide a field-of-view (FOV) of a part of the golf course where tracking is to be performed with the tracking system 1000, e.g., a terrain including a green and surroundings including the fairway in the direction that a shot is most likely to be hit. Alternatively, if the camera 1105 is positioned to capture shots that land on the fairway, the FOV of the camera 1105 can cover the part of fairway where shots from the tee or approach shots to the green are most likely to land, e.g., the terrain 1205 shown in FIG. 12. The resolution of the camera 1105 is selected to provide enough pixels of the ball for the ball detector 1110 to operate effectively. For example, the minimum cross section of the ball as seen in the captured images should be in the range 3-10 pixels. The camera captures a sequence of images 1190 ( . . . $i_{(n-1)}$, $i_{(n)}$, $i_{(n+1)}$, . . . ) with a certain frame rate $f_s$ preferably between 30 and 100 frames per second. In a preferred embodiment, a captured image, $i_{(n)}$, includes metadata including, at a minimum, the time, $t_n$, at which the image was captured. The metadata can also include the exposure time for the image, the crop region of the sensor captured in the image, and potentially other parameters.

Once captured, each image from the sequence of images 1190 captured by the camera is passed to the ball detector 1110, which includes one or more algorithms for determining whether a ball is present in a particular image 1195 and the pixel location (u,v) of the ball. The algorithm can include a convolutional deep neural network (CNN) trained for detecting golf balls in an image. If a ball is detected in an image, the ball detector 1110 sends (u,v) coordinates, and possibly the image itself and parts of the metadata, to the un-projector 1115.

The un-projector 1115 receives information from the ball detector 1110, including, at least, the (u,v) coordinates of the ball, and reads the stored intrinsic and extrinsic calibration parameters 1130 from memory or external storage. With this information, the un-projector 1115 determines a camera-ball line 1225 in 3D space comprising a straight line passing through the focal point of the camera 1105 in the direction of the ball based on the (u,v) coordinates in the image plane and the camera intrinsic and extrinsic parameters 1130, as shown in FIG. 12. In case the captured image does not cover the entire field of view of the camera 1105, the un-projector 1115 also uses information on the crop region of the image to determine the camera-ball line 1225. The crop region can be part of the image metadata passed from the camera 1105 or ball detector 1110, or, if constant for an entire sequence of images, it can be stored in the system 1100 at the time of calibration or at system initialization and made accessible to the un-projector 1115 in a manner similar to the stored calibration parameters 1130. The un-projector 1115 sends a representation of the camera-ball line to 1125 the intersection module 1120.

The intersection module 1120 executes an intersection algorithm based on the camera-ball line 1225 and the 3D model 1135 of at least a part of the golf course overlapping with the FOV of the camera. The intersection module 1120 receives the camera-ball line 1225 from the un-projector 1115, reads the 3D model 1135 from memory or external storage and determines the intersection 1220 between the camera-ball line 1225 and the 3D model 1135. The 3D point representation of the intersection 1220 is used to determine the ball location on the course. When the ball is at rest, this intersection 1220, which can be represented as a 3D point in space, is the ball position on the course and the terrain height at the ball position. The method for determining the intersection can depend on the representation of the 3D model, e.g., whether the 3D model is a mesh of triangles, a spline surface, or any other surface representation. In some instances, the method can be iterative, or the intersection can be formulated as the solution to an optimization problem and solved by employing a numerical solver.

In a scenario where the ground is uneven or has small hills, or if the ball is located at the edge of a bunker, there may be more than one intersection between the 3D model 1135 and the camera-ball line 1225. For example, additional intersection points 1230 and 1235 between the 3D model 1135 and the camera-ball line 1225 are shown in FIG. 12. In this case, the intersection module 1120 may determine the position of the ball to be the intersection 1220 between the camera-ball line 1225 and the 3D model nearest to the camera 1105.

The intersection module 1120 passes the 3D coordinates of the intersection 1220 to the output module 1125. The output module 1125 interfaces to any output means necessary to use the information on ball location, such as: a database 1140 for storing information of the shots taken during play; a 3D graphics rendering engine 1145 capable of depicting the ball location for TV or online audience by, e.g., a top-view of the course; as input to a calculation and/or graphical illustration of the distance from the resting ball location to the tee position (for actual carry including bounce and roll); or as input to a calculation and/or graphical illustration of the distance from the ball location to the flag or other interesting features of the golf course such a bunker, lake or green.

The system 1100 can include a radar 1150 and a radar tracker 1155 capable of measuring the ball position as a function of time, where the radar 1150 is calibrated to the same coordinate system as the tracking camera 1105, preferably the world coordinate system 1240, and the radar 1150 is time-synchronized to the tracking camera 1105 so that each image can be correlated to a radar-measured ball position. In this scenario, the ball positions as detected by the radar 1150 may be mapped into the image plane of the camera 1105, using a projector 1160, to narrow the search window of the ball detector 1110. This is especially advantageous as the ball enters the field-of-view of the camera 1105, including, e.g., the green and the area surrounding the green for a green-side camera 1105, as in some situations the ball detector 1110 needs to be run only when a ball has previously been detected by the radar 1150.

The radar 1150 may be, for example, a continuous wave Doppler radar emitting microwaves at an X-band frequency (10 GHz) at a power of up to 500 milliwatts EIRP (Equivalent Isotropic Radiated Power), thus being compliant with FCC and CE regulations for short range international radiators. However, in other jurisdictions, other power levels and frequencies may be used in compliance with local regulations. In an exemplary embodiment, microwaves are emitted at a higher frequency between, for example, 5-125 GHz. For more precise measurements at lower object speeds, frequencies of 20 GHz or higher may be used. Any type of continuous wave (CW) Doppler radar may be used, including phase or frequency modulated CW radar, multi frequency CW radar or a single frequency CW radar. It will be understood that other tracking devices such as lidar may be used with radiation in either the visible or non-visible frequency region. Current pulsed radar systems are limited in their ability to track objects close to the radar device. However, the distance an object must be from these pulsed radar systems has decreased over time and is expected to continue to decrease. Thus, these types of radar may soon be effective for these operations and their use in the systems of the invention described below is contemplated.

Any type of radar capable of three-dimensionally tracking objects may be used. An MFCW Doppler radar operating in the X-band, or anywhere in the allowed band, can be equipped with multiple receiving antennas spaced in a two-dimensional array for measuring phase differences between receivers and deriving therefrom the direction to the ball in a local radar coordinate system using knowledge of the wavelength of the transmitted wave and transmitting multiple frequencies for measuring phase differences and deriving therefrom the range to the ball from knowledge of the wavelengths of the transmitted waves.

The radar tracker 1155 serves to detect in the raw sensor data the moving objects of interest, and, where possible, to piece together successive detections of the same moving object into "tracks". A track is therefore one or more detections of a moving object at successive times. The track may be smoothed to remove the influence of noise and the track may be represented in a manner allowing positions along the track to be interpolated between measured positions or to be extrapolated both forward and backward in time beyond the measured positions.

Calibrating the radar 1150 to world coordinates, or any common coordinate system used for the camera 1105 and the 3D model 1135, requires determining the position and orientation of the radar. For this purpose, the radar unit may be equipped with a camera with known internal parameters as previously described and with a known relative position and orientation to the local radar coordinate system. The radar external parameters may then be determined like the determination of the camera external parameters.

In a preferred embodiment, the radar 1150 and camera 1105 are built into one physical hardware unit with a known camera-to-radar calibration, which can be determined when the unit is produced. Thus, once the unit has been calibrated to the golf course using the techniques described above or a similar method, both radar 1150 and camera 1105 are calibrated to world coordinates and measurements can be referred to the 3D model 1135 of the part of the golf course in the same coordinate system.

In a preferred embodiment, the track of the golf ball in flight is determined using positions determined by the radar 1150 in combination with detections of the ball detector 1110 based on the images captured by the camera 1105. Thus, a more accurate ball track can be obtained. If a Kalman filter is used to smooth the radar positions over time, the ball detections from the camera 1105 can be used as an input to the Kalman filter to enhance the accuracy of the position determinations. Using the enhanced radar trajectory, a more accurate ball landing position may be determined than a position determined using the radar measurements alone. The ball landing position can be determined as the intersection 1220 between the ball track and the 3D model 1135 of the part of the golf course in a manner similar to the method for determining the intersection between the camera-ball line and the 3D model as previously described.

In a preferred embodiment, the ball detector 1110 can be guided to reduce the search area to a neighborhood of the expected ball position in the image, thus reducing the computations required to detect the ball. Ball positions from the radar can be projected into the image through knowledge of the internal and external parameters of each sensor, or the ball detector can include memory of the position of the ball detected in previous images such that, for each new image received from the camera, a search area for the ball can be determined using the prior information on where the ball was detected in one or more previous images. This information may be stored in the ball detector 1110 as an array of (u,v) coordinates for previous frames. The ball detector 1110 may alternatively include an array of previous images such that, when processing a new image, image information in the search region from several consecutive images can be fed to the neural network simultaneously to enhance the detection rate and accuracy of the neural network.

Furthermore, the ball detector 1110 can be equipped to handle several balls within the search region. In a golf round or golf tournament, under normal conditions, only one ball at a time will be moving at a certain hole, and any other ball will be at rest. By detecting multiple balls in the search region with the neural network and using saved detection information from previous images, it can be determined which of the ball detections represents a ball at rest and which ball detections represent a moving ball. Alternatively, a neural network trained to use regions of several consecutive images for ball detections can determine as part of the output which detections represent a resting or moving ball. This enables the search window to be updated according to the ball which is moving and to not lose track of the ball even when multiple balls are present in the image. The methods described herein allow a limited search window to be employed after the initial ball detection has been made when no radar is present in the system or when the radar tracker 1155 is no longer capable of tracking the ball.

The ball detector 1110 determines when a moving ball comes to rest by comparing (u,v) coordinates of ball detections in two or more consecutive images. After this determination has been made, the ball detector 1110 signals the un-projector 1115, intersector 1120 and output module 1125 to make appropriate calculations as detailed above and to produce the output. If a previous radar track for the golf shot has been determined, the rest position of the stroke thus determined is connected to the radar measurement, preferably by labelling it with an identifier also used to label the radar track.

FIG. 17a shows a method 1700 for determining 3D positional coordinates of a ball according to various exemplary embodiments. The system for performing the method 1700 at least includes a camera and a processing apparatus for detecting the presence of a ball in an image, un-projecting the image coordinates into 3D coordinates, determining a camera-line ball in 3D coordinates and determining an intersection point of the camera-line ball. Various ones of the aforementioned steps can be enhanced if radar data is additionally available, as explained above. The intersection point of the camera-ball line with the 3D model determines the position of the ball in 3D coordinates. In some embodiments, the system determines whether the ball is at rest and the position in 3D coordinates is the rest position In 1702, a camera captures a sequence of images. The camera has a sensor and lens chosen to provide a field-of-view (FOV) of a part of the golf course where tracking is to be performed and a resolution selected to provide enough pixels of the ball for the ball detector to operate effectively. The camera captures the sequence of images ( . . . , $i_{(n-1)}$, $i_{(n)}$, $i_{(n+1)}$, . . . ) with a certain frame rate $f_s$. Metadata including, e.g., the time, $t_n$, at which the image was captured, the exposure time, the crop region, and potentially other parameters, can be included with the image.

In 1704, the processing apparatus, e.g., the ball detection module thereof, receives the images in sequence from the camera and executes a ball detection algorithm on the images to determine whether a ball is in the image and a pixel location in (u,v) coordinates of detected balls. In some embodiments, the ball detector can use radar data to, e.g., narrow the image area searched or to trigger the execution of the ball detection algorithm in time. The radar and the camera can be built into one physical hardware unit, or can be located separately, as long as the radar and the camera are commonly calibrated to, e.g., world coordinates. In some embodiments, the ball detector can provide ball detection to the radar/processing apparatus for improving the radar tracking and, in turn, improving the accuracy of subsequent ball detections. In one embodiment, the ball detector determines when a moving ball comes to rest by comparing (u,v) coordinates of ball detections in two or more consecutive images The ball detector can narrow a search area based on prior information, e.g., an array of (u,v) coordinates for ball detections in previous frames. The ball detection algorithm can include a convolutional deep neural network (CNN) trained for detecting golf balls in an image, which can receive image information for the search regions from an array of previous images to enhance the detection rate and accuracy of the CNN. Additionally, the ball detection algorithm can be equipped to handle several balls within a search region using logic to determine which of the ball detections represents a ball at rest and which ball detections represent a moving ball. In another embodiment, a neural network is trained to determine which detections represent a resting or moving ball, enabling the search window to be updated while not losing track of the ball or balls.

In 1706, the processing apparatus, e.g., the un-projection module, reads the intrinsic and extrinsic calibration parameters for the camera and, using the (u,v) coordinates received from the ball detector, executes an algorithm to determine a camera-ball line comprising a straight line passing through the focal point of the camera in the direction of the ball in a 3D space, e.g., world coordinates. The processing apparatus can further use metadata associated with the image, e.g., a crop region, to determine the camera-ball line. The crop region can also be stored in the system if held constant for the entire sequence of images.

In 1708, the processing apparatus, e.g., the intersection module, executes an intersection algorithm based on the camera-ball line and a 3D model of at least a part of the golf course overlapping with the FOV of the camera to determine the intersection point of the camera-ball line with the 3D model. This intersection point is determined based on the representation of the 3D model and, in some embodiments, the process to determine the intersection point can be iterative or employ a numerical solver to solve an optimization problem. The camera and/or radar and/or 3D model are calibrated to a common coordinate system that may be, e.g., world coordinates. The 3D model is a representation of the golf course (or part of the golf course) stored in computer memory and contains a surface model (e.g., mesh of triangles, spline surface, etc.) representing the height and/or type of terrain for a given position on the course. The 3D model can be provided in world coordinates for, e.g., ease of mapping GPS locations, etc., to the 3D model. The 3D model can also be provided in a local coordinate system and have a mapping to world coordinates.

In 1710, the processing apparatus, e.g., the output module, outputs the 3D position of the ball to some output means, which may be, e.g., a database, a 3D graphics rendering engine, a graphical illustration of the position of the ball relative to other course features, etc.

When the ball is determined to be at rest, additional determinations can be made, such as, e.g., the type of terrain on which the ball currently lies, to be described in greater detail below.

Bounce and Roll Tracking

In another aspect of the present disclosure, the camera-based tracking may also be used to track and determine the bounce and roll of the ball. The determination of a bounce is preferably performed in the un-projector 1115 described above, but may also be implemented in the ball detector 1110 based on (u,v) coordinates alone. In one exemplary method, a series of images are processed to determine the presence of a bounce as described below.

FIG. 17b shows a method 1720 for determining bounces and rolls of a moving ball based on image data. The system for performing the method 1720 can be similar to the system described above in FIGS. 11 and 17a, comprising, at least, a camera and a processing arrangement including a ball detector and an un-projector. The method 1720 can be used for, e.g., tracking chip shots, approach shots, or any other shots exhibiting bouncing behavior.

In 1722, similar to 1702 described above, a camera captures a sequence of images. In 1724, similar to 1704, the processing apparatus, e.g., the ball detection module thereof, receives the images and determines whether a ball is in the image and a pixel location in (u,v) coordinates of detected balls.

In 1726, after a sequence of images has been processed, the ball detector (or, in some embodiments, the un-projector) generates a time-series of ball detections in the (u,v) image plane from a sequence of images. In 1728, the un-projector converts the (u,v) coordinates to a series of camera-ball lines using the intrinsic and extrinsic camera calibration available to the un-projector. The elevation angle of each line, i.e., the angle between the camera-ball line and the ground plane, is calculated, resulting in a time series of vertical projection angles from the camera.

FIG. 13 shows a time-series 1300 of ball detections in the (u,v) image plane from a sequence of images and a corresponding time-series 1350 of elevation angles for the camera-ball lines determined by the un-projector 1115 described in FIG. 11. The time series 1350 is analyzed with respect to minima that represent detections where the projection angle from camera to ball is the steepest, likely corresponding to a collision between the ball and the ground, as shown at points 1352 and 1354 of the time-series 1350.

In 1730, the camera-ball line of these minima in the time series 1350, corresponding to a bounce, are passed to the intersection module to determine the 3D location of the bounce, as described above with respect to FIGS. 11 and 17a. Since the ball can be assumed to be on or very near to the ground for these detections, a 3D ball position can be accurately determined by the methods used for determining the rest position of the ball. The accuracy of the bounce detection may be improved to sub-frame accuracy by extrapolation of either (u,v) coordinates or vertical projection angles both before and after a minimum in the time series to determine the most likely sub-frame time, vertical projection angle and camera-ball line of the bounce.

In a system that includes the radar, it is sometimes possible to track bounces in the radar as separate tracks and to track the signal from a rolling ball. In these cases, such information may be used to enhance the bounce and roll tracking performed using the camera alone. The radar measures the radial velocity of and distance to the ball, and since the radial velocity of the ball typically exhibits a discontinuity when the ball bounces, by detecting the beginning and end of a radar track representing a bounce, a very accurate timing of the bounce can be derived.

In 1732, bounces are distinguished from rolls. The time-series 1300 of ball detections in the (u,v) plane is used here in additional ways, as described below.

A physical model of a bounce can be employed to better distinguish a bounce from a roll of the ball. In an exemplary method, given two successive minima in the (u,v) time series 1300 of pixel location detections, the position of the ball at each minimum can be determined from un-projection as previously described under the assumption that the ball impacts the ground at each minimum, and the time of each assumed ground impact can be determined as the time of the image nearest each minimum, or alternatively using extrapolation of (u,v) detection as previously described. From the 3D positions determined and the time of the start and end of the bounce, an approximate 3D track of the ball can be determined based on a physical model 1165. A simple model can assume that the ball is affected only by gravity, thus assuming drag and lift forces (Magnus forces) to be irrelevant at the low speeds and short distances associated with bounces. The track determined from the physical model 1165 is projected onto the image plane of the camera 1105 and compared to the ball detections between the two (u,v) time series minima. A good correspondence indicates that the ball likely bounced between the minima, Image detection of the (u,v) time series that are not determined to be a bounce, will be classified as being part of the roll of the ball. As the ball can be assumed to be on the ground during the roll, the track corresponding to the roll can be created by un-projection of the (u,v) positions and subsequent intersection determination between camera-ball line and 3d model of the course.

In 1734, this track is passed to the output module 1125 for outputting to the user, overlaying on a broadcast or associated with the main ball track by a common identifier and stored in a database. The ball track thus determined using the methods described above provides important information on the bounce which is passed to the output module 1125.

Determining Terrain for Lie of Ball at Rest

In another aspect, the lie of the ball, or a characterization of the terrain in/on which the ball lies for the next stroke, can be determined. Two exemplary methods are described, or a combination of the two methods can be used. In one method, when the ball has been determined to be at rest, the position of the ball determined in the intersection module 1120 can be compared to information in the 3D model 1135 of the golf course to determine in which terrain the ball lies. This can be, e.g., fairway, semi-rough, rough, fringe, bunker or green. In another method, the ball detection in the image can be classified as one of fairway, semi-rough, rough, fringe, bunker or green based on how much of the ball is visible to the camera to characterize the length of the grass, or on a classification of the background of a small crop of the image centered on the ball. The latter determination can be made with a neural network trained to detect the terrain type of the lie based on a small crop of an image containing the ball and the terrain.

In case the ball is not visible in the image, the lie can be determined when the next stroke is taken by capturing an image, detecting the golfer in the image, detecting the club in the image when the golfer addresses the ball, estimating the direction to the club head by un-projection, determining an approximate position of the head of the golf club and identifying the terrain type as the terrain associated with this position in the 3D model of the course.

Chip Shots and Putts

In another aspect, chip shots and putts can also be tracked by the system by employing techniques similar to those described above for bounce and roll tracking. Chip and putt tracking is not generally possible with a radar-only system due to the shots being hit in all directions either on the green or onto the green from the area immediately around the green and, and due to the shots often being of low speed, resulting in a low radial velocity as measured by the radar. A chip shot generally follows an initial shot arc, and includes one or more bounces and a roll. By employing the un-projection and intersection techniques described above for tracking bounces, the initial shot arc can be tracked. The subsequent bounces and the roll of the shot can similarly be tracked using the already described techniques.

A putt trajectory can be subdivided into up to three segments characterized by the physics of the moving ball: the bounce segment; the slide segment; and the roll segment. During the bounce segment, the ball is exhibiting small bounces, and the speed of the ball decreases every time the ball bounces on the ground. During the slide segment, the ball does not bounce, but the spin of the ball does not match the speed the ball travels on the ground, causing the ball to slide. In this segment, the ball loses speed, but has increasing spin resulting from the friction between the ball and the ground. During the roll segment, the ball loses speed due to friction. Generally, the speed decrease as a function of time is largest during the bouncing segment and smallest during the rolling segment. Not all putts exhibit bounce and slide segments. These aspects of the putt can be measured and, using logic related to the principles described above, the putt segments can be identified in tracking data. Further details regarding the putt segments and corresponding speed decreases are provided in U.S. Pat. No. 10,444,339, which is hereby incorporated by reference in its entirety.

Putts can be tracked in a manner similar to chip shots. When tracking the putt trajectory using the camera and 3D model system presently disclosed, it is often valid to assume that the ball is on the ground during the full trajectory, thus reducing the putt tracking to the tracking of a roll. Even when bounce tracking is not performed, the speed of the ball during the putt trajectory can be matched with the 3D model to determine the bounce, skid and roll segments of the trajectory.

To limit the power consumption and/or computational load upon the system, the system 1100 can capture images with a low frequency (such as 1 fps) and perform a person-detection 1170. If the person detection 1170 is successful (a person is detected in the image), an address detection 1175 can be performed to determine if a shot is about to be made. If address is detected, the system 1100 can switch the camera 1105 to a higher frame rate as specified above and start the ball detection 1110 in a region of the image around the detected address. Prior knowledge of the position of balls in the image, e.g., determined by the exemplary method for determining the rest position of a ball, may be used to determine whether a person detection 1170 is likely to result in an address detection 1175. For example, if a person is detected in the vicinity of the ball, an address is likely to happen. If no ball has been detected in the image near a person detection, then no address is likely to happen. It is advantageous to implement the person detector 1170 and address detector 1175 as a convolutional neural network trained to detect people and to detect a golfer in an address pose.

In another aspect, the putting break fan may be determined from the rest position of the ball prior to the putt and the 3D model of the golf course. The 3D putt break fan displays of different putt trajectories from the initial position of the ball and with varying launch speed and launch direction that should result in a successful putt attempt. The prospective successful putt attempt is determined as the ball trajectory intersecting the position of the hole at a speed that makes ball fall into the cup. Generally, this depends on whether the ball falls more than half a ball diameter due to gravity when over the hole. Thus, a putt trajectory crossing the center of the hole may result in a successful putt at higher speeds than a putt trajectory with a lesser impact on the hole. Using knowledge of the stimp of the green and the 3D model of the course, and assuming a certain launch speed and launch direction of the putt, a simulated putt trajectory of the ball can be determined. A method for determining the putt break fan is to simulate many putts with different launch speeds and launch directions and observe which launch conditions result in a successful putt.

FIG. 14 shows a plot 1400 including a starting position 1405, a hole position 1410, and lines 1415-1425 representing possible putt trajectories that result in a successful putt. The line 1415 represents the highest launch speed resulting a successful putt, the line 1425 represents the lowest launch speed resulting in a successful putt, and the line 1420 represents a launch speed between the highest and lowest launch speeds resulting in a successful putt. The lines 1415 and 1425 correspond to the boundaries of the so-called putt break fan. Often, the line 1420 represents a putt trajectory where the ball would come to rest 2 feet past the hole position if the cup was not present to interrupt the ball in its path. Putts between the lines 1415 and 1420 will likely result in a short follow-up putt of less than 2 feet if the putt is unsuccessful, while putt trajectories between the lines 1420 and 1425 will result in a follow-up putt of more than 2 feet.

FIG. 15 shows the putt break fan 1500 as a diagram of launch direction and launch speed combinations for a putt resulting in a successful putt 1510, and contour lines 1515, 1520, showing launch direction and launch speed combinations resulting in ball locations with equal distance to the pin for a second putt.

A method is provided for determining the tolerance of success of a putt. When a successful putt has been made, tracked by the system and the outcome determined, the tolerance for success can be determined by simulating small changes to the launch speed and launch direction and the resulting simulated outcome. For an unsuccessful putt, it can be similarly determined how much the launch condition would need to change for the putt to be successful. This information can be output as a two-dimensional diagram showing combinations of launch speed and launch direction for a successful putt from the initial position of the putt.

In some situations, a golfer will not try to hole the putt, but will instead attempt to execute a putt that places the ball in a more favorable position, likely closer to the pin, to improve the chance that the subsequent putt will be successful. The outcome of such a layup putt can be analyzed in similar manner by simulated putts. Iso-curves on the launch speed vs. launch direction plot can indicate the launch conditions resulting in similar distances from the pin for the next shot.

In another aspect, converse calculations are made to determine the stimp of the green from the 3D ball track and the 3D model of the green. As understood by those skilled in the art, the stimp is a measure of the green that describes the resistance applied to the travel of the ball by the surface (i.e., how much the surface qualities will cause the ball to be slowed down during the roll as opposed to effects of gravity on hills, etc.). The stimp measures the degree to which the ball is slowed by the resistance of the green and can thus be determined by calculating a speed decay, taking into account any height changes along the ball track. Due to factors such as sunlight, irrigation or drainage, the stimp may vary across the green and is often direction dependent. However, based on the tracking of several putts, a 2D map of the stimp across the green can be determined for further analysis of putting trajectories and tolerances for successful putts.

In yet another aspect, the camera-based track representing a known bounce can be used to update the calibration between the camera and the 3D model of the course. The accuracy of this calibration is critical to determining the camera-ball line accurately in the un-projection and hence to determine an accurate ball position in the intersection module.

As described above, a bounce can be characterized by a physical model based on the 3D positions of the start and end of the bounce and the duration of the bounce. By projecting the ball positions of the bounce into the image plane, the projected ball pixel locations and pixel locations of ball detections can be compared. If the camera to 3D model calibration is changed slightly, a new physical model of the bounce will result, which in turn can be projected into the image plane and compared to the ball detections. Thus, a calibration offset can be determined as the change to the calibration that causes the projection of the physical model ball positions to best match the detected ball positions.

Similarly, if the distance to the ball can be determined from a radar at the start or end time of the bounce, the range determined by the radar can be compared to the distance to the ball determined in the intersection module and the calibration of the camera to the 3D model can be updated to obtain a range from camera to ball in the intersection module that best matches the range to the ball measured by the radar. Such an update can be applied after several detections have been made to more accurately determine the calibration update to apply, or one can employ an adaptive filter to filter out noise on the detection of the calibration offsets. Conversely, if the camera to 3D model calibration is trusted more, the radar range measurement can be updated to reflect the position of the bounces as determined from the ball detections in the camera and the 3D model.

FIG. 17c shows a method 1740 for determining information for an upcoming putt according to various exemplary embodiments. The system for performing the method 1740 can be similar to the system described above in FIGS. 11 and 17a-b, comprising, at least, a camera and a processing arrangement including a ball detector, an un-projector and an intersection module. The method 1740 can be used for, e.g., producing an analysis of an upcoming putt.

In 1742, similar to above, a camera captures a sequence of images, the processing apparatus determines whether a ball is in the image and a pixel location in (u,v) coordinates of detected balls, the processing apparatus determines a camera-ball line, and the processing apparatus determines the intersection point of the camera-ball line with the 3D model.

The 3D position of the ball is the rest position of the ball on the green. Based on this rest position, information for an upcoming putt can be determined.

In 1744, using knowledge of the stimp of the green and the 3D model of the course, and assuming a certain launch speed and launch direction of the putt, a simulated putt trajectory of the ball can be determined. Many putts are simulated with different launch speeds and launch directions and it is observed which launch conditions result in a successful putt.

In 1746, the various simulated launch conditions are mapped to a putt break fan diagram.

FIG. 17*d* shows a method 1750 for determining terrain parameters for a putting green based on a tracked putt according to various exemplary embodiments. The system for performing the method 1750 can be similar to the system described above in FIGS. 11 and 17*a-c*, comprising, at least, a camera and a processing arrangement including a ball detector, an un-projector and an intersection module. The method 1750 can be used for, e.g., analyzing green conditions based on an executed putt.

In 1752, similar to above, a camera captures a sequence of images, the processing apparatus determines whether a ball is in the image and a pixel location in (u,v) coordinates of detected balls, the processing apparatus determines a camera-ball line, and the processing apparatus determines the intersection point of the camera-ball line with the 3D model. In this step, however, the camera performs this position determination functionality for tracking a current putt.

In 1754, parameters for the putt are extracted, including a speed decay for the tracked putt. The speed decay can be characterized for the entirety of the putt, or for a plurality of segments of the putt.

In 1756, the putt parameters are refined based on elevation differences encountered by the putted ball along its path. This step is preferably performed based on the 3D model of the green. However, elevation differences can also be tracked directly by the tracking arrangement.

In 1758, the stimp of the green is determined. As mentioned above, due to factors such as sunlight and irrigation, the stimp may vary across the green and is often direction dependent. However, based on the tracking of several putts, a 2D map of the stimp across the green can be determined for further analysis of putting trajectories and tolerances for successful putts.

The present disclosure relates to a system which includes a database configured to store profiles including visual profiles of a plurality of sports players, each visual profile comprising identifying information for a player, each profile comprising an associated playerID; a camera configured to capture a video stream comprising images of the sports players; a tracking arrangement configured to capture data corresponding to trajectories of sports balls launched by the sports players; and a processing arrangement coupled to the database, the camera and the tracking arrangement configured to: detect a first sports player in an image from the video stream and determine visual characteristics of the first detected sports player; match the determined visual characteristics to a first visual profile of a first profile and an associated first playerID stored in the database; and associate a first trajectory associated with a first sports shot with the first playerID.

The visual profiles include information for characteristics for ball striking swings of the sports players. The ball striking swing characteristics comprise biometric data points in combination with biomechanics of the ball striking swings. The biometric data points for the sports players comprise height, lengths of limbs, and parameters in dependence thereon. The biomechanics of the ball striking swings comprise positioning of limbs relative to a ball striking implement being swung or a degree of twisting of a body relative to legs. The visual profiles include information for facial characteristics or clothing characteristics of the sports players.

The clothing characteristics of the sports players are visually detected by the camera or a further camera at a beginning of a sports event. A new profile and associated visual profile is generated for a new sports player not yet identified in the database by analyzing characteristics for a ball striking swing, facial characteristics or clothing characteristics of the new sports player. The profile is generated in the database when the processing arrangement receives an indication from the new sports player to generate the new profile and the camera or a further camera captures a video stream of the new sports player to analyze the characteristics for the ball striking swing, the facial characteristics or the clothing characteristics of the new sports player. An electronic identifier carried by the first sports player and associated with the first sports player is located by the processing arrangement to improve the match of the determined visual characteristics to the first visual profile. The electronic identifier comprises a device that transmits GPS coordinates to the processing arrangement. The sports players are golfers and the processing arrangement is further configured to execute an algorithm utilizing golf logic to improve the match of the determined visual characteristics of the first detected sports player to the first visual profile and the associated first playerID by narrowing a list of profiles in the database considered when matching the determined visual characteristics of the first detected sports player to the first visual profile.

The golf logic includes logic related to groupings of golfers, golf hole layouts, or golf course layouts. The golf logic includes logic related to an estimated current lie of a first one the sports balls associated with the first detected sports player, as determined based on the data from the tracking arrangement. The algorithm comprises a neural network trained to detect and match the golfers to the visual profiles. The neural network is updated throughout play based on changes in visual characteristics of the golfers. The neural network is updated after each sports player detection and matching to a visual profile, after a number of sports player detections and matchings to the visual profiles, or after a predetermined duration from a previous player detection. The processing arrangement is further configured to: output the parameters for the first trajectory and the associated playerID to a broadcast. The processing arrangement is further configured to output the parameters for the first trajectory to a personal device of the first sports player associated with the playerID prior to a next shot of the first sports player. The parameters for the first trajectory include a measured or an estimated lie position for a second one of the sports balls after the second sports ball comes to rest so that an application on the personal device can indicate a lie position and provide information to assist in finding the second sports ball.

The sports players are golfers and the parameters for the first trajectory include an indication that the ball struck by a first golfer has come to rest at a position in a first area of a golf course on which the sports players are playing, the first area having special rules associated therewith, the parameters further including an indication of a second area from which the first golfer can take a next shot based on the position and the special rules. The processing arrangement is further configured to compile a summary including parameters for all trajectories of all shots taken by a first one of the sports players during a sports event. The sports players are golfers and the processing arrangement is further configured to: detect a type of golf club used by the first sports player for a first shot taken by the first sports player; and associate the detected type of golf club with the first trajectory. The type of golf club is detected in the video stream using a neural network trained to recognize a plurality of different types of golf clubs. The type of golf club is detected based on a signal emitted from an electronic tag attached to the golf club when the golf club is in use. The processing arrangement is further configured to output parameters for the first trajectory to the database so that the database can associate the parameters for the first trajectory to the first visual profile.

The present disclosure also relates to a method including detecting a first sports player in an image from a video stream captured by a camera; determining visual characteristics of the first detected sports player; matching the determined visual characteristics to a first visual profile of a first profile and an associated first playerID stored in a database, wherein the database stores profiles including visual profiles of a plurality of sports players, each visual profile comprising identifying information for a player, each profile comprising an associated playerID; and associating a first trajectory associated with a first sports ball with the first playerID, wherein the first trajectory is determined from data corresponding to trajectories of sports balls launched by the sports players captured by a tracking arrangement.

The present disclosure also relates to a processor coupled to a database, a camera and a tracking arrangement configured to perform operations including: detecting a first sports player in an image from a video stream captured by the camera; determining visual characteristics of the first detected sports player; matching the determined visual characteristics to a first visual profile of a first profile and an associated first playerID stored in the database, wherein the database stores profiles including visual profiles of a plurality of sports players, each visual profile comprising identifying information for a player, each profile comprising an associated playerID; and associating a first trajectory associated with a first sports ball with the first playerID, wherein the first trajectory is determined from data corresponding to trajectories of sports balls launched by the sports players captured by the tracking arrangement.

The present disclosure also relates to a system including: a database configured to store profiles for each of a plurality of sports players, each profile comprising identifying information for one of the players and a playerID associated with the one of the sports players; a tracking arrangement configured to capture shot data corresponding to trajectories of sports balls launched by the sports players; a motion sensor device configured to capture motion data corresponding to a swinging motion of a player or ball striking implement; and a processing arrangement coupled to the database, the tracking arrangement and the motion sensor device configured to: detect a first swing of a first sports player from the motion data captured by the motion sensor device, the first sports player being associated with a first playerID; associate the first swing of the first sports player with a first timestamp and a first location detected for the first swing; and associate a first trajectory of a sports ball from the shot data captured by the tracking arrangement corresponding to a first shot corresponding to the first swing based on the first timestamp and the first location.

The system stores swing data corresponding to the first swing, the first timestamp, the first location and subsequent detections of further swings with further timestamps and further locations corresponding to the further swings, wherein first swing and the further swings are respectively matched with the trajectories of the first swing and the further swings at an end of play for the first sports player based on the corresponding first timestamp and first location and the further timestamps and the further locations. The motion sensor device or a further device associated with the motion sensor device has GPS functionality for determining the location of the first swing. An electronic identifier carried by the first sports player and associated with the first sports player is detected to determine the location of the first swing. The sports players are golfers and wherein the processing arrangement is further configured to execute an algorithm utilizing golf logic to improve the matching of the first swing to the first trajectory by narrowing a list of profiles in the database considered when performing the matching.

The golf logic includes logic related to groupings of golfers, golf hole layouts, or golf course layouts. The golf logic includes logic related to an estimated current lie of the ball of the first sports player, as determined based on the data from the tracking arrangement. The processing arrangement is further configured to output parameters for the first trajectory to a personal device of the first sports player associated with the playerID prior to a next shot of the first sports player. The parameters for the first trajectory include an estimated lie position for a corresponding one of the sports balls after the corresponding sports ball comes to rest so that an application on the personal device can provide data facilitating the finding of the corresponding sports ball. The sports players are golfers playing on a golf course and wherein the parameters for the first trajectory include an indication that the ball struck by a first golfer has come to rest at a position within a first area of the golf course, the first area having special rules associated therewith, the parameters further including an indication of a second area from which the first golfer can take a next shot according to the position and the special rules.

The processing arrangement is further configured to compile a summary including parameters for all trajectories of all shots taken by the first sports player during a sports event. The sports players are golfers and wherein the processing arrangement is further configured to: detect a type of a golf club used by the first sports player for the first golf shot; and associate the detected type of the golf club with the first trajectory. The type of the golf club is detected based on a signal emitted from an electronic tag attached to the golf club when the club is in use.

The present disclosure also relates to a method including: detecting a first swing of a first sports player associated with a first playerID from motion data captured by a motion sensor device, wherein the motion sensor device captures the motion data corresponding to a swinging motion of a player or ball striking implement, wherein a database stores profiles for each of a plurality of sports players, each profile comprising identifying information for one of the players and a playerID associated with the one of the sports players; associating the first swing of the first sports player with a timestamp and a location; and associating a first trajectory of a sports ball to the first swing based on the timestamp and the location, wherein the first trajectory is determined from data corresponding to trajectories of sports balls launched by the sports players captured by a tracking arrangement.

The present disclosure also relates to a processor coupled to a database, a motion sensor device and a tracking arrangement configured to perform operations including: detecting a first swing of a first sports player associated with a first playerID from motion data captured by the motion sensor device, wherein the motion sensor device captures the motion data corresponding to a swinging motion of a player or ball striking implement, wherein the database stores profiles for each of a plurality of sports players, each profile comprising identifying information for one of the players and a playerID associated with the one of the sports players; and associating the first swing of the first sports player with a timestamp and a location; and associating a first trajectory of a sports ball to the first swing based on the timestamp and the location, wherein the first trajectory is determined from data corresponding to trajectories of sports balls launched by the sports players captured by the tracking arrangement.

The present disclosure also relates to a system including: a database configured to store profiles for each of a plurality of sports players, each profile comprising identifying information for one of the players and a playerID associated with the one of the sports players; a tracking arrangement configured to capture shot data corresponding to trajectories of sports balls launched by the sports players; a location determining device associated with a first sports player of the plurality of sports players associated with a first playerID, the location determining device configured to capture location data approximating a location of the location determining device at a given time; and a processing arrangement coupled to the database, the tracking arrangement and the location determining device configured to: detect, in the shot data, a first trajectory of a first sports ball; determine a first position from which the first sports ball was launched and a first time at which the first sports ball was launched; receive location data comprising locations of the location determining device over a duration of time including the first time, wherein each of the locations are associated with a timestamp; determine that the first position and the first time associated with the first trajectory match a first location and a first timestamp in the location data; and associate the first trajectory of the first sports ball with the first playerID.

The matching the first position and the first time with the first location and the first timestamp comprises: determining the first position and the first location in a world coordinate system; and determining a correspondence between the first position and the first location within a predetermined distance. The system stores the location data for a first round of golf of the first sports player and trajectories detected in the shot data are respectively matched to the location data at an end of the first round of golf. The location determining device has GPS functionality for determining the location data. The sports players are golfers and wherein the processing arrangement is further configured to execute an algorithm utilizing golf logic to improve matching of the first position and the first time with the first location and the first timestamp by narrowing a list of profiles in the database considered in performing the matching.

The golf logic includes logic related to groupings of golfers, golf hole layouts, or golf course layouts. The golf logic includes logic related to an estimated current lie of the ball of the first sports player, as determined based on the data from the tracking arrangement. The processing arrangement is further configured to output parameters for the first trajectory to a personal device of the first sports player associated with the playerID prior to a next shot of the first sports player. The parameters for the first trajectory include an estimated lie position for the sports ball corresponding to the first trajectory after the sports ball corresponding to the first trajectory comes to rest so that an application on the personal device can provide data facilitating the finding of the sports ball corresponding to the first trajectory. The sports players are golfers playing on a golf course and wherein the parameters for the first trajectory include an indication that the ball struck by a first golfer has come to rest at a position within a first area of the golf course, the first area having special rules associated therewith, the parameters further including an indication of a second area from which the first golfer can take a next shot according to the position and the special rules.

The processing arrangement is further configured to compile a summary including parameters for all trajectories of all shots taken by the first sports player during a sports event. The sports players are golfers and wherein the processing arrangement is further configured to: detect a type of a golf club used by the first sports player for a first golf shot corresponding to the first trajectory; and associate the detected type of the golf club with the first trajectory. The type of the golf club is detected based on a signal emitted from an electronic tag attached to the golf club when the club is in use.

The present disclosure also relates to a method including detecting, in shot data captured by a tracking arrangement corresponding to trajectories of sports balls launched by sports players, a first trajectory of a first sports ball; determining a first position from which the first sports ball was launched and a first time at which the first sports ball was launched; receiving location data from a location determining device associated with a first sports player associated with a first playerID, wherein a database stores profiles for each of a plurality of sports players, each profile comprising identifying information for one of the players and a playerID associated with the one of the sports players, the location data approximating a location of the location determining device at a given time, the location data comprising locations of the location determining device over a duration of time including the first time, wherein each of the locations are associated with a timestamp; determining that the first position and the first time associated with the first trajectory match a first location and a first timestamp in the location data; and associating the first trajectory of the first sports ball with the first playerID.

The present disclosure also relates to a processor coupled to a database, a tracking arrangement and a location determining device configured to perform operations comprising: detecting, in shot data captured by the tracking arrangement corresponding to trajectories of sports balls launched by sports players, a first trajectory of a first sports ball; determining a first position from which the first sports ball was launched and a first time at which the first sports ball was launched; receiving location data from the location determining device associated with a first sports player associated with a first playerID, wherein the database stores profiles for each of a plurality of sports players, each profile comprising identifying information for one of the players and a playerID associated with the one of the sports players, the location data approximating a location of the location determining device at a given time, the location data comprising locations of the location determining device over a duration of time including the first time, wherein each of the locations are associated with a timestamp; determining that the first position and the first time associated with the first trajectory match a first location and a first timestamp in the location data; and associating the first trajectory of the first sports ball with the first playerID.

The present disclosure also relates to a system including: a robotic camera configured to capture data corresponding to a position of a sports ball, the robotic camera being further configured to automatically adjust an orientation and a zoom level of the robotic camera in response to the captured data or a command; and a processing arrangement coupled to the robotic camera configured to: pre-calibrate the robotic camera so that an initial orientation of the robotic camera is known in a world coordinate system and associate each of a plurality of different zoom levels used by the robotic camera with a respective intrinsic parameter value; detect a first image position of the sports ball in an image coordinate system in a first image, the first image being captured with the robotic camera in a first orientation; read from the robotic camera a first zoom level associated with the first image and the intrinsic parameter value associated with the first zoom level; determine the first orientation of the robotic camera based on a pan and a tilt of the robotic camera relative to the initial orientation; determine a three-dimensional line extending through the robotic camera and the sports ball in the world coordinate system based on the detected first image position of the sports ball, the determined first orientation and the intrinsic parameter values for the first zoom level; and determine a three-dimensional position of the sports ball in the world coordinate system located along the three-dimensional line based on information extrinsic to the robotic camera.

In the image first position, the sports ball is on a surface of a sports play area and wherein the information extrinsic to the robotic camera includes information received from a three-dimensional model of at least a portion of the sports playing area that encompasses the three-dimensional position of the sports ball, the processing arrangement determining the three-dimensional position of the sports ball by locating an intersection of the line and the three-dimensional model. The system further including: a pan and tilt sensor fixed to the robotic camera, the processing arrangement is further configured to read the pan and the tilt of the robotic camera relative to the initial orientation from the pan and tilt sensor.

The pan and the tilt of the robotic camera is determined from a control signal used to adjust the robotic camera to the first orientation, wherein the control signal is generated in response to tracking data for the sports ball captured prior to capture of the first image. The robotic camera is further configured to automatically adjust a crop in response to the captured data or an external command. The intrinsic parameters comprise a focal length, a principal point, and a lens distortion. The information extrinsic to the robotic camera includes information from a sensor relating to a distance of the sports ball from the robotic camera.

The present disclosure also relates to a method including: pre-calibrating a robotic camera so that an initial orientation of the robotic camera is known in a world coordinate system and associating each of a plurality of zoom levels used by the robotic camera with respective intrinsic parameter values, wherein the robotic camera is configured to capture data corresponding to a position of a sports ball, the robotic camera being further configured to automatically adjust an orientation and zoom level in response to the captured data or a command; detecting a first image position of the sports ball in an image coordinate system in a first image, the first image being captured with the robotic camera in a first orientation; reading a first zoom level from the robotic camera and the associated intrinsic parameter values for the first zoom level of the robotic camera corresponding to the first image; determining the first orientation of the robotic camera based on a pan and a tilt of the robotic camera relative to the initial orientation; determining a three-dimensional line extending through the robotic camera and the sports ball in the world coordinate system based on the detected first image position of the sports ball, the determined first orientation and the intrinsic parameter values for the first zoom level; and determining a three-dimensional position of the sports ball in the world coordinate system located along the three-dimensional line based on information extrinsic to the robotic camera.

The present disclosure also relates to a processor coupled to a robotic camera configured to perform operations comprising: pre-calibrating the robotic camera so that an initial orientation of the robotic camera is known in a world coordinate system and each different zoom level used by the robotic camera is associated with respective intrinsic parameter values, wherein the robotic camera is configured to capture data corresponding to a position of a sports ball, the robotic camera being further configured to automatically adjust an orientation and zoom level in response to the captured data or a command; detecting a first image position of the sports ball in an image coordinate system in a first image, the first image being captured with the robotic camera in a first orientation; reading a first zoom level from the robotic camera and the associated intrinsic parameter values for the first zoom level corresponding to the first image; determining the first orientation of the robotic camera based on a pan and a tilt of the robotic camera relative to the initial orientation; determining a three-dimensional line extending through the robotic camera and the sports ball in the world coordinate system based on the detected first image position of the sports ball, the determined first orientation and the intrinsic parameter values for the first zoom level; and determining a three-dimensional position of the sports ball in the world coordinate system located along the three-dimensional line based on information extrinsic to the robotic camera.

The present disclosure also relates to a system, comprising: a robotic camera with a predetermined position in a world coordinate system, the robotic camera being configured to capture data corresponding to a position of a sports ball, the robotic camera being further configured to automatically adjust an orientation and zoom level in response to the captured data or a command; and a processing arrangement coupled to the robotic camera configured to: detect a first image position of the sports ball in an image coordinate system in a first image, the first image being captured with the robotic camera in a first orientation; detect a reference point in the image coordinate system in the first image or in a further image captured after an initial adjustment of the orientation of the robotic camera to bring the reference point within its field of view, wherein a three-dimensional position of the reference point is known in the world coordinate system; adjust the orientation of the robotic camera to a second orientation so that the reference point is located in the first image position in a second image; determine a difference in orientation between the first orientation and the second orientation; determine a three-dimensional line extending through the robotic camera and the sports ball in the world coordinate system based on the three-dimensional position of the reference point relative to the robotic camera and the difference in orientation between the first orientation and the second orientation; and determine a three-dimensional position of the sports ball in the world coordinate system located along the three dimensional line.

In the first image position, the sports ball is on a surface of a sports play area, the three-dimensional position of the sports ball being determined based on identification of an intersection between the line and a three-dimensional model of at least a portion of the sports play area that encompasses the three-dimensional position of the sports ball.

The second image is captured without adjusting a zoom level relative to the first image. The system further comprises a pan and tilt sensor fixed to the robotic camera, the processing arrangement is further configured to read the difference in orientation between the first orientation and the second orientation from the pan and tilt sensor.

The present disclosure also relates to a method, comprising: detecting a first image position of a sports ball in an image coordinate system in a first image, the first image being captured with a robotic camera in a first orientation, wherein the robotic camera has a predetermined position in a world coordinate system, the robotic camera being configured to capture data corresponding to a position of a sports ball, the robotic camera being further configured to automatically adjust an orientation and zoom level in response to the captured data or a command; detecting a reference point in the image coordinate system in the first image or in a further image captured after an initial adjustment of the orientation of the robotic camera to bring the reference point within its field of view, wherein a three-dimensional position of the reference point is known in the world coordinate system; adjusting the orientation of the robotic camera to a second orientation so that the reference point is located in the first image position in a second image; determining a difference in orientation between the first orientation and the second orientation; determining a three-dimensional line extending through the robotic camera and the sports ball in the world coordinate system based on the three-dimensional position of the reference point relative to the robotic camera and the difference in orientation between the first orientation and the second orientation; and determining a three-dimensional position of the sports ball in the world coordinate system located along the line.

The present disclosure also relates to a robotic camera configured to perform operations comprising: detecting a first image position of a sports ball in an image coordinate system in a first image, the first image being captured with the robotic camera in a first orientation, wherein the robotic camera has a predetermined position in a world coordinate system, the robotic camera being configured to capture data corresponding to a position of a sports ball, the robotic camera being further configured to automatically adjust an orientation and zoom level in response to the captured data or a command; detecting a reference point in the image coordinate system in the first image or in a further image captured after an initial adjustment of the orientation of the robotic camera to bring the reference point within its field of view, wherein a three-dimensional position of the reference point is known in the world coordinate system; adjusting the orientation of the robotic camera to a second orientation so that the reference point is located in the first image position in a second image; determining a difference in orientation between the first orientation and the second orientation; determining a three-dimensional line extending through the robotic camera and the sports ball in the world coordinate system based on the three-dimensional position of the reference point relative to the robotic camera and the difference in orientation between the first orientation and the second orientation; and determining a three-dimensional position of the sports ball in the world coordinate system located along the three-dimensional line.

The present disclosure also relates to a system, comprising: a first camera being a robotic camera configured to capture first data corresponding to a position of a sports ball, the robotic camera being further configured to automatically adjust an orientation and zoom level in response to the captured data or a command; a second camera calibrated to a world coordinate system configured to capture second data corresponding to the position of the sports ball; and a processing arrangement coupled to the robotic camera and the second camera configured to: detect a first image position of the sports ball in an image coordinate system in a first image, the first image being captured with a first orientation of the robotic camera; detect at least a first feature in the first image; detect the first feature in a second image captured by the second camera; determine a three-dimensional position of the first feature in the world coordinate system based on the second camera calibration; perform feature matching between the first and second images based on the first feature to locate the first image position within the second image; determine a three-dimensional line extending through the robotic camera and the sports ball in the world coordinate system based on the three-dimensional position of the first feature in the world coordinate system and the first image position of the sports ball; and determine a three-dimensional position of the sports ball in the world coordinate system located along the three-dimensional line.

In the first image position, the sports ball is on a surface of a sports play area, the three-dimensional position of the sports ball being determined based an intersection of the line with a three-dimensional model of at least a portion of the sports play area that encompasses the three-dimensional position of the sports ball. The second camera is co-located with the first camera. The sports play area is a golf course and wherein the first feature comprises a tree, a bunker, a lake, a golf flag, a green.

The present disclosure also relates to a method, comprising: detecting a first image position of a sports ball in an image coordinate system in a first image, the first image being captured with a first orientation of a first camera, the first camera being a robotic camera configured to capture first data corresponding to a position of a sports ball, the robotic camera being further configured to automatically adjust an orientation and zoom level in response to the captured data or a command; detecting at least a first feature in the first image; detecting the first feature in a second image captured by a second camera, the second camera being calibrated to a world coordinate system and configured to capture second data corresponding to the position of the sports ball; determining a three-dimensional position of the first feature in the world coordinate system based on the second camera calibration; performing feature matching between the first and second images based on the first feature to locate the first image position within the second image; determining a three-dimensional line extending through the robotic camera and the sports ball in the world coordinate system based on the three-dimensional position of the first feature in the world coordinate system and the first image position of the sports ball; and determining a three-dimensional position of the sports ball in the world coordinate system located along the three-dimensional line.

The present disclosure also relates to a processing arrangement coupled to a first camera and a second camera configured to perform operations comprising: detecting a first image position of a sports ball in an image coordinate system in a first image, the first image being captured with a first orientation of the first camera, the first camera being a robotic camera configured to capture first data corresponding to a position of a sports ball, the robotic camera being further configured to automatically adjust an orientation and zoom level in response to the captured data or a command; detecting at least a first feature in the first image; detecting the first feature in a second image captured by the second camera, the second camera being calibrated to a world coordinate system and configured to capture second data corresponding to the position of the sports ball; determining a three-dimensional position of the first feature in the world coordinate system based on the second camera calibration; performing feature matching between the first and second images based on the first feature to locate the first image position within the second image; determining a three-dimensional line extending through the robotic camera and the sports ball in the world coordinate system based on the three-dimensional position of the first feature in the world coordinate system and the first image position of the sports ball; and determining a three-dimensional position of the sports ball in the world coordinate system located along the three-dimensional line.

The present disclosure also relates to a system, comprising: a robotic camera configured to capture data corresponding to a position of a sports ball, the robotic camera being further configured to automatically adjust an orientation and zoom level in response to the captured data or a command; and a processing arrangement coupled to the robotic camera configured to: detect an image position of the sports ball in an image coordinate system in a plurality of images, a first image position of the sports ball in a first image being captured with a first orientation of the robotic camera; adjust the zoom level of the robotic camera to a second zoom level so that a first reference point and a second reference point are located in a field of view of the robotic camera, wherein the image position of the sports ball is tracked while the zoom level is adjusted; detect a second image position of the first reference point and a third image position of the second reference point in the image coordinate system in a second image; determine a fourth image position of the sports ball in the second image; determine angular positions of the fourth image position relative to the second image position and the third image position by correlating the second image position and the third image position with predetermined angles to the first reference point and the second reference point relative to the robotic camera; determine a three-dimensional line extending through the robotic camera and the sports ball in a world coordinate system based on the first image position, the second zoom level and the angular positions of the first image position relative to the second and third image positions; and determine a three-dimensional position of the sports ball in the world coordinate system located along the three-dimensional line.

In the first image position, the sports ball is on a surface of a sports play area, wherein the three-dimensional position of the sports ball is determined by identifying an intersection between the line and a three-dimensional model of at least a portion of the sports play area that encompasses the three-dimensional position of the sports ball. The second image is captured without adjusting an orientation relative to the first image. If the sports ball is not visible in the second image, the fourth image position of the sports ball in the second image is inferred based on the tracking of the image position of the sports ball while the zoom level is adjusted.

The present disclosure also relates to a method, comprising: detecting image positions of a sports ball in a plurality of images in an image coordinate system, a first image position of the sports ball in a first image being captured with a first orientation of a robotic camera, the robotic camera being configured to capture data corresponding to a position of the sports ball, the robotic camera being further configured to automatically adjust an orientation and zoom level in response to the captured data or a command; adjusting the zoom level of the robotic camera to a second zoom level so that a first reference point and a second reference point are located in a field of view of the robotic camera, wherein the image positions of the sports ball is tracked while the zoom level is adjusted; detecting a second image position of the first reference point and a third image position of the second reference point in the image coordinate system in a second image; determining a fourth image position of the sports ball in the second image; determining angular positions of the fourth image position relative to the second image position and the third image position by correlating the second image position and the third image position with predetermined angles to the first reference point and the second reference point relative to the robotic camera; determining a three-dimensional line extending through the robotic camera and the sports ball in a world coordinate system based on the first image position, the second zoom level and the angular positions of the first image position relative to the second and third image positions; and determining a three-dimensional position of the sports ball in the world coordinate system located along the three-dimensional line.

The present disclosure also relates to a processor coupled to a robotic camera configured to perform operations comprising: detecting image positions of a sports ball in an image coordinate system in a plurality of images, a first image position of the sports ball in a first image being captured with a first orientation of the robotic camera, the robotic camera being configured to capture data corresponding to a position of the sports ball, the robotic camera being further configured to automatically adjust an orientation and zoom level in response to the captured data or a command; adjusting the zoom level of the robotic camera to a second zoom level so that a first reference point and a second reference point are located in the field of view of the robotic camera, wherein the image position of the sports ball is tracked while the zoom level is adjusted; detecting a second image position of the first reference point and a third image position of the second reference point in the image coordinate system in a second image; determining a fourth image position of the sports ball in the second image; determining angular positions of the fourth image position relative to the second image position and the third image position by correlating the second image position and the third image position with predetermined angles to the first reference point and the second reference point relative to the robotic camera; determining a three-dimensional line extending through the robotic camera and the sports ball in a world coordinate system based on the first image position, the second zoom level and the angular positions of the first image position relative to the second and third image positions; and determining a three-dimensional position of the sports ball in the world coordinate system located along the three-dimensional line.

The present disclosure also relates to a system, comprising: a first sensor having a sensor field of view configured to capture data corresponding to a trajectory of a sports ball; a first broadcast camera having a first field of view configured to capture a first video stream comprising first images of a first portion of the trajectory of the sports ball; and a processing arrangement coupled to the first sensor and the first broadcast camera configured to: calibrate the first sensor to the first broadcast camera so that pixel orientations in the first images are known relative to a coordinate system of the first sensor, the calibration further comprising a relationship between parameters of the first sensor and the first broadcast camera for different zoom levels; generate a broadcast video feed using the first video stream including the first images of the first portion of the sports ball trajectory as the sports ball traverses the first field of view; determine trajectory parameters based on the data for the sports ball trajectory as the sports ball traverses the sensor field of view; and insert into the broadcast video feed a tracer illustrating a path of the sports ball, the tracer being generated based on the calibration between the first sensor and the first broadcast camera.

The first sensor is a tracking camera. The processing arrangement is further configured to determine a current zoom level of the first broadcast camera by feature matching between images from the tracking camera and the first broadcast camera. The tracer is inserted into the broadcast video feed, regardless of the current zoom level of the first broadcast camera, based on the calibration for different zoom levels. A location of the sports ball is detected in one or more of the first images prior to launch to improve a rendering of a start point of the tracer. A ball identification algorithm searches for the location of the sports ball in the first images. A stance of a player is detected prior to launch to locate the sports ball. The system of claim 28, further comprising: a second broadcast camera having a second field of view configured to capture a second video stream comprising second images of a second portion of the trajectory of the sports ball, wherein the processing arrangement is further configured to: calibrate the first sensor to the second broadcast camera so that pixel orientations in the second images are known relative to a coordinate system of the first sensor, the calibration further comprising a relationship between parameters of the first sensor and the second broadcast camera for different zoom levels; switch the broadcast video feed to the second video stream including the second images of the second portion of the sports ball trajectory as the sports ball traverses the second field of view; and insert a further tracer into the broadcast video feed based on the calibration between the first sensor and the second broadcast camera.

The present disclosure also relates to a method, comprising: calibrating a first sensor to a first broadcast camera, the first sensor having a sensor field of view and configured to capture data corresponding to a trajectory of a sports ball, the first broadcast camera having a first field of view configured to capture a first video stream comprising first images of a first portion of the trajectory of the sports ball, the first sensor and the first broadcast camera being calibrated so that pixel orientations in the first images are known relative to a coordinate system of the first sensor, the calibration further comprising a relationship between parameters of the first sensor and the first broadcast camera for different zoom levels; generating a broadcast video feed using the first video stream including the first images of the first portion of the sports ball trajectory as the sports ball traverses the first field of view; determining trajectory parameters based on the data for the sports ball trajectory as the sports ball traverses the sensor field of view; and inserting into the broadcast video feed a tracer illustrating a path of the sports ball, the tracer being generated based on the calibration between the first sensor and the first broadcast camera.

The present disclosure also relates to a processor coupled to a first sensor and a first broadcast camera configured to perform operations comprising: calibrating the first sensor to the first broadcast camera, the first sensor having a sensor field of view and configured to capture data corresponding to a trajectory of a sports ball, the first broadcast camera having a first field of view configured to capture a first video stream comprising first images of a first portion of the trajectory of the sports ball, the first sensor and the first broadcast camera being calibrated so that pixel orientations in the first images are known relative to a coordinate system of the first sensor, the calibration further comprising a relationship between parameters of the first sensor and the first broadcast camera for different zoom levels; generating a broadcast video feed using the first video stream including the first images of the first portion of the sports ball trajectory as the sports ball traverses the first field of view; determining trajectory parameters based on the data for the sports ball trajectory as the sports ball traverses the sensor field of view; and inserting into the broadcast video feed a tracer illustrating a path of the sports ball, the tracer being generated based on the calibration between the first sensor and the first broadcast camera.

The present disclosure also relates to a system, comprising: a tracking camera having a first field of view configured to capture images in a camera coordinate system of a sports ball bouncing and rolling after an initial trajectory, the tracking camera having intrinsic and extrinsic calibration parameters associated therewith; a storage arrangement including the intrinsic and extrinsic calibration parameters and a three-dimensional (3D) model of at least part of a sports play area overlapping with the first field of view; and a processing arrangement coupled to the tracking camera configured to: perform a ball detection to detect a pixel location of the sports ball in an image; determine, based on the intrinsic and extrinsic calibration parameters, a camera-ball line comprising a straight line passing through the camera a the direction of the sports ball in a 3D coordinate system; determine, based on the 3D model, an intersection point of the camera-ball line with the 3D model; and output the intersection point as a 3D position of the sports ball in the image.

The processing arrangement is further configured to: determine the sports ball is at rest by comparing the pixel location of the sports ball in successive images; and outputting the intersection point as a 3D rest position of the sports ball in the image. The captured images are associated with metadata including a time at which the image was captured, an exposure time and a crop region. The system further comprises: a tracking radar having a second field of view at least partially overlapping the first field of view configured to capture radar data of the sports ball, wherein the processing arrangement is further configured to detect the sports ball in dependence on the radar data to narrow an area searched in the images and a number of images searched in time. Detections of the sports ball using the radar data in combination with the images are used by the processing arrangement to improve an accuracy of 3D position determinations of the sports ball. The processing arrangement is further configured to detect the sports ball using a neural network trained to detect sports balls in images.

The neural network uses information for search regions from previous images to improve an accuracy of detections of the sports ball in current images. The processing arrangement is further configured to determine the camera-ball line based on the crop region for the image. The sports play area is a golf course and wherein the 3D model of the part of the golf course contains a surface model representing a height of terrain for a given position on the golf course. The surface model further represents a terrain type for the given position on the golf course. The processing arrangement is further configured to determine a type of terrain within which the sports ball is detected based on the 3D model. The surface model comprises a mesh of triangles or spline surfaces. The intersection point is determined using an iterative process or using a numerical solver to solve an optimization problem. The 3D position of the sports ball in the image is output to a database, a 3D graphics rendering engine, or a graphical illustration of the 3D position of the sports ball. The 3D model is provided in the 3D coordinate system for the camera-ball line.

The present disclosure relates to a method comprising: performing a ball detection to detect a pixel location of a sports ball in an image captured by a tracking camera, the tracking camera having a first field of view configured to capture images in a camera coordinate system of the sports ball bouncing and rolling after an initial trajectory, the tracking camera having intrinsic and extrinsic calibration parameters associated therewith stored to a storage arrangement; determining, based on the intrinsic and extrinsic calibration parameters, a camera-ball line comprising a straight line passing through the camera in a direction of the sports ball in a 3D coordinate system; determining, based on a three-dimensional (3D) model stored to the storage arrangement, an intersection point of the camera-ball line with the 3D model, wherein the 3D model comprises at least part of a sports play area overlapping with the first field of view; and outputting the intersection point as a 3D position of the sports ball in the image.

The present disclosure also relates to a processor coupled to a tracking camera and a storage arrangement configured to perform operations comprising: performing a ball detection to detect a pixel location of a sports ball in an image captured by the tracking camera, the tracking camera having a first field of view configured to capture images in a camera coordinate system of the sports ball bouncing and rolling after an initial trajectory, the tracking camera having intrinsic and extrinsic calibration parameters associated therewith stored to the storage arrangement; determining, based on the intrinsic and extrinsic calibration parameters, a camera-ball line comprising a straight line passing through the camera in a direction of the sports ball in a 3D coordinate system; determining, based on a three-dimensional (3D) model stored to the storage arrangement, an intersection point of the camera-ball line with the 3D model, wherein the 3D model comprises at least part of a sports play area overlapping with the first field of view; and outputting the intersection point as a 3D position of the sports ball in the image.

The present disclosure also relates to a system, comprising: a tracking camera having a first field of view configured to capture images in an image plane of a camera coordinate system of a sports ball bouncing and rolling after an initial trajectory, the tracking camera having intrinsic and extrinsic calibration parameters associated therewith; a storage arrangement including the intrinsic and extrinsic calibration parameters; and a processing arrangement coupled to the tracking camera and the storage arrangement configured to: perform a ball detection to detect a pixel location in the image plane of the sports ball in each of a sequence of images; generate a first time-series of the ball detections in the image plane; determine, based on the intrinsic and extrinsic calibration parameters, a camera-ball line comprising a straight line passing through the camera in a direction of the sports ball in a 3D coordinate system for each of the sports ball detections in the first time-series; generate a second time-series of an elevation angle of each camera-ball line; and identify, based on minima in the second time-series, bounces of the sports ball captured in the sequence of images.

The storage arrangement further stores a three-dimensional (3D) model of at least part of a sports play area overlapping with the first field of view, wherein the processing arrangement is further configured to: determine, based on the 3D model, for each identified bounce, an intersection point of the camera-ball line with the 3D model; and output the intersection points as 3D positions of bounces of the sports ball. The system further comprises: a tracking radar having a second field of view at least partially overlapping the first field of view configured to capture radar data of the sports ball, wherein the processing arrangement is further configured to: identify bounces in dependence on the radar data by determining velocity discontinuities in the radar data. The processing arrangement is further configured to: distinguish bounces from rolls in a second time series based on a physical model of a bounce; and classify each minima in the second time series that has not been determined to be a bounce as being a roll. A 3D position of the sports ball in the image is output to a database, a 3D graphics rendering engine, or a graphical illustration of the 3D position of the sports ball.

The present disclosure also relates to a method, comprising: performing a ball detection to detect a pixel location in an image plane of a sports ball in each of a sequence of images captured by a tracking camera, the tracking camera having a first field of view configured to capture images in the image plane of a camera coordinate system of the sports ball bouncing and rolling after an initial trajectory, the tracking camera having intrinsic and extrinsic calibration parameters associated therewith stored to a storage arrangement; generating a first time-series of the ball detections in the image plane; determining, based on the intrinsic and extrinsic calibration parameters, a camera-ball line comprising a straight line passing through the camera in a direction of the sports ball in a 3D coordinate system for each of the ball detections in the first time-series; generating a second time-series of an elevation angle of each camera-ball line; and identifying, based on minima in the second time-series, bounces of the sports ball captured in the sequence of images.

The present disclosure also relates to a processor coupled to a tracking camera and a storage arrangement configured to perform operations comprising: performing a ball detection to detect a pixel location in an image plane of a sports ball in each of a sequence of images captured by the tracking camera, the tracking camera having a first field of view configured to capture images in the image plane of a camera coordinate system of the sports ball bouncing and rolling after an initial trajectory, the tracking camera having intrinsic and extrinsic calibration parameters associated therewith stored to the storage arrangement; generating a first time-series of the ball detections in the image plane; determining, based on the intrinsic and extrinsic calibration parameters, a camera-ball line comprising a straight line passing through the camera in a direction of the sports ball in a 3D coordinate system for each of the ball detections in the first time-series; generating a second time-series of an elevation angle of each camera-ball line; and identifying, based on minima in the second time-series, bounces of the sports ball captured in the sequence of images.

The present disclosure also relates to a system, comprising: a first sensor having a sensor field of view configured to capture data corresponding to a trajectory of a sports ball; a first broadcast camera having a first field of view configured to capture a first video stream comprising first images of a first portion of the trajectory of the sports ball; a second broadcast camera having a second field of view configured to capture a second video stream comprising second images of a second portion of the trajectory of the sports ball; and a processing arrangement coupled to the first sensor and the first and second broadcast cameras configured to: generate a broadcast video feed using the first video stream including the first images of the first portion of the sports ball trajectory as the sports ball traverses the first field of view; determine trajectory parameters based on the data for the sports ball trajectory as the sports ball traverses the sensor field of view; detect an event for the sports ball based on the trajectory parameters; and switch the broadcast video feed to use the second video stream in dependence on the detected event so that the second broadcast camera captures the second images of the second portion of the sports ball trajectory as the sports ball traverses the second field of view.

The event comprises parameters for positional criteria indicating the sports ball has entered or will be entering the second field of view. The positional criteria comprise the sports ball moving past a first distance from a launch position or the launched ball moving past a second distance from a reference line. The event comprises a launch of the sports ball. The second broadcast camera comprises a robotic camera and an operational state of the second camera is adjusted from a first state associated with first camera parameters to a second state associated with second camera parameters. The first and second camera parameters comprise a crop, an orientation and a zoom level for the robotic camera in the first and second states, respectively. The processing arrangement is further configured to provide a region of interest to the second broadcast camera of an area where the sports ball is likely to be found. The second field of view at least partially overlaps the first field of view.

The second field of view has no overlap with the first field of view. The broadcast video feed is switched to use the second video stream after a predetermined delay following the detection of the event. The first sensor and the first broadcast camera are co-located on a same tracking unit. The first sensor and the first broadcast camera are a same device comprising a tracking camera additionally used for broadcast. The first sensor, the first broadcast camera and the second broadcast camera are calibrated to each other so that tracers mapping the trajectory of the sports ball in the broadcast video feed can be applied to the first video stream and the second video stream.

The present disclosure also relates to a method, comprising: generating a broadcast video feed using a first video stream comprising first images of a first portion of a trajectory of a sports ball, the first video stream being captured by a first broadcast camera having a first field of view, the first video stream including the first images of the first portion of the sports ball trajectory as the sports ball traverses the first field of view; determining trajectory parameters based on data corresponding to the trajectory of the sports ball captured by a first sensor having a sensor field of view as the sports ball traverses the sensor field of view; detecting an event for the sports ball based on the trajectory parameters; and switching the broadcast video feed to use a second video stream comprising second images of a second portion of the trajectory of the sports ball, the second video stream being captured by a second broadcast camera having a second field of view, the broadcast video feed being switched in dependence on the detected event so that the second broadcast camera captures the second images of the second portion of the sports ball trajectory as the sports ball traverses the second field of view.

The present disclosure also relates to a processor coupled to a first sensor and first and second broadcast cameras configured to perform operations comprising: generating a broadcast video feed using a first video stream comprising first images of a first portion of a trajectory of a sports ball, the first video stream being captured by the first broadcast camera having a first field of view, the first video stream including the first images of the first portion of the sports ball trajectory as the sports ball traverses the first field of view; determining trajectory parameters based on data corresponding to the trajectory of the sports ball captured by the first sensor having a sensor field of view as the sports ball traverses the sensor field of view; detecting an event for the sports ball based on the trajectory parameters; and switching the broadcast video feed to use a second video stream comprising second images of a second portion of the trajectory of the sports ball, the second video stream being captured by the second broadcast camera having a second field of view, the broadcast video feed being switched in dependence on the detected event so that the second broadcast camera captures the second images of the second portion of the sports ball trajectory as the sports ball traverses the second field of view.

The present disclosure also relates to a system, comprising: a first sensor having a sensor field of view configured to capture data corresponding to trajectories of sports balls or characteristics of players; a first broadcast camera configured to capture a first video stream comprising first images; a second broadcast camera configured to capture a second video stream comprising second images; and a processing arrangement coupled to the first sensor and the first and second broadcast cameras configured to: receive criteria for a custom broadcast video feed, the criteria relating to a prioritization of players or locations to be shown in the custom broadcast video feed; generate a first portion of the custom broadcast video feed using the first broadcast camera; detect an event relating to a prioritized player or location, wherein the event is based on an action of the prioritized player or location or trajectory parameters for a first one of the sports balls associated with the prioritized player; and switch the custom broadcast video feed to use the second video stream in dependence on the detected event so that the custom broadcast video feed includes the second images of the prioritized player or of the trajectory of the first sports ball associated with the prioritized player.

The event comprises a detection and identification of the prioritized player in the second images of the second broadcast camera. The event further comprises a position or orientation of the prioritized player detected in the second images. The position or orientation of the prioritized player comprises the prioritized player approaching the sports ball, standing over the sports ball, swinging a club or hitting the sports ball. A neural network is used to detect the event. The event comprises parameters for positional criteria indicating the sports ball launched by the prioritized player can be captured in the second images of the second broadcast camera. The positional criteria comprise the sports ball moving past a first distance from a launch position or the sports ball moving past a second distance from a reference line, or wherein the event comprises a launch of the sports ball. The second broadcast camera comprises a robotic camera and an operational state of the second camera is adjusted from a first state using first camera parameters to a second state using second camera parameters.

The first and second camera parameters comprise a crop, an orientation and a zoom level for the robotic camera. The robotic camera is calibrated to the first sensor. The first sensor, the first broadcast camera and the second broadcast camera are calibrated to each other so that tracers mapping the trajectory of the sports ball in the custom broadcast video feed can be applied to the first video stream and the second video stream. The criteria for the custom broadcast video feed comprise all shots for the prioritized player are to be shown in the custom broadcast video feed; all shots for all players from a particular country or region are to be shown in the custom broadcast video feed; or tiers of particular players are identified and prioritized when determining which shots are to be shown in the custom broadcast video feed. When multiple prioritized players are determined to be simultaneously taking shots, a video stream for one of the prioritized players is buffered for broadcast after the video stream for another one of the prioritized players.

The present disclosure also relates to a method, comprising: receiving criteria for a custom broadcast video feed, the criteria relating to a prioritization of players or locations to be shown in the custom broadcast video feed; generating a first portion of the custom broadcast video feed using a first broadcast camera configured to capture a first video stream comprising first images; detecting an event relating to a prioritized player or location, wherein the event is based on an action of the prioritized player or location or trajectory parameters for a first sports ball associated with the prioritized player, the event being detected by a first sensor having a sensor field of view configured to capture data corresponding to trajectories of sports balls or characteristics of players; and switching the custom broadcast video feed to use a second video stream comprising second images captured by a second broadcast camera, the custom broadcast video feed being switched in dependence on the detected event so that the custom broadcast video feed includes the second images of the prioritized player or of the trajectory of the first sports ball associated with the prioritized player.

The present disclosure also relates to a processor coupled to a first sensor and first and second broadcast cameras configured to perform operations comprising: receiving criteria for a custom broadcast video feed, the criteria relating to a prioritization of players or locations to be shown in the custom broadcast video feed; generating a first portion of the custom broadcast video feed using the first broadcast camera configured to capture a first video stream comprising first images; detecting an event relating to a prioritized player or location, wherein the event is based on an action of the prioritized player or location or trajectory parameters for a first sports ball associated with the prioritized player, the event being detected by the first sensor having a sensor field of view configured to capture data corresponding to trajectories of sports balls or characteristics of players; and switching the custom broadcast video feed to use a second video stream comprising second images captured by the second broadcast camera, the custom broadcast video feed being switched in dependence on the detected event so that the custom broadcast video feed includes the second images of the prioritized player or of the trajectory of the first sports ball associated with the prioritized player.

The present disclosure also relates to a system, comprising: a first sensor having a first field of view configured to capture first data corresponding to a first portion of a trajectory of a sports ball including a launch of the sports ball; a second sensor having a second field of view configured to capture second data corresponding to a second portion of the trajectory of the sports ball; and a processing arrangement coupled to the first and second sensors configured to: determine a three-dimensional (3D) positional track of the sports ball based on the first data for the first portion of the sports ball trajectory as the sports ball traverses the first field of view; detect an event for the sports ball based on one or more parameters derived from the 3D positional track; and adjust an operational state of the second sensor in dependence on the detected event so that the second sensor captures the second data for the second portion of the sports ball trajectory as the sports ball traverses the second field of view and the processing arrangement determines the 3D positional track for the second portion of the sports ball trajectory.

The event comprises parameters relating to a position of the sports ball relative to the second field of view. The operational state of the second sensor is adjusted to capture the second data when the sports ball is determined to have moved past a first distance from a launch position or the sports ball is determined to have moved a second distance from a reference line. The operational state of the second sensor is adjusted from a low power state to a full power state. The operational state of the second sensor is adjusted from a non-tracking state to a tracking state. The second sensor comprises a robotic camera and the operational state of the second sensor is adjusted from a first tracking state using first camera parameters to a second tracking state using second camera parameters. The first and second camera parameters comprise a crop, an orientation and a zoom level for the robotic camera. The operational state of the second sensor is adjusted from a first state in which bounces and rolls are not tracked using a dedicated bounce and roll tracking module to a second state in which bounces and rolls are tracked using the dedicated bounce and roll tracking module.

The processing arrangement is further configured to provide a region of interest to the second sensor of designating an area within which the sports ball is likely to be found. The second field of view at least partially overlaps the first field of view. The second field of view has no overlap with the first field of view. The processing arrangement determines the 3D positional track for the first and second portions of the sports ball trajectory in a world coordinate system. The first and second sensors are 3D doppler radars. The first and second sensors are calibrated to the world coordinate system based on GPS positions of reference points and GPS positions of the first and second sensors. The first sensor is a 3D Doppler radar and the second sensor is a tracking camera. The second sensor is calibrated to the world coordinate system based on GPS positions of reference points, wherein the processing arrangement is further configured to: identify one or more reference points in an image and determine an orientation of the second sensor based thereon. The first sensor and the second sensor are co-located, the orientation of the second sensor being determined from feature matching in images and the orientation of the first sensor is determined based on the orientation of the second sensor.

The present disclosure also relates to a method, comprising: determining, from a first sensor having a first field of view configured to capture first data corresponding to a first portion of a trajectory of a sports ball including a launch of the sports ball, a three-dimensional (3D) positional track of the sports ball based on the first data for the first portion of the sports ball trajectory as the sports ball traverses the first field of view; detecting an event for the sports ball based on one or more parameters derived from the 3D positional track; and adjusting an operational state of a second sensor in dependence on the detected event, the second sensor having a second field of view configured to capture second data corresponding to a second portion of the trajectory of the sports ball, so that the second sensor captures the second data for the second portion of the sports ball trajectory as the sports ball traverses the second field of view; and determining the 3D positional track for the second portion of the sports ball trajectory.

The present disclosure also relates to a processor coupled to first and second sensors configured to perform operations comprising: determining, from the first sensor having a first field of view configured to capture first data corresponding to a first portion of a trajectory of a sports ball including a launch of the sports ball, a three-dimensional (3D) positional track of the sports ball based on the first data for the first portion of the sports ball trajectory as the sports ball traverses the first field of view; detecting an event for the sports ball based on one or more parameters derived from the 3D positional track; and adjust an operational state of the second sensor in dependence on the detected event, the second sensor having a second field of view configured to capture second data corresponding to a second portion of the trajectory of the sports ball, so that the second sensor captures the second data for the second portion of the sports ball trajectory as the sports ball traverses the second field of view; and determining the 3D positional track for the second portion of the sports ball trajectory.

The present disclosure also relates to a system, comprising: a tracking camera having a first field of view configured to capture images in a camera coordinate system of a golf ball located on a green, the tracking camera having intrinsic and extrinsic calibration parameters associated therewith; a storage arrangement including the intrinsic and extrinsic calibration parameters and a three-dimensional (3D) model of at least part of a golf course overlapping with the first field of view; and a processing arrangement coupled to the tracking camera and the storage arrangement configured to: perform a ball detection to detect a pixel location in an image plane of the golf ball at rest in an image; determine, based on the intrinsic and extrinsic calibration parameters, a camera-ball line comprising a straight line passing through the camera in a direction of the golf ball in a 3D coordinate system; determine, based on the 3D model, an intersection point of the camera-ball line with the 3D model; determine a 3D position of the golf ball at rest on the green; simulate a series of putt trajectories based on varying launch speeds and launch directions using knowledge of a stimp of the green and the 3D model; and generate a putt break fan based on the series of simulated putt trajectories, wherein the putt break fan is a plot of combinations of launch directions and launch speeds for putts and corresponding results of the putts.

The putt break fan comprises a portion of the plot wherein the combinations of launch directions and launch speeds result in a successful putt entering a hole, a first contour line wherein the combinations of launch directions and launch speeds result in a resting ball location with a first distance from the hole, and a second contour line wherein the combinations of launch directions and launch speeds result in a resting ball location with a second distance from the hole. The stimp of the green is determined from tracking previous putts and determining a speed decay of the previous putts. The previous putts are tracked within a predetermined duration prior to a current putt. The processing arrangement is further configured to: overlay the putt break fan on a broadcast video. The processing arrangement is further configured to: generate an output showing a probability of a successful putt depending on a given launch direction and a given launch speed.

The present disclosure also relates to a method, comprising: performing a ball detection to detect a pixel location in an image plane of a golf ball at rest in an image captured by a tracking camera having a first field of view configured to capture images in a camera coordinate system of the golf ball located on a green, the tracking camera having intrinsic and extrinsic calibration parameters associated therewith stored to a storage arrangement; determining, based on the intrinsic and extrinsic calibration parameters, a camera-ball line comprising a straight line passing through the camera in a direction of the golf ball in a 3D coordinate system; determining, based on a three-dimensional (3D) model stored to the storage arrangement of at least part of a golf course overlapping with the first field of view, an intersection point of the camera-ball line with the 3D model; determining a 3D position of the golf ball at rest on the green; simulating a series of putt trajectories based on varying launch speeds and launch directions using knowledge of a stimp of the green and the 3D model; and generating a putt break fan based on the series of simulated putt trajectories, wherein the putt break fan is a plot of combinations of launch directions and launch speeds for putts and corresponding results of the putts.

The present disclosure also relates to a processor coupled to a tracking camera and a storage arrangement configured to perform operations comprising: performing a ball detection to detect a pixel location in an image plane of a golf ball at rest in an image captured by the tracking camera having a first field of view configured to capture images in a camera coordinate system of the golf ball located on a green, the tracking camera having intrinsic and extrinsic calibration parameters associated therewith stored to the storage arrangement; determining, based on the intrinsic and extrinsic calibration parameters, a camera-ball line comprising a straight line passing through the camera in a direction of the golf ball in a 3D coordinate system; determining, based on a three-dimensional (3D) model stored to the storage arrangement of at least part of a golf course overlapping with the first field of view, an intersection point of the camera-ball line with the 3D model; determining a 3D position of the golf ball at rest on the green; simulating a series of putt trajectories based on varying launch speeds and launch directions using knowledge of a stimp of the green and the 3D model; and generating a putt break fan based on the series of simulated putt trajectories, wherein the putt break fan is a plot of combinations of launch directions and launch speeds for putts and corresponding results of the putts.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

The invention claimed is:

1. A system, comprising:
a database configured to store profiles for each of a plurality of golfers, each profile comprising identifying information for one of the golfers and a unique playerID associated with the one of the golfers;
a tracking arrangement configured to capture shot data corresponding to trajectories of golf balls launched by the golfers;

a wearable device carried by a first golfer comprising a motion sensor device configured to capture motion data corresponding to a swinging motion of the first golfer, the wearable device being associated with a first playerID of the first golfer; and a processing arrangement coupled to the database, the tracking arrangement and the wearable device, the processing arrangement configured to identify which one of the plurality of golfers having profiles stored in the database executed a swing resulting in a given trajectory determined from the shot data captured by the tracking arrangement, the processing arrangement configured to:

determine a first trajectory of a first shot of a first golf ball from the shot data captured by the tracking arrangement;

determine a first launch time and a first launch location for the first trajectory;

receive information from the wearable device or a mobile device linked to the wearable device, the information indicating a first swing was detected and including the first playerID, a first location for the first swing, and a first timestamp associated with the first swing;

compare the first timestamp to the first launch time to determine a correspondence in time and compare the first location to the first launch location to determine a correspondence in location;

match the first trajectory to the first swing based on the correspondence in time and the correspondence in location; and based on the first playerID included in the information and associated with the first swing, associate the first trajectory to a first profile of the first golfer associated with the first playerID.

2. The system of claim 1, wherein the wearable device or the mobile device stores swing data corresponding to the first swing, the first timestamp, and the first location, wherein the information is received by the processing arrangement at an end of play of the first golfer for associating the first trajectory to the first profile of the first golfer.

3. The system of claim 1, wherein the wearable device or the mobile device linked to the wearable device has a global positioning system (GPS) receiver for determining the first location for the first swing when the first swing is detected.

4. The system of claim 1, wherein an electronic identifier carried by the first golfer and associated with the first golfer is detected to determine the location of the first swing.

5. The system of claim 1, wherein the processing arrangement is further configured to execute an algorithm utilizing golf logic to facilitate identifying which one of the plurality of golfers generated the first trajectory by narrowing a list of profiles in the database considered when performing the identifying.

6. The system of claim 5, wherein the golf logic includes logic related to known groupings of golfers, known golf hole layouts, or known golf course layouts.

7. The system of claim 5, wherein the golf logic includes logic related to an estimated current lie of the first golf ball of the first golfer, as determined based on the shot data from the tracking arrangement.

8. The system of claim 1, wherein the processing arrangement is further configured to output parameters for the first trajectory to a personal device of the first golfer associated with the first playerID prior to a next shot of the first golfer.

9. The system of claim 8, wherein the parameters for the first trajectory include an estimated lie position for the first golf ball after the first golf ball comes to rest so that an application on the personal device can provide data facilitating the finding of the corresponding golf ball.

10. The system of claim 8, wherein the parameters for the first trajectory include an indication that the first golf ball has come to rest at a position within a first area of a golf course that is out of bounds, the parameters further including an indication of a second area from which the first golfer can take a next shot that is in bounds.

11. The system of claim 1, wherein the processing arrangement is further configured to compile a summary including parameters for all trajectories of all shots taken by the first golfer during a sports event.

12. The system of claim 1, wherein the processing arrangement is further configured to:

detect a type of golf club used by the first golfer for the first shot; and associate the detected type of the golf club with the first trajectory.

13. The system of claim 12, wherein the type of the golf club is detected based on a signal emitted from an electronic tag attached to the golf club when the golf club is in use.

14. A system, comprising:

a database configured to store profiles for each of a plurality of golfers, each profile comprising identifying information for one of the golfers and a unique playerID associated with the one of the golfers;

a tracking arrangement configured to capture shot data corresponding to trajectories of golf balls launched by the golfers;

a mobile device comprising a global positioning system (GPS) receiver for acquiring location data of the mobile device over time and associating a timestamp with a location, the mobile device being associated with a first playerID of the first golfer; and a processing arrangement coupled to the database, the tracking arrangement and the mobile device, the processing arrangement configured to identify which one of the plurality of golfers having profiles stored in the database generated a given trajectory determined from the shot data captured by the tracking arrangement, the processing arrangement configured to:

determine a first trajectory of a first shot of a first golf ball from the shot data captured by the tracking arrangement;

determine a first launch time and a first launch location for the first trajectory;

receive information from the mobile device including the location data associated with the first playerID;

compare the location data to the first launch time and the first launch location to determine a correspondence in time and location;

execute an algorithm utilizing golf logic to facilitate identifying which one of the plurality of golfers generated the first trajectory, the golf logic including logic related to known groupings of golfers, a known golf hole layout, a known golf course layout, or shot trajectories determined by the processing arrangement prior to the first trajectory; and based on the correspondence in time and location and the golf logic, match the first trajectory to a first profile of the first golfer associated with the first playerID.

15. The system of claim 14, wherein the processing arrangement is further configured to reduce a number of profiles from the database to search for matching the first trajectory to the first golfer based on the golf logic.

16. The system of claim 15, wherein the processing arrangement is further configured to:
   anticipate an upcoming launch location for an upcoming shot based on an estimated current lie on a golf hole for the first golfer; and
   match a second trajectory to the first profile of the first golfer based on a correspondence in location for a launch location of the second trajectory to the upcoming launch location.

17. The system of claim 15, wherein the processing arrangement is further configured to:
   determine, within a first known grouping of the golfers including the first golfer, that an estimated current lie on a current golf hole for the first golfer is furthest from a pin relative to other golfers within the first known grouping; and
   match a second trajectory to the first profile of the first golfer based on the second trajectory being launched next in time relative to subsequent trajectories launched on the current golf hole.

18. The system of claim 15, wherein the processing arrangement is further configured to:
   anticipate an upcoming launch location for an upcoming shot based on a completion of a given golf hole by the first golfer, the upcoming launch location being determined as a predefined launch location of a next golf hole after the given golf hole; and
   match a second trajectory to the first profile of the first golfer based on a correspondence in location for a launch location of the second trajectory to the upcoming launch location.

19. The system of claim 14, wherein the mobile device comprises an application for associating the first playerID to the first golfer prior to play.

20. The system of claim 19, wherein the application comprises a synchronization functionality that, when executed in a special area at a first hole of a golf course, synchronizes the mobile device with the database.

* * * * *